(12) United States Patent
Xiao et al.

(10) Patent No.: US 11,081,137 B2
(45) Date of Patent: Aug. 3, 2021

(54) METHOD AND DEVICE FOR PROCESSING MULTIMEDIA INFORMATION

(71) Applicant: Samsung Electronics Co., Ltd., Gyeonggi-do (KR)

(72) Inventors: Yu Xiao, Beijing (CN); Yanli Li, Beijing (CN); Juan Lei, Beijing (CN); Wenbo Zhang, Beijing (CN); Bo Gao, Beijing (CN); Junjun Xiong, Beijing (CN)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 15/470,329

(22) Filed: Mar. 27, 2017

(65) Prior Publication Data

US 2017/0278546 A1    Sep. 28, 2017

(30) Foreign Application Priority Data

Mar. 25, 2016    (CN) .......................... 201610179848.4

(51) Int. Cl.
| | |
|---|---|
| *G11B 27/031* | (2006.01) |
| *H04N 5/911* | (2006.01) |
| *G06K 9/00* | (2006.01) |
| *G06T 5/00* | (2006.01) |
| *G11B 27/34* | (2006.01) |

(52) U.S. Cl.
CPC .............. *G11B 27/031* (2013.01); *G06T 5/00* (2013.01); *G11B 27/34* (2013.01); *H04N 5/911* (2013.01); *G06K 9/00744* (2013.01); *G06T 2200/24* (2013.01); *G06T 2207/10016* (2013.01)

(58) Field of Classification Search
CPC ... G11B 27/031; H04N 5/911; G06K 9/00744

USPC .......................................................... 386/278
See application file for complete search history.

(56) References Cited

U.S. PATENT DOCUMENTS

| | | | |
|---|---|---|---|
| 5,519,790 A * | 5/1996 | Manning | H04N 5/21 348/415.1 |
| 9,142,010 B2 | 9/2015 | Watts et al. | |
| 2003/0103038 A1 | 6/2003 | Wong et al. | |

(Continued)

FOREIGN PATENT DOCUMENTS

| | | |
|---|---|---|
| CN | 101076111 | 11/2007 |
| CN | 101127835 | 2/2008 |

(Continued)

OTHER PUBLICATIONS

Guo et al. Spatial Resolution Enhancement of Video Using Still Images, Technical Report #1502, Oct. 2004. Computer Sciences Department, University of Wisconsin-Madison (Year: 2004).*

(Continued)

*Primary Examiner* — Thai Q Tran
*Assistant Examiner* — Nienru Yang
(74) *Attorney, Agent, or Firm* — The Farrell Law Firm, P.C.

(57) ABSTRACT

A method and an apparatus for processing multimedia information is provided. The method includes receiving a first type of multimedia information collected by a first multimedia collection apparatus and a second type of multimedia information collected by a second multimedia collection apparatus and processing the second type of multimedia information based the first type of multimedia information.

7 Claims, 22 Drawing Sheets

Acquire the first type of multimedia information and the second type of multimedia information respectively collected by two multimedia collection apparatuses — S110

Performing correspondingly processing on the second multimedia information according to the first type of multimedia information — S120

(56) References Cited

U.S. PATENT DOCUMENTS

| | | | |
|---|---|---|---|
| 2003/0189983 A1 | 10/2003 | Hong | |
| 2006/0125938 A1 | 6/2006 | Ben-Ezra et al. | |
| 2006/0175549 A1 | 8/2006 | Miller et al. | |
| 2006/0215765 A1 | 9/2006 | Hwang et al. | |
| 2006/0257048 A1* | 11/2006 | Lin | G06K 9/00711 |
| | | | 382/276 |
| 2009/0002504 A1* | 1/2009 | Yano | G06T 3/4007 |
| | | | 348/218.1 |
| 2009/0022226 A1 | 1/2009 | Bang et al. | |
| 2009/0195664 A1* | 8/2009 | Mowry | G03B 17/00 |
| | | | 348/207.99 |
| 2010/0020871 A1* | 1/2010 | Hannuksela | H04N 21/438 |
| | | | 375/240.12 |
| 2011/0032387 A1 | 2/2011 | Takahashi | |
| 2012/0120277 A1 | 5/2012 | Tsai | |
| 2012/0224074 A1 | 9/2012 | Tajima | |
| 2013/0053101 A1 | 2/2013 | Tsai et al. | |
| 2014/0092272 A1 | 4/2014 | Choi | |
| 2014/0118576 A1 | 5/2014 | Du | |
| 2014/0226952 A1 | 8/2014 | Cilia et al. | |
| 2015/0092066 A1* | 4/2015 | Geiss | H04N 5/2258 |
| | | | 348/180 |
| 2015/0365593 A1 | 12/2015 | Shinozaki et al. | |
| 2016/0065825 A1 | 3/2016 | Kuo et al. | |
| 2016/0065841 A1 | 3/2016 | Kuo et al. | |
| 2017/0201692 A1 | 7/2017 | Wu | |

FOREIGN PATENT DOCUMENTS

| | | |
|---|---|---|
| CN | 101917550 | 12/2010 |
| CN | 101917601 | 12/2010 |
| CN | 102129708 | 7/2011 |
| CN | 202600784 | 12/2012 |
| CN | 103237192 | 8/2013 |
| CN | 103425380 | 12/2013 |
| CN | 103475935 | 12/2013 |
| CN | 103514196 | 1/2014 |
| CN | 103606136 | 2/2014 |
| CN | 103607582 | 2/2014 |
| CN | 103986874 | 8/2014 |
| CN | 204206364 | 3/2015 |
| CN | 104581380 | 4/2015 |
| CN | 105391935 | 3/2016 |
| WO | WO 2009/142332 | 11/2009 |

OTHER PUBLICATIONS

International Search Report dated Jul. 11, 2017 issued in counterpart application No. PCT/KR2017/003258, 3 pages.
Chinese Office Action dated Jun. 14, 2019 issued in counterpart application No. 201610179848.4, 34 pages.
Chinese Office Action dated May 6, 2020 issued in counterpart application No. 201610179848.4, 29 pages.
European Search Report dated Jul. 16, 2020 issued in counterpart application No. 20174098.2-1208, 9 pages.
Jing Ge et al., "A Resolution Enhancement Algorithm for an Asymmetric Resolution Stereo Video", EURASIP Journal on Image and Video Processing, Jul. 28, 2015, 9 pages.
Chinese Supplementary Search Report dated Mar. 24, 2021 issued in counterpart application No. 201610179848.4, 1 page.
U.S. Office Action dated Jun. 9, 2021 issued in counterpart U.S. Appl. No. 16/832,169, 24 pages.

* cited by examiner

[c] Clear image

[b] Blur kernel

[a] Blurred image

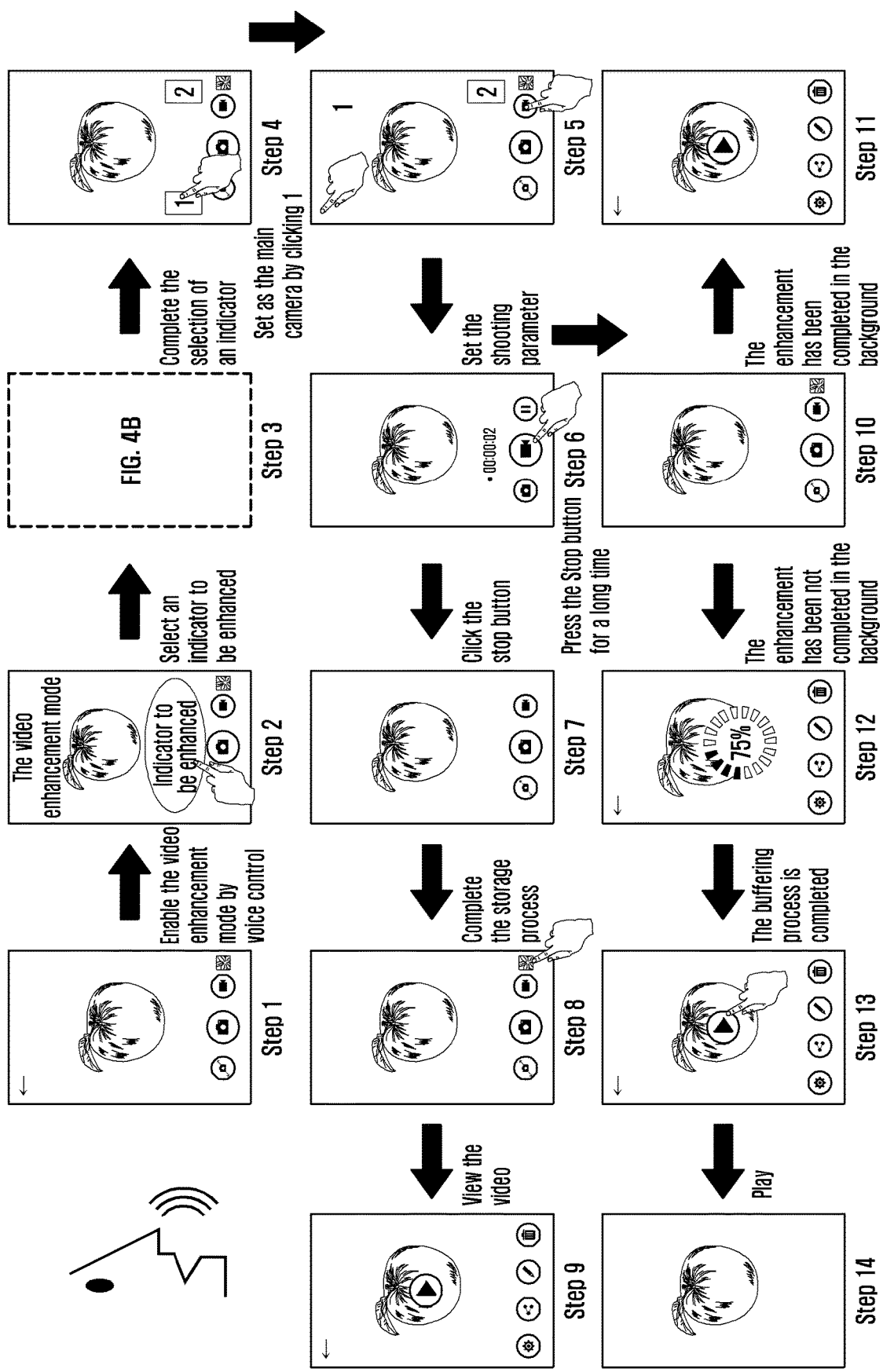

(c) Video and images collected by the binocular camera (b) Binocular camera (a) Enable by voice

METHOD AND DEVICE FOR PROCESSING MULTIMEDIA INFORMATION

PRIORITY

The present application claims priority under 35 U.S.C. § 119(a) to Chinese Patent Application Serial No. 201610179848.4, which was filed in the China State Intellectual Property Office on Mar. 25, 2016, the entire disclosure of which is incorporated herein by reference.

BACKGROUND

1. Field of the Disclosure

The present disclosure relates generally to processing multimedia information, and more particularly, to a method and device for processing multimedia information using video information, audio information, and image information.

2. Description of the Related Art

With the improvement in living standard, terminal apparatuses including camera devices or having camera functionalities are becoming more widespread. Obtaining images and videos of high quality has become an important factor to enhance competiveness of these terminal apparatuses. Most of the existing shooting enhancements focus on the improvement of image quality, and less on the improvement of video quality. When compared with image enhancement, it is relatively difficult to implement video enhancement due to time-space consistency and a limited processing time.

With conventional terminal apparatuses with image capturing functions, e.g., cell phones, the quality of videos and images collected sometimes cannot meet a users' requirements. Although the quality of images collected by some medium or high grade terminal apparatuses has been greatly enhanced, there is still a need to enhance video quality, especially videos collected in a low light environment.

Processing a video is generally more difficult than processing an image. For example, an image and a video frame, the processing time is different. In a video with a frequency of 30 fps, the time to process each video frame is to be controlled within $\frac{1}{30}$ second; however, the time to process an image can be longer. With regard to image enhancement, parameters such as exposure and white balance can be automatically adjusted depending upon a specific scene, and a number of images can even be collected to synthesize an image, so that the shot image is more accurate in brightness and color than a video.

Additionally, time-space consistency is required for a video, while there is no limit on time and space for an image. In order to ensure the time-space consistency, smooth transition is required in video acquisition parameters (including white balance, exposure and focusing) between adjacent video frames. Thus, if there is an obvious change in scenes, e.g., a change in illumination from indoors to outdoors, the terminal is hysteric in adjusting the video acquisition parameters. However, image acquisition parameters are determined by the brightness and color of the present scene, and thus, a capture still image can be more accurate in brightness and color than a video.

Enhancements for images or videos mainly focus on enhancing an image or a video by a corresponding algorithm. That is, enhancement is performed based on the respective information of a video or an image. The enhancement effect for both images and videos is not ideal, with distortion and insufficiency in definition in the enhanced images and videos.

SUMMARY

Aspects of the present disclosure have been made to address at least the above-mentioned problems and/or disadvantages and to provide at least the advantages described below.

In accordance with an aspect of the present disclosure, there is provided a method for processing multimedia information. The method includes receiving a first type of multimedia information collected by a first multimedia collection apparatus and a second type of multimedia information collected by a second multimedia collection apparatus and processing the second type of multimedia information based the first type of multimedia information.

In accordance with an aspect of the present disclosure, there is provided a device for processing multimedia information. The device includes a multimedia information acquisition module for acquiring a first type of multimedia information and a second type of multimedia information respectively collected by two multimedia collection apparatuses and a processing module for processing the second multimedia information based the first type of multimedia information.

Additional aspects and advantages of the present invention will be appreciated and become apparent from the descriptions below, or will be well learned from the practice of the present invention.

BRIEF DESCRIPTION OF THE DRAWINGS

The above and other aspects, features, and advantages of certain embodiments of the present disclosure will be more apparent from the following detailed description taken in conjunction with the accompanying drawings, in which:

FIG. 4A is a diagram of execution steps of a video combined enhancement mode, according to an embodiment of the present disclosure;

DETAILED DESCRIPTION

Figure 1:
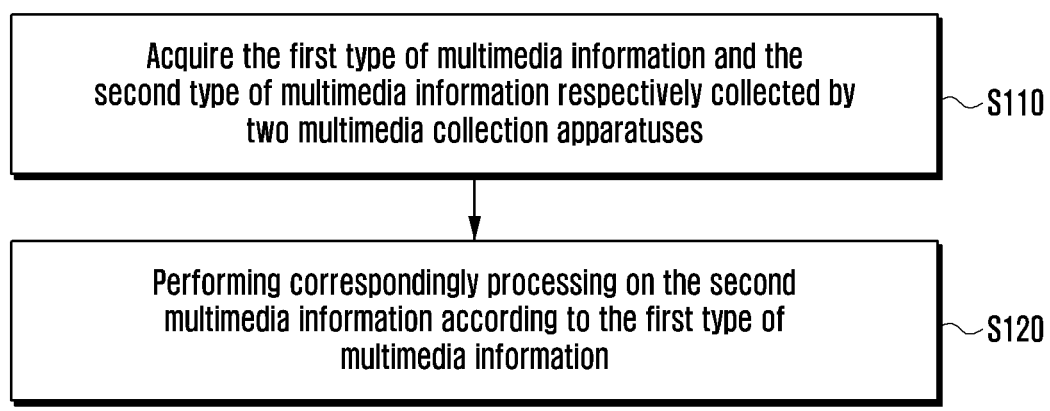
FIG. 1 is a flowchart of a method for processing multimedia information, according to an embodiment of the present disclosure.

Various embodiments of the present disclosure are described herein below with reference to the accompanying drawings. However, the embodiments of the present disclosure are not limited to the specific embodiments and should be construed as including all modifications, changes, equivalent devices and methods, and/or alternative embodiments of the present disclosure.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor) capable of performing a corresponding operation by executing one or more software programs stored in a memory device.

The term "module" as used herein may be defined as, for example, a unit including one of hardware, software, and firmware or two or more combinations thereof. The term "module" may be interchangeably used with, for example, the terms "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

Electronic devices according to the embodiments of the present disclosure may include at least one of, for example, smart phones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to an embodiment of the present disclosure, the wearable devices may include at least one of accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), or implantable wearable devices (e.g., implantable circuits).

The electronic devices may be smart home appliances. The smart home appliances may include at least one of, for example, televisions (TVs), digital versatile disk (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, or electronic picture frames.

The electronic devices may include at least one of various medical devices (e.g., various portable medical measurement devices (such as blood glucose meters, heart rate monitors, blood pressure monitors, or thermometers, and the like), a magnetic resonance angiography (MRA) device, a magnetic resonance imaging (MRI) device, a computed tomography (CT) device, scanners, or ultrasonic devices, and the like), navigation devices, global positioning system (GPS) receivers, event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller machines (ATMs), points of sales (POSs) devices, or Internet of Things (IoT) devices (e.g., light bulbs, various sensors, electric or gas meters, sprinkler devices, fire alarms, thermostats, street lamps, toasters, exercise equipment, hot water tanks, heaters, boilers, and the like).

The electronic devices may further include at least one of parts of furniture or buildings/structures, electronic boards, electronic signature receiving devices, projectors, or various measuring instruments (such as water meters, electricity meters, gas meters, or wave meters, and the like). The electronic devices may be one or more combinations of the above-mentioned devices. The electronic devices may be flexible electronic devices. Also, the electronic devices are not limited to the above-mentioned devices, and may include new electronic devices according to the development of new technologies.

Hereinafter, the electronic devices according to various embodiments of the present disclosure will be described with reference to the accompanying drawings. The term "user" as used herein may refer to a person who uses an electronic device or may refer to a device (e.g., an artificial intelligence electronic device) which uses an electronic device.

FIG. 1 is a flowchart of a method for processing multimedia information, according to an embodiment of the present disclosure. In step S110, a first type of multimedia information and a second type of multimedia information collected by two multimedia collection apparatuses are acquired. In step S120, the second type of multimedia information is processed according to the first type of multimedia information.

The two multimedia collection apparatuses may be placed in a same terminal apparatus, and the terminal apparatus may be a cell phone, an electronic Pad, a monitoring device, and/or other terminal device(s). The two multimedia collection apparatuses collect multimedia information simultaneously, with one of the collection apparatuses collecting the first type of multimedia information and the other one collecting the second type of multimedia information.

The first type of multimedia information and the second type of multimedia information can be associated; however, the multimedia information (e.g., images and videos) can be separately processed by an enhancement algorithm and/or respective information; no consideration is given to the association between the two types of multimedia information acquired simultaneously, and to perform multimedia information enhancement by use of the association. Thus, problems such as distortion in images or videos and low definition can occur. In the present disclosure, by acquiring two types of multimedia information simultaneously and performing enhancement processing on the second type of multimedia information according to the first type of multimedia information, since the respective characteristics of and the association between the two types of multimedia information are fully considered during the enhancement, the restrictions in enhancement of each type of multimedia information by an enhancement algorithm and the respective information can be overcome or eliminated. As a result, the quality of the enhanced multimedia information is greatly improved, and the authenticity and definition of the multimedia information can be ensured. The multimedia information includes at least one of image information, video information and audio information.

To improve camera functionality, binocular cameras have become a highlight in intensive development and promotion of manufacturers. When compared with a monocular camera, a binocular camera has some natural advantages. For example, the binocular camera can have two sets of collection parameters; the two cameras can be set in different shooting modes; and three-dimensional depth information can be obtained to enhance the accuracy in segmentation, identification, tracking and positioning. Most existing terminal apparatuses with binocular cameras provide more operating modes for image shooting by depth information, e.g., combining images shot or taken by the left camera and the right camera to obtain an image of high resolution; and segmenting a target region by depth information; all depth of field shooting rear-focusing. In the prior art, the two sets of parameters of the two cameras are not fully used to enhance the quality of images and videos. How to make full use of the advantages of binocular cameras to improve quality of the existing videos and images is also a problem that needs to be addressed.

The multimedia collection apparatus of the present disclosure can be a binocular camera in a terminal apparatus, and can also be implemented in other forms. In addition, the two cameras can be arranged side by side to simulate the function of human eyes. In addition, the two cameras can be arranged in other forms.

When the first type of multimedia information is image information, the second type of multimedia information can be video information. For example, one camera of a terminal apparatus collects video information, and the other camera collects corresponding image information. The video is enhanced by the collected image. The enhancement mode of the terminal apparatus can be called an image-enhanced video mode.

When the first type of multimedia information is video information, the second type of multimedia information can be image information. For example, one camera of a terminal apparatus collects image information, and the other camera collects corresponding video information. The image is enhanced by the collected video. The enhancement mode of the terminal apparatus can be called a video-enhanced image mode.

Since images or videos collected by a camera can correspond to many indicators, e.g., brightness, resolution, etc., when a video is enhanced by an image or an image is enhanced by a video, one or more indicators of the video or image can be enhanced. In this regard, the terminal apparatus of the present disclosure can process the second type of multimedia information according to the first type of multimedia information, e.g., determining indicators to be enhanced corresponding to the collected second type of multimedia information and performing enhancement processing on the collected second type of multimedia information according to the collected first type of multimedia information. The indicators can include at least one of resolution, color, brightness, noise and blur.

Processing the second type of information according to the first type of information can be embodied in an image-enhanced video mode in which the video information is processed by the image information; a video-enhanced image mode in which image information is processed by video information; a multi-focused region joint play mode in which video information is processed by video information; and a target object highlighting play mode in which video information is processed by audio information. Embodiments 1 to 8 are related to the image-enhanced video mode; Embodiment 9 is related to the video-enhanced image mode; Embodiment 10 is related to the multi-focused region joint play mode; and Embodiment 11 is related to the target object highlighting play mode.

In Embodiments 1 to 8, with regard to the collected videos and images, the videos are enhanced by the images, and the corresponding determined indicators can include the following five indicators: resolution, brightness, color, noise and blur.

A video of high resolution is obtained by shooting images of high resolution and performing enhancement processing on the video resolution. Brightness of a video shot in a low light environment can be improved by shooting images of high quality and adjusting the video brightness. Color contrast and RGB color distribution of a video shot in a non-ideal shooting environment can be improved by shooting images of high quality and adjusting the video color. A video of low noise and high quality can be obtained by shooting images of low noise and de-noising the video. A video with improved definition can be obtained by shooting images with high definition and de-blurring video frames by the images.

In Embodiment 9, images are enhanced by videos, and the corresponding determined indicators include blur when a long-exposure image of high brightness is shot. If the image is blurred, the blurred image can be enhanced by short-exposure video frames. Thus, an image of high brightness and good definition can be obtained.

In the image-enhanced video flow, main/auxiliary cameras, indicators to be enhanced, a collection parameter, and an enhancement policy parameter are set. Thereafter, the two cameras are activated for shooting, with the main camera shooting videos and the auxiliary camera shooting images, and by the enhancement policy parameter, the indicators to be enhanced in the shot video are enhanced according to the shot images. The collected data can be stored by a terminal apparatus, as needed, and the stored data can be substantially played or displayed.

In the video-enhanced image flow, main/auxiliary cameras, indicators to be enhanced, a collection parameter, and an enhancement policy parameter are configured. The two cameras are activated for shooting, with the main camera shooting images and the auxiliary camera shooting videos, and by the enhancement policy parameter, the indicators to be enhanced in the shot image are enhanced according to the shot video.

In performing enhancement processing on the determined indicators corresponding to the collected second type of multimedia information according to the first type of multimedia information, enhancement can be performed on different determined indicators. Different indicators to be enhanced correspond to different enhancement modes. For example, when one of the indicators is to be enhanced, the enhancement mode includes, but is not limited to, a resolution enhancement mode, a color enhancement mode, a brightness enhancement mode, a de-noising enhancement mode and a de-blurring enhancement mode. At least two of the indicators can also be enhanced, which is referred to as a combined enhancement mode.

Embodiment 1

A Resolution Enhancement Mode in the Image-Enhanced Video Mode

In enhancing video resolution, in the existing terminal apparatuses, the maximum resolution of a video is generally lower than that of an image. For example, in one type of mobile terminals, the maximum resolution of an image can be 5312*2988, while the maximum resolution of a video is 3840*2160. Restricted by CPU and memory capacity of terminal apparatuses, in order to enable users to view what they have shot in real time, the video resolution instead of the image resolution must be reduced, or otherwise the video cannot be processed in real time. One method for improving the video resolution is to respectively enhance resolution of each video frame by interpolation. However, video frame details obtained by this method can become blurred.

Another method for performing enhancement processing on the video resolution is to perform enhancement processing on videos of low resolution by using images of high resolution. Such an operation can include a mapping model that is trained by a great number of images of high resolution and corresponding videos of low resolution, and the video resolution can be enhanced by the mapping model. That is, pixel blocks of images and videos are extracted to establish a training database, and a mapping model is obtained on the basis of training database. High-frequency detail information can be transferred to a video of low resolution by the mapping model to obtain a video of high resolution. Training data can be collected in advance. If there is only a small amount of training data, the generalization energy may be weak, leading to a poor enhancement effect. If there is a large amount of training data, a large storage space is available. With respect to enhancing video resolution, enlargement depending upon only information of each frame in a video provides for a certain change in size of images, richer detail information cannot be provided for users and the purpose of enhancing the resolution cannot be achieved. In addition, videos of high resolution occupy a large memory space. Improving the video resolution without causing much memory consumption can be a problem to which the prior art gives no consideration.

As noted above, the multimedia information includes image information and video information. The multimedia collection apparatus can be a binocular camera.

The resolution enhancement mode in the image-enhanced video mode can be enabled. The two cameras of the binocular camera can be activated to respectively collect image information and video information. A collection parameter of the camera and a key frame are self-adaptively set. Resolution of the video information can be enhanced according to the collection parameter of the camera and the key frame. The enhancement results are compressed, transferred, and played.

Step 1: The resolution enhancement mode in the image-enhanced video mode can be enabled. Indicators to be enhanced corresponding to the collected second type of multimedia information are determined by at least one of determining, according to a detected enhancement enable trigger operation, the indicators to be enhanced corresponding to the collected second type of multimedia information; determining, according to presetting, the indicators to be enhanced matched with the collected second type of multimedia information; or determining, in a way of self-adaptive parameter matching, indicators to be enhanced.

Self-adaptive parameter matching can be determined by one or more pieces of information of relevant state of an apparatus, enhancement enable historical data, collection environment, collection parameter, and relevant content of multimedia information collected by the multimedia collection apparatus in real time. The relevant state of an apparatus includes at least one of apparatus power state, apparatus storage state, and apparatus movement state when multimedia information is collected. The relevant content of the multimedia information collected by a multimedia collection apparatus in real time includes at least one scene brightness, semantic content, and definition of a salient object. An enhancement order for indicators to be enhanced is determined if there are at least two determined indicators to be enhanced. According to the collected first type of multimedia information, indicators to be enhanced corresponding to the collected second type of multimedia information are successively enhanced in the determined enhancement order.

Specifically, the enhancement order of the indicators to be enhanced is determined by at least one of an enhancement order setting trigger operation; setting in advance and a way of self-adaptive enhancement order setting.

Self-adaptive enhancement order setting is determined by one or more pieces of information of a relevant state of an apparatus, enhancement setting historical information, collection environment, collection parameter, relevant content of multimedia information collected by the multimedia collection apparatus in real time, and influence relation between indicators.

The relevant content of the multimedia information collected by the multimedia collection apparatus in real time includes at least one of scene brightness and semantic content.

In Embodiment 1, users can enable the resolution enhancement mode in the image-enhanced video mode by an enhancement enable trigger operation, e.g., voice, keys, gestures, biological characteristics, external controllers, etc. The terminal apparatus can also enable this mode according to presetting (e.g., a system default setting) or in a way of self-adaptive mode matching. The resolution enhancement mode in the image-enhanced video mode can be self-adaptively enabled according to the relevant state of an apparatus, enhancement enable historical data, collection environment, collection parameter, and relevant content of multimedia information collected by the multimedia collection apparatus in real time. This mode can also be enabled by any combination of enhancement enable user-triggered operation settings and system default setting. For example, a user enables the image-enhanced video mode by a key, and then the terminal apparatus self-adaptively enables the resolution enhancement mode in the image-enhanced video mode according to the enhancement mode enable historical data.

As for enabling by a voice, the terminal apparatus presets certain voice as an enabling instruction, e.g., "enable video resolution enhancement". Upon receiving a voice-activated instruction "enable video resolution enhancement" from the user, the terminal apparatus performs voice recognition on the voice-activated instruction to determine that the resolution enhancement mode in the image-enhanced video mode is to be enabled now.

As for enabling by a key, the terminal apparatus presets a certain key as an enabling instruction, and the key can be a hardware key. For example, the user can press a volume key for a predetermined time to indicate video resolution enhancement. Upon receiving an event of pressing the volume key for the predetermined time by the user, the terminal apparatus determines that the resolution enhancement mode in the image-enhanced video mode is to be enabled. The key can also be a virtual key, e.g., a virtual control button on the screen. The terminal apparatus displays the key of this mode on an interactive interface. Upon receiving an event of clicking the virtual key by the user, the terminal apparatus determines that this mode is enabled. When this mode is enabled by a key, differences of a plurality of feature information, e.g., pressure, speed, time, frequency, etc., when a user triggers can also be combined to indicate different corresponding meanings. For example, quickly clicking the virtual control indicates enabling this mode, or more.

As for enabling by a gesture, the terminal apparatus presets a certain gesture as an enabling instruction. The gesture includes a screen gesture, e.g., double-clicking the screen/or pressing the screen for a predetermined time. When this mode is enabled by a screen gesture, differences of pressure, speed, time, and/or frequency of the user's gesture can be combined to indicate different corresponding meanings. For example, any one of the following can indicate enabling this mode: pressing lightly, e.g., the pressure is less than a first predetermined value; pressing heavily, e.g., the pressure is greater than or equal to the first predetermined value; pressing for a predetermined time, e.g., the pressing duration is greater than a second predetermined value; and double-clicking quickly. The gesture may also include a telekinetic gesture, e.g., shaking/rolling/tilting the terminal. Different direction, angle, speed and force of the shaking/rolling/tilting can indicate different meanings. For example, any one of shaking up and down, shaking right to left and circling in air can indicate enabling of this mode. The gesture can be a single gesture, and can also be any combination of any gestures, e.g., combination of pressing the screen for a long time and shaking the terminal apparatus.

As for enabling by biological characteristics, the biological characteristics may include, but are not limited to, handwriting characteristics and fingerprint characteristics. For example, when the detected fingerprint is consistent with the preregistered fingerprint of the user, the terminal apparatus determines that the resolution enhancement mode in the image-enhanced video mode is enabled.

As for enabling by a system default setting, in the absence of user interactions, the terminal apparatus sets the resolution enhancement mode in the image-enhanced video mode in an ON or OFF state by default.

As for self-adaptive enabling according to the relevant state of a terminal apparatus, the relevant state of the apparatus can include power state, storage state (e.g., memory capacity), movement state, etc. A first predetermined power and a second predetermined power can be set, wherein the first predetermined power (e.g., 20%) is less than the second predetermined power (e.g., 80%). When the power of the terminal apparatus is less than the first predetermined power, the video resolution enhancement mode is disabled, and when the power is greater than the second predetermined power, the video resolution enhancement mode is enabled. Only one enabling power is set, so that the video resolution enhancement mode is enabled by default when the terminal power is greater than the enabling power, or otherwise the video resolution enhancement mode is disabled.

As for self-adaptive enabling, according to enhancement enable historical data, the number of times the video resolution enhancement mode is enabled during a number of times of (e.g., 10) recent collections is counted. If the number of times the video resolution enhancement mode is enabled exceeds a certain threshold (e.g., 5), the terminal apparatus automatically enables the resolution enhancement mode; otherwise the terminal apparatus disables the resolution enhancement mode. Whether this mode is enabled or not in this shooting is determined according to the setting of the previous shooting.

As for the collection environment, information such as environment brightness is collected by a sensor, e.g., a brightness sensor. This mode can be self-adaptively enabled according to the environment brightness. When the average environment brightness is less than a set threshold, this mode is enabled; otherwise, this mode is disabled.

As for the collection parameter, the collection parameter specifically includes at least one of white balance, exposure duration, photosensitivity, high dynamic range, resolution, focused region, and video frame collection frequency. This mode can be self-adaptively enabled according to the collection parameter. For example, when the exposure duration of the video is too long (greater than a set threshold), this mode is enabled, otherwise this mode is disabled.

As for self-adaptive enabling, according to relevant content collected in real time, the relevant content collected in real time includes scene brightness, semantic content, definition of a salient object, etc. This mode can be self-adaptively enabled according to the scene brightness. When the average scene brightness is less than a set threshold, this mode is enabled; otherwise, this mode is disabled. This mode can be enabled according to the semantic content of the scene. When a target object, e.g., a car, a person or more, is detected in a scene, this mode is enabled, otherwise this mode is disabled. The signal-to-noise ratio of a salient region, e.g., a license plate region or more, of the scene can be detected. If the signal-to-noise ratio (SNR) of the salient region is less than a certain given threshold, the terminal apparatus automatically enables the resolution enhancement mode.

Step 2: One camera of the binocular camera is used for shooting images, and the other camera is used for shooting videos.

This step includes: setting a main camera and an auxiliary camera, setting a camera parameter and an enhancement policy parameter, and setting the selection of a key frame; setting, from the two multimedia collection apparatuses, a main collection apparatus and an auxiliary collection apparatus, when the video information is correspondingly processed according to the image information, collecting video information by the main collection apparatus, and collecting image information by the auxiliary collection apparatus; and when image information is correspondingly processed according to video information, collecting image information by the main collection apparatus, and collecting video information by the auxiliary collection apparatus.

A main collection apparatus and an auxiliary collection apparatus are set from the two multimedia collection apparatus by at least one of setting, according to a detected setting trigger operation, a main collection apparatus and an auxiliary collection apparatus; setting, according to presetting, a main collection apparatus and an auxiliary collection apparatus; and setting, in a way of self-adaptive apparatus setting, a main collection apparatus and an auxiliary collection apparatus.

Self-adaptive apparatus setting is determined by one or more pieces of information of relevant state of an apparatus, enhancement setting historical data, and relevant content of the multimedia information collected by the multimedia collection apparatus in real time. The relevant state of an apparatus includes apparatus power state and/or apparatus storage state. The relevant content of the multimedia information collected by the multimedia collection apparatus in real time includes at least one of picture proportion, location information of a target object in a picture, and picture quality information.

Step 2.1: A main camera and an auxiliary camera are set.

The main camera is used to collect video information, and the auxiliary camera is used to collect image information. The terminal apparatus can set the main camera and the auxiliary camera in one of three ways. The terminal apparatus sets the main camera and the auxiliary camera in advance (e.g., default setting). Thereafter, the terminal apparatus sets the main camera and the auxiliary camera according to a setting trigger operation sent by the user by at least one of keys, gestures, external controllers or more. The terminal apparatus sets the main camera and the auxiliary camera by self-adaptive adjustment according to relevant state of an apparatus, apparatus setting historical data, and relevant content collected in real time.

As for system default setting, the terminal apparatus sets one of the two cameras as the main camera and the other as the auxiliary camera by default. For example, the camera on a side which faces a scene to be shot is the main camera, and the camera on the other side is the auxiliary camera.

As for setting by a key, the terminal apparatus presets that the main camera and the auxiliary camera is controlled by a key. The key can be a hardware key, e.g., the camera on one side is enabled by a volume key "+" key as a main camera, while the camera on the other side is enabled by a volume key "−" key as an auxiliary camera. The key can also be a virtual key, e.g., virtual control, menu or more on a screen.

As for setting by a gesture, the terminal apparatus sets a certain gesture in advance for switchover between the main camera and the auxiliary camera. For example, circling clockwise indicates setting the camera on one side as the main camera, while circling counterclockwise indicates setting the camera on the other side as auxiliary camera.

As for the external controller, the external controller includes, but is not limited to, a stylus, a remote control, smart glasses, a smart headset, etc. These apparatuses can access the terminal apparatus by one of wireless-fidelity (WiFi), near filed communication (NFC), bluetooth (BT) and a data network. A control region, e.g., a key or a touch screen, is equipped on an apparatus to control the enabling of the main camera and the auxiliary camera. For example, an "Up key" on the remote control indicates that the camera on one side is set as the main camera, while the "Down key" indicates that the camera on the other side is set as the main camera.

As for the self-adaptive setting, according to the apparatus setting historical data, modes for setting the main camera and the auxiliary camera during a number of times of (e.g., 9) recent collections are counted. For example, if a camera on one side is set as the main camera more often, the camera on this side is automatically set as the main camera when the terminal apparatus is activated. The main camera and the auxiliary camera in this instance can be determined based on the setting of the previous shooting.

As for self-adaptively setting, by the terminal apparatus, the cameras according to the relevant content collected in real time, the terminal apparatus selects the main camera according to the content collected by the two cameras. For example, the shot contents are graded, and the camera corresponding to the content with higher or better scores is used as the main camera. The grading parameter may include picture proportion, location information of a target object in a picture, picture quality information, etc. The terminal apparatus can self-adaptively adjust the main camera in real time according to the shot scene during the shooting, and can splice video segments shot by different main cameras together to obtain a complete and uninterrupted video sequence.

If the resolution enhancement mode in the image-enhanced video mode is enabled when shooting a video, the camera currently shooting video information can be set as the main camera, and the other camera can be set as the auxiliary camera to shoot image information. The cameras can be self-adaptively set according to the content collected in real time.

Step 2.2: A collection parameter of the camera and an enhancement policy parameter are set.

Specifically, a collection parameter of the multimedia information and an enhancement policy parameter are set. A first type of multimedia information and a second type of multimedia information respectively collected by two multimedia collection apparatuses based on the collection parameter are acquired. In accordance with the enhancement policy parameter, the second type of multimedia information is processed according to the first type of multimedia information.

The collection parameter specifically includes at least one of white balance, exposure duration, photosensitivity, high dynamic range, resolution, focused region, and video frame collection frequency.

The collection parameter of the multimedia information and the enhancement policy parameter are set by any one of: setting, according to a detected parameter setting operation, the collection parameter and the enhancement policy parameter; setting, by the parameter presetting, the collection parameter and the enhancement policy parameter; and self-adaptively setting, in a way of self-adaptive parameter setting, the collection parameter and the enhancement policy parameter.

Self-adaptive parameter setting is determined by at least one or more pieces of information of the terminal apparatus, parameter historical data, collection environment, and relevant content of the multimedia information collected by the multimedia collection apparatus in real time.

The relevant state of the terminal apparatus includes at least one of terminal apparatus power state, terminal apparatus storage state, and terminal apparatus movement state when the multimedia information is collected. The relevant content of the multimedia information collected by a multimedia collection apparatus in real time includes at least one of scene brightness, semantic content, definition of a salient object, resolution and exposure duration.

Specifically, a collection parameter of the binocular shooting apparatus and an internal enhancement policy parameter during enhancement are set. The collection parameter of the camera is a camera parameter set during collection, and the enhancement policy parameter is an internal parameter in the selected video enhancement method.

A first setting method is to preset a parameter (e.g., or fixed value setting defaulted in the system). That is, the parameter is defined a fixed value. For example, in a brightness enhancement method based on machine learning, the size of a pixel block is set as a fixed value, e.g., five pixels.

A second setting method includes the terminal apparatus receiving a parameter setting operation sent by the user by at least one of voice, keys or external controllers, to set the parameter.

A third setting method includes the terminal apparatus self-adaptively setting the collection parameter and the enhancement policy parameter by the relevant state of an apparatus, parameter historical data, collection environment, relevant content collected in real time, etc.

A fourth setting method includes setting a parameter by combining self-adaptive setting and the user-adjusted setting. For example, the terminal apparatus fixes a set of parameter values by default, and the user adjusts some parameter values by keys.

As for setting by voice under user interaction, e.g., the terminal apparatus presets a voice enabling instruction "collect an image of high dynamic range." If the terminal apparatus receives this instruction, the apparatus performs voice recognition on the voice-activated instruction and determines to enable the collection of an image of high dynamic range. The terminal apparatus presets a voice enabling instruction "select fluorescent lamp for the white balance of the image", the image white balance is set as fluorescent lamp. The terminal apparatus sets in advance a voice enabling instruction "increase the image exposure value", then the exposure value of the image is increased.

As for setting by a key under user interaction, the key can be a hardware key, e.g., the key "+" indicates increasing the exposure value, and the key "−" indicates decreasing the exposure value, the "HOME" key indicates collecting an image of high dynamic range. The key can be a virtual key, e.g., a slider, a key, a menu, etc., on a screen. The virtual key is distributed on the interactive interface. Upon detecting an event that the user clicks the virtual key, the terminal apparatus determines to change the setting parameter. Various feature information, e.g., pressure, speed, time, frequency, etc., at which the user presses the key, can also be combined to indicate different meanings. For example, pressing lightly indicates decreasing the exposure value, and pressing heavily indicates increasing the exposure value.

As for setting by an external controller under user interaction, the external controller include a stylus, a remote control, a smart watch, smart glasses, a smart headset, smart clothes, a remote apparatus, etc. These controllers access the terminal apparatus by at least one of Wi-Fi, infrared, BT, and a data network. A control region, e.g., a key or a touch screen, is equipped on the controller to control the terminal apparatus, e.g., a telekinetic gesture by a stylus. An upper gesture is set as increasing the exposure value, and a down gesture is set as decreasing the exposure value. When these operations are recognized by the terminal apparatus, an adjustment parameter is enabled. Keys for adjusting white balance, exposure, video collection frequency, etc. are provided on the remote control. Upon detecting that the user has clicked the key, the controller sends the detection result to the terminal apparatus to adjust the parameter.

As for self-adaptive setting, according to the scene brightness and semantic content, white balance can be adjusted according to the type of a scene. When a scene is recognized by the terminal apparatus as daytime, the white balance is adjusted as sunlight. When the scene is recognized as night and in yellow, the white balance is adjusted as tungsten lamp. The focus can be adjusted according to a target of interest in a scene. A salient region or human body region is positioned and focused. The amount of exposure can be adjusted according to scene light. For example, when the average scene light value is detected to be less than a given threshold, the terminal apparatus increases the amount of exposure, otherwise the terminal apparatus decreases the amount of exposure. The number of collected images of high dynamic range can be self-adaptively adjusted according to the variance of brightness in a scene. When the variance of brightness is greater than a first given threshold, the number of collected images is increased. When the variance of brightness is less than a second given threshold, the number of collected images is decreased. The size of an image pixel block during brightness enhancement can be set according to the size of the collected images. For example, a pixel block can be defined as the image size multiplied by a certain proportionality coefficient.

As for self-adaptive setting, according to the relevant state of an apparatus, the relevant state of the apparatus includes power state, storage state (e.g., memory capacity), etc. The computing amount can be reduced by controlling the amount of exposure according to the power. When the power of the terminal apparatus is less than the first predetermined power, e.g., 50%, the amount of exposure is decreased. When the power is less than the second predetermined power, e.g., 5%, no high dynamic range is set, wherein the first predetermined power is greater than the second predetermined power. The computing amount can be reduced by controlling the parameter for de-blurring according to the power. When the power is less than the first predetermined power (50%), the size of the blur kernel is reduced. When the power is less than the second predetermined power (5%), the size of the blur kernel is fixed as a minimum value.

The computing amount can be reduced by controlling the parameter for color enhancement based on machine learning according to the power. When the power is less than the first predetermined power (50%), the number of words in a word base is reduced. When the power is less than the second predetermined power (5%), the number of words is fixed as a minimum value. The computing amount can be reduced by determining a parameter for brightness enhancement according to the power. When the power is less than the first predetermined power (50%), the number of pixels to be sampled in a method based on the machine learning is reduced. When the power is less than the second predetermined number (20%), the model mapping method in the machine learning method is replaced with a Gaussian mixture model method.

The video frame collection frequency can be adjusted according to the memory capacity. If the remaining memory capacity is greater than the first predetermined space (1G), the frequency is automatically adjusted to a specified high collection frequency (3640*1920. If the remaining memory capacity is less than the second predetermined space (300M), the frequency is adjusted to a specified low collection frequency (1920*1080).

As for the self-adaptive setting, according to the parameter historical data, the amount of exposure is adjusted according to the exposure value historical data set by the user. The setting method may include the exposure value and the average image brightness value in the parameter historical data are calculated; a mapping relation table is obtained by the least square method; and the exposure value is adjusted according to the mapping table. For example, the high dynamic range setting is adjusted according to the preferred setting of the user. The setting method includes, but is not limited to the number of times the high dynamic range is set during N (e.g., 10) recent brightness enhancements is counted. If the number is greater than N/2, the high dynamic range is set preferentially, or, the parameter value for this shooting is set as the parameter for the previous shooting.

Step 2.3: A key frame collection frequency is self-adaptively set.

When the first type of multimedia information is image information and the second type of multimedia information is video information, the video information collected by one multimedia acquisition apparatus and the key frame image information corresponding to the video information collected simultaneously in a key frame collection frequency by the other multimedia collection apparatus are acquired. The indicators to be enhanced corresponding to the collected video information are enhanced according to the collected key frame image information.

The method further includes setting a key frame collection frequency, wherein setting the key frame collection frequency includes at least one of setting the key frame collection frequency according to frequency presetting and self-adaptively setting the key frame collection frequency using a self-adaptive frequency setting.

Self-adaptive parameter setting is determined by one or more pieces of information of relevant state of an apparatus, collection frequency historical data, collection environment, collection parameter, and relevant content of the multimedia information collected by the multimedia collection apparatus in real time.

The relevant state of an apparatus includes at least one of apparatus power state, apparatus storage state, and apparatus movement state when multimedia information is collected. The relevant content of multimedia information collected by the multimedia collection apparatus in real time includes at least one of scene brightness and semantic content.

As for frequency presetting, a key frame can be selected in a system fixed frequency. For example, the collection frequency is fixed as a given frequency, e.g., one time/second. If the video collection frequency is 30 frames/second, one image is collected every 30 frames.

As for self-adaptively setting, according to the relevant content collected in real time, a key frame collection frequency can be self-adaptively selected according to change in environment brightness. The average brightness value of the environment is detected in real time. If difference in the average brightness value of adjacent frames is greater than the first threshold (e.g., 50), the key frame selection is enabled. The key frame can be self-adaptively selected according to the semantic content. The overall feature description factors of the environment are extracted, including color histogram, gradient histogram, texture histogram, features trained by the neural network, etc. A difference in the characterization factors of the adjacent frames is calculated. If the difference in the feature description factors is higher than the second threshold, the key frame selection is enabled. The key frame can be selected by combining the environment brightness or content with the given frequency. Although the scene environment is collected in a fixed frequency, the collection frequency is self-adaptively adjusted according to the scene change. If the scene environment brightness or content is replaced frequently, the key frame collection frequency is increased. If the scene environment brightness or content remains substantially unchanged, the key frame collection frequency is decreased.

As for selecting the key frame collection frequency, according to the relevant state of an apparatus, the relevant state of an apparatus includes power, storage (e.g., memory capacity), apparatus movement state, etc. The key frame collection frequency can be set according to the power. For example, when the power is less than the first predetermined power (e.g., 50%), the key frame collection frequency is decreased. When the power is greater than the second predetermined power (e.g., 80%), the key frame collection frequency is increased, wherein the first predetermined power is less than the second predetermined power. The key frame frequency can be set according to the memory capacity. For example, when the memory capacity is less than the first predetermined value (e.g., 500M), the key frame collection frequency is decreased. When the memory capacity is greater than the second predetermined value (e.g., 700M), the key frame collection frequency is increased. The collection frequency can also be adjusted according to the terminal apparatus movement state. The movement state of the terminal apparatus can be decided by an internal sensor of the terminal apparatus. If the movement amplitude is greater than a certain threshold, the key frame collection frequency is increased to ensure that adequate key frame images of high quality are obtained.

Step 3: Resolution of the video information is enhanced.

The collected video information is divided into a number of video segments, according to the collected key frame image information. Indicators to be enhanced corresponding to a respective video segment are enhanced by using the key frame image information in addition to this video segment.

Specifically, when the indicators to be enhanced include at least one of resolution, color and brightness, enhancement is based on multi-view reconstruction, and/or enhancement by constructing an enhancement model based on machine learning.

The enhancement based on multi-view reconstruction specifically includes establishing a matching relation between a video pixel of the collected video information and an image pixel of the key frame image information, and replacing the matched video pixel with the image pixel.

Constructing an enhancement model based on machine learning includes extracting a video pixel at a position of the key frame image of the collected video information; establishing a mapping enhancement model of the video pixel and the image pixel of the key frame image information by machine learning; and at the position of a non-key frame image of the collected video information, converting the video pixel by the mapping enhancement model.

Step 4: The enhanced video is stored.

When the first type of multimedia information is image information and the second type of multimedia information is video information, the second type of multimedia information is processed according to the first type of multimedia information, which includes the collected video information that is stored according to the collected image information. The stored content includes at least one of the video information obtained after the collected video information is enhanced according to the collected image information; the collected video information and the collected image information; the collected video information and an enhancement model for performing enhancement processing on the video information; and the video information obtained after the collected video information is enhanced according to the collected image information, and the collected image information.

The terminal apparatus generates the collected original video information, the key frame image information, the mapping enhancement model with enhanced resolution, and the enhanced video information.

The first mode includes, after the step 3, directly storing the enhanced video information, without saving the key frame image information. That is, enhancement is completed before the storage process. When the enhanced video information is stored, pictures in the original video frames are displayed in the video box, and a buffering icon is displayed above the video box. The buffering icon indicates that enhancement is ongoing. When the buffering process is completed, the storage process ends.

The second mode includes saving the original video information and the learned enhancement model first, without saving the key frame image information. The enhancement of the step 3 is performed when the user opens the video. Since each video segment has one enhancement model, all the enhancement models are stored separately. A mapping table is established between the enhancement models and the video frame numbers.

The third mode includes storing the original video information and the shot key frame image information first. In this mode, it is unnecessary to process the original video information before storing. The storage process can be completed once the shooting process is completed. The terminal apparatus can automatically arrange the processing time according to the free/busy state of the processor. The original video information is enhanced as described in step 3 by the learning enhancement model. The key frame image information is deleted after the video information is enhanced. This storage mode is also a method for compressing and storing high-definition video. To save the storage space of a video, video information of low resolution and image information of high resolution can be stored to replace the mode of direct storage of video information of high resolution. The video information of low resolution and the image information of high definition can be respectively obtained by collecting video information and image information simultaneously by the two cameras. The image information of high resolution can also be obtained by directly extracting a key frame from the video information of high resolution. The original video information of high resolution is compressed to obtain video information of low resolution. Based on the video information of low resolution and the associated image information high resolution, video information of high resolution can be obtained by resolution enhancement.

The fourth mode includes, after the video information is enhanced as described in the step 3, storing the enhanced video information and saving the key frame image information. The enhanced video information can be acquired in any one of the former three storage modes. The key frame image information can be saved in a video sequence together with the video information, and can also be saved in a photo list. An association is established between the video information and the image information. By saving the key frame image information, some image information of high definition can be provided to users for other operations.

The storage mode is set according to at least one of determining the storage mode according to the detected setting operation; determining the storage mode according to a presetting (e.g., system default setting); and self-adaptively determining, in a way of self-adaptive storage setting, the storage mode.

A self-adaptive storage setting may be determined by at least one of a relevant state of an apparatus and a storage setting historical data.

The setting operation is achieved by a voice of the user, keys, gestures, and control of an external controller. The relevant state of an apparatus includes apparatus information such as storage space and power.

With regard to how to set the first storage mode, three setting methods are provided described herein. The terminal apparatus can select the first storage mode according to one of the following three methods. The first method is to use the terminal apparatus default setting. The second method is that the terminal apparatus receives the setting or alteration of the storage mode by the user by voice, a key, an external controller or more, or combinations thereof. The third method is that the terminal apparatus self-adaptively sets the storage mode according to the storage space, power and historical data.

As for system default setting, the terminal apparatus sets one of the four storage modes as a default value. Videos and images are stored by the default storage mode until the terminal apparatus receives an instruction for altering the storage mode.

As for setting by voice under user interaction, e.g., the terminal apparatus presets a voice instruction "store the enhanced video", if the terminal apparatus receives the instruction, the terminal apparatus performs voice recognition on the voice-activated instruction, and determines to set the storage mode as storing the enhanced video information. As for setting by a key under user interaction, the key can be a hardware key, e.g., the UP volume key and the DOWN volume key are used to select the four storage modes, and the "HOME" key is used to determine that the storage mode selected currently is the final storage mode. The key can also be a virtual key, e.g., a button or a menu on a screen, a virtual keyboard on the interactive interface, etc. When the terminal apparatus detects an event that the user clicks the virtual key, the selected storage mode is confirmed.

As for setting by a gesture under user interaction, the terminal apparatus sets in advance a certain gesture to select the enhancement mode. The gesture may include a screen gesture, e.g., sliding the screen from left to right or from right to left to alter the storage mode. The gesture may also include an air gesture, including shaking/tilting the terminal apparatus. Different directions of shaking/tilting indicate different meanings. For example, shaking up and down indicates altering the storage mode, and tilting left and right indicates altering the storage mode. The gesture can be a single gesture and can also be an arbitrary combination of any gestures, e.g., the enhancement mode can be selected by sliding in the transverse direction by the right hand, and meanwhile shaking up and down indicates that the storage mode selected currently is determined as the final storage mode.

As for setting by an external controller by the user, the external controller may include a stylus, a remote control, a smart watch, smart glasses, a smart helmet, smart clothes, a remote apparatus, etc. These controllers can communicate with the interactive interface by WiFi and/or infrared and/or BT and/or a data network. For example, some keys on the remote control indicate setting different storage modes. Upon detecting that the user has clicked a key, the controller sends the detection result to the interaction control system to set the storage mode.

As for self-adaptive setting, according to the storage space, different storage modes can be selected according to the storage space. If the remaining storage space is less than a certain threshold (e.g., less than 50%) of the storage space of the terminal apparatus, the third compression and storage mode is set as the storage mode. If the remaining storage space is greater than a certain threshold (e.g., greater than 50%) of the storage space of the terminal apparatus, the storage mode is independent of the storage space.

As for self-adaptive setting, according to the power, the storage mode can be controlled according to power. When the power is less than a certain threshold (e.g., less than 50%), a storage mode with low power consumption, i.e., a second or third storage mode, is selected, wherein, the second storage mode is the original video and the learning mode without enhancing the video. The third storage mode in which the original video information and the key frame image information, i.e., the original video and the learning mode, are directly stored, without enhancing the video. When the power is less than the second predetermined power (e.g., less than 15%), the third storage mode with the least power consumption is selected, that is, storing the original video and the key frame image information. If the power is greater than a certain threshold (e.g., greater than 50%), the storage mode is independent of the power.

As for self-adaptive setting, according to the storage setting historical data, the user's preference is analyzed according to the previous storage modes set by the user, and a storage mode preferred by the user is set.

Step 5: The video is played.

In response to a received play trigger operation, the video information is played based on a play mode matched with the stored content, wherein the play mode includes at least one of when the enhanced video information is stored, the enhanced video information is directly played; when the collected video information and the collected image information are stored, the collected video information is played after being enhanced according to the collected image information; when the collected video information and the enhancement model are stored, the collected video information is played after being enhanced by the enhancement model; and when the enhanced video information and the collected image information are stored, the enhanced video information and the collected image information are associatively played.

For example, the terminal apparatus plays the stored video according to the detected play trigger operation.

Scheme 1: The storage mode corresponding to the play mode stores the enhanced video information. When the terminal apparatus detects a user's operation of opening a video, the enhanced video information is directly opened. When the terminal apparatus detects a user's operation of clicking to play, e.g., when the terminal apparatus detects a user's operation of clicking a Play button, the terminal apparatus can play the video immediately. In this way, the user can directly view the enhanced effects.

Scheme 2: The storage mode corresponding to the play mode stores the original video information and the enhancement model. When the terminal apparatus detects a user's operation of opening, the terminal apparatus opens the combination of the original video information and the enhancement model. When the terminal apparatus detects a user's operation of clicking to play, e.g., when the terminal apparatus detects a user's operation of clicking a Play button, the terminal apparatus starts to enhance the original video information on the basis of the enhancement model. The operation is completed within the permissible time for buffering, and the enhanced video information is played.

Scheme 3: The storage mode corresponding to the play mode stores the original video information and the key frame image information. When the terminal apparatus detects a user's operation of opening, the terminal apparatus opens the combination of the original video information and the shot key frame image information. When the terminal apparatus detects a user's operation of clicking to play, e.g., when the terminal apparatus detects a user's operation of clicking a play button, if the terminal apparatus has completed the enhancement, the terminal apparatus can play the video directly so that the user can view the enhanced video information. If the terminal apparatus completes a part but not all the enhancement step in the background, a period of time is required for buffering in order to enhance the video, when a user's operation of clicking to play is received. At an end of the enhancement, the playing of the enhanced video information is started, so that the user can view the enhanced video information.

Scheme 4: The storage mode corresponding to the play mode stores the enhanced video information and the key frame image information. When the terminal apparatus detects a user's operation of opening, the terminal apparatus opens the combination of the enhanced video information and the key frame image information. The play mode of the enhanced video information not only includes the former three play modes, but more play modes can be obtained on the basis of the key frame image information. After the association between the video information and the image sequence is established, the video information can be linked by the image sequence, and the image sequence can also be linked by the video information. By pressing the key frame image sequence or the video Play button for a predetermined time, skip between such images and videos can be completed. Such skip can also be completed by setting by voice, a gesture, or more.

Scheme 5: When the terminal apparatus detects a user's operation of opening, the terminal apparatus opens the combination of the enhanced video and the key frame. The position at which each key frame occurs in the video is recorded during the storage process. By clicking a certain image in the key frame sequence, the user can be linked to a corresponding video position, and play the video from this position. The scheme can be, but not limited to, pressing the video for a predetermined time until a key frame sequence occurs, and clicking a certain image in the sequence to start to play the video. When the video is viewed, a combination of images is presented to the user. The user can click the image sequence to view the images, and can click the images to play the video.

Scheme 6: When the terminal apparatus detects a user's operation of opening, e.g., the terminal apparatus detects a user's operation of clicking to play, the terminal apparatus displays the buffering icon and performs resolution conversion. This conversion can include, but not limited to, the following methods. The first method plays the video from the beginning after the whole video segments are converted into video information of high resolution. The second method plays the video when part of the video is buffered and perform video conversion while playing the video; this method is restricted by the processing ability of the cell phone, and the play process may be interrupted for buffering.

The third method includes clicking a certain image in the key frame image information, and only the video segments following the video position corresponding to this image information are converted; the buffering method can be any one of the two former methods. The video is played from the video position corresponding to the image information. The fourth method includes a user selecting and viewing the video information of low resolution, and if the user is very interested in the video, the video of high resolution can be played by pressing a button or by other operations. After selecting to play video of high resolution, the video can be played according to the three former play modes. The compressed video can also be shared to reduce the power consumption of the cell phone. A variety of play selections can be available when the video is played in other devices.

Embodiment 2

A Color Enhancement Mode in the Image-Enhanced Video Mode

With respect to enhancing the brightness and color of a video, at present, videos shot by a terminal apparatus in low light environment are generally low in brightness and poor in quality. Videos are processed mostly by some prior models, e.g., by setting a nonlinear mapping table.

Figure 2:
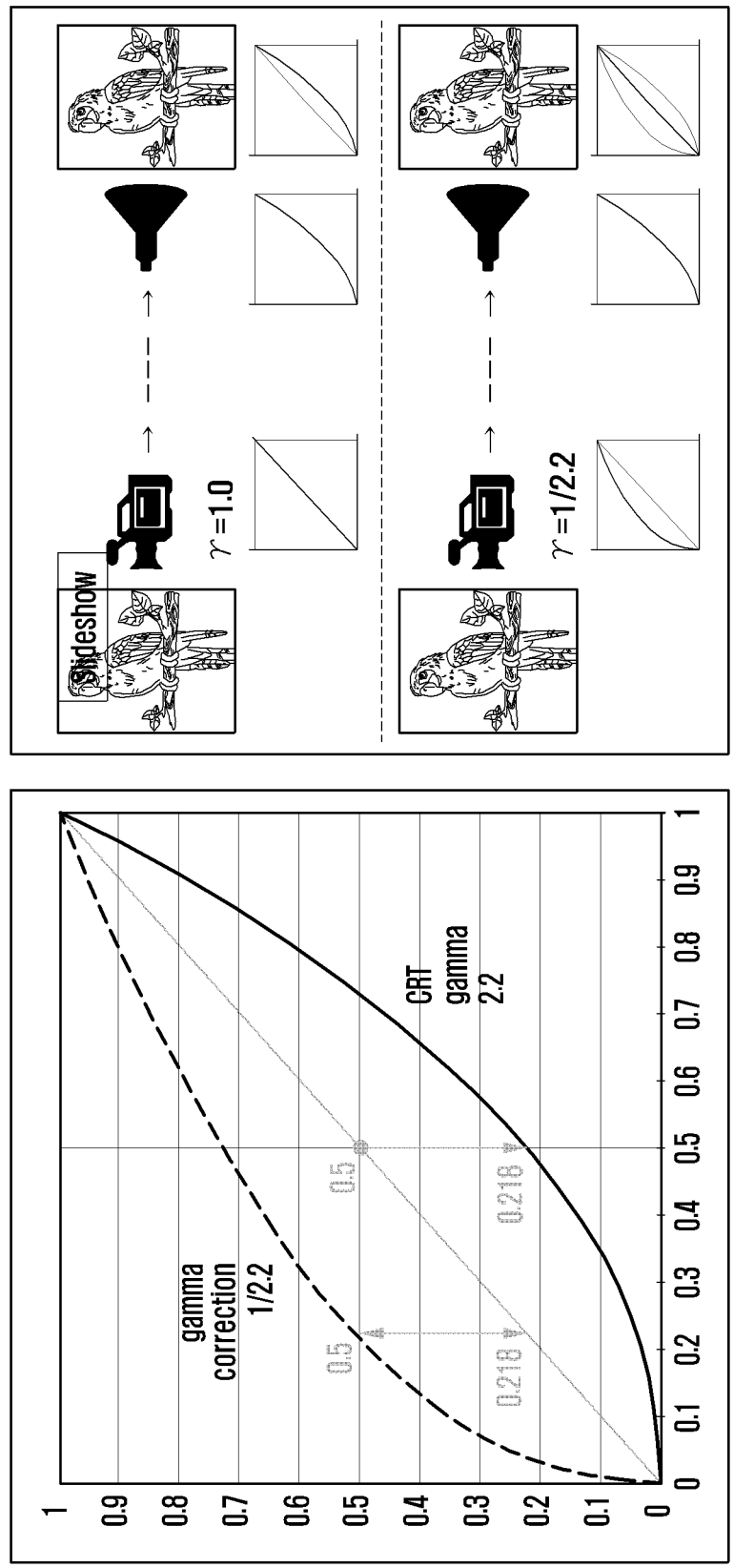
FIG. 2 is a diagram of adjusting conversion curve brightness by performing enhancement processing on video brightness and color.

As shown in FIG. 2, by calculating each frame of images according to the brightness information, a histogram equalization mapping table of the frame of images is obtained. A conversion curve is obtained by weighting a preset mapping table and the calculated mapping table. A video frame is enhanced by adjusting brightness of pixel points in the video frame according to this curve. Alternatively, a transmission parameter of a video is obtained by preprocessing by performing Gamma correction on the video, and the final enhancement effects are obtained by using an improved image degradation/restoration model according to the original video and the transmission parameter obtained by preprocessing.

In foregoing methods, enhancement is performed on the basis of the information which is carried in the video, and the enhancement intensity is to be adjusted by artificially setting a parameter.

With respect to adjusting video brightness and color, change in brightness and color can be achieved by adjusting each frame of images in the video by using some preset mapping curves. However, the basis of the change thereof is also restricted by the preset parameters, and whether the change trend is applicable to various scenes is left to be deliberated. In different light conditions, for example, the adjustment parameters are required to be self-adaptively adjusted. Untrue change results may occur in the preset mapping curves, e.g., videos shot at night are adjusted to an extreme brightness level or color distortion can occur in some image regions.

With respect to Embodiment 2, the color enhancement mode in the image-enhanced video mode is enabled, and the two cameras are activated to collect image information and video information. A main camera and an auxiliary camera are set, a collection parameter of the cameras and an enhancement policy parameter are set, and the selection of the key frame image information is set. Color of the video is enhanced according to the enhancement policy parameter and the key frame image information. The collected results are compressed, transferred, and subsequently played.

Step 1: The color enhancement mode in the image-enhanced video mode is enabled.

An enabling mode similar to that of Embodiment 1 is adopted in step 1, and the difference lies in the instruction description content of the enabling function. For example, the instruction for voice enabling is "enable video color enhancement." The instruction for key enabling is pressing the Home key for a predetermined time. The Home key being a button for video color enhancement among the virtual keys. The handheld enabling instruction is a shaking of the terminal.

Step 2: One camera of the binocular camera is used for shooting image information, and the other camera is used for shooting video information.

This step includes setting a collection parameter and an enhancement policy parameter, setting a main camera and an auxiliary camera, setting parameters of the collected images and videos, and setting the selection of the key frame image information.

Step 2.1: A main camera and an auxiliary camera are set.

Setting the main camera and the auxiliary camera can be similar to setting the main camera and the auxiliary camera in the step 2.1 of Embodiment 1.

Step 2.2: A collection parameter of the camera and an enhancement policy parameter are set.

Setting the collection parameter of the camera and the enhancement policy parameter can be similar to setting the collection parameter and the enhancement policy parameter in the step 2.2 of Embodiment 1.

Step 2.3: A key frame collection frequency is self-adaptively set.

Selecting the key frame can be similar to selecting a key frame in the step 2.3 of Embodiment 1.

Step 3: Color of the video information is enhanced.

A video is divided into segments by taking a key frame as boundary, and a video segment is enhanced by using key frame images beside this video segment. The color enhancement mode may include color enhancement based on multi-view reconstruction and color enhancement based on machine learning.

As for color enhancement based on multi-view reconstruction, the matching relation between a video pixel and an image pixel is established by multi-view reconstruction, and the video pixel is replaced with the image pixel.

As for color enhancement based on machine learning, a mapping model of a video pixel and an image pixel is established at a key frame by machine learning, and the video pixel is converted at a non-key frame by the mapping model.

Step 4: The video is stored.

The terminal apparatus generates the collected original video information, the key frame image information, the color enhancement model, and the enhanced video information. With regard to these different types of data, the storage mode may include four modes, i.e., the same four storage modes introduced in the step 4 of Embodiment 1.

Setting the storage mode is similar to that in the step 4 of Embodiment 1, except that this enhancement mode does not change the video resolution. Among the four storage modes, the enhanced video information in the first storage mode occupies the minimal space. When the storage space is less than a certain threshold (e.g., less than 50% of the storage space of the terminal apparatus), the first storage mode is set; other setting methods such as those described above can also be used.

Step 5: The video is played.

After the data collected by the binocular camera is compressed, stored, and transferred, video information of high quality is decompressed and played in the play stage. With regard to different storage modes, the play mode thereof includes, but is not limited to, one of the five modes introduced in step 5 of Embodiment 1. The five play modes are the same as the five modes described in the step 5 of Embodiment 1.

Embodiment 3

The Enhancement Mode is a Brightness Enhancement Mode in the Image-Enhanced Video Mode With respect to Embodiment 3, the brightness enhancement mode in the image-enhanced video mode is enabled, and the two cameras are activated respectively to collect image information and video information. A main camera and an auxiliary camera are set, a collection parameter of the cameras and an enhancement policy parameter are set, and the selection of the key frame image information is set. Brightness of the video is enhanced according to the enhancement policy parameter and the key frame image information. The collected results are compressed, transferred, and subsequently played.

Step 1: The brightness enhancement mode in the image-enhanced video mode is enabled.

An enabling mode similar to that of Embodiment 1 is selected in step 1, and the difference lies in the instruction description content of the enabling function. For example, the instruction for voice enabling is "enable video brightness enhancement." The instruction for key enabling includes pressing the End key for a predetermined time. The End key is a button for video brightness enhancement among the virtual keys. A handheld enabling instruction includes jittering the terminal.

Step 2: One camera of the binocular camera is used for shooting image information, and the other camera is used for shooting video information.

This step includes setting a collection parameter and an enhancement policy parameter, setting a main camera and an auxiliary camera, setting parameters for collecting images and videos, and setting the selection of the key frame image information.

Step 2.1: A main camera and an auxiliary camera are set.

Setting the main camera and the auxiliary camera can be similar to setting the main camera and the auxiliary camera in the step 2.1 of Embodiment 1.

Step 2.2: A camera parameter and an enhancement policy parameter are set.

Setting the collection parameter of the camera and the enhancement policy parameter can be similar to setting the collection parameter and the enhancement policy parameter in the step 2.2 of Embodiment 1.

Step 2.3: A key frame is selected.

Selecting the key frame can be similar to selecting a key frame in the step 2.3 of Embodiment 1.

Step 3: Brightness of the video is enhanced.

Brightness enhancement is performed in an L channel of the Lab color model or in the value (V) channel of the hue, saturation, and value (HSV) color model. First, color space conversion is performed on an image or a video, and an L channel component or a V channel component is extracted to be independently enhanced. A video is divided into video segments by taking a key frame as boundary, and a video segment is enhanced by using key frame images in addition to the video segment. The enhancement mode includes, but is not limited to, enhancement based on multi-view reconstruction and enhancement based on machine learning.

As for brightness enhancement based on multi-view reconstruction, the matching relation between a video pixel and an image pixel is established by multi-view reconstruction, and the video pixel brightness is replaced with the image pixel brightness.

As for brightness enhancement based on machine learning, a mapping model of the video pixel brightness and the image pixel brightness is established at the position of a key frame by machine learning, and the video brightness is converted at a non-key frame by the mapping model.

Step 4: The video is stored.

The terminal apparatus generates four types of data: the collected original video information, the key frame image information, the brightness enhancement model, and the enhanced video information. With regard to different types of data, the storage mode may include the four storage modes introduced in the step 4 of Embodiment 1.

Step 5: The video is played.

Decompressing and playing a video is the same as the playing a video in the step 5 of Embodiment 2.

Embodiment 4

Figure 3:
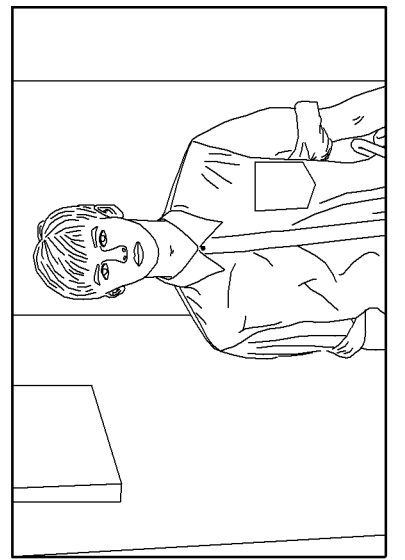
FIG. 3 is a diagram of de-noising a video frame by blur kernel estimation of a blurred image.
Figure 3:
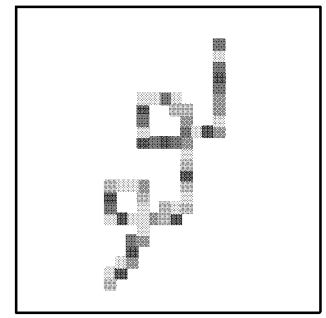
Figure 3:
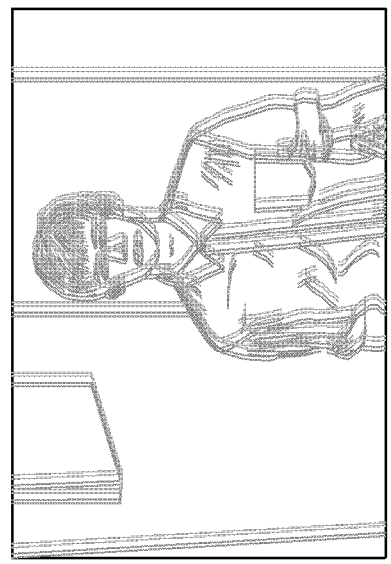

The Enhancement Mode is a De-Noising Enhancement Mode in the Image-Enhanced Video Mode With respect to video de-noising and de-blurring, since an exposure duration of each frame of video is short, there is generally more noise in a video than in an image. With regard to the prior art, video frames are de-noised by image de-noising in order to eventually achieve the purpose of video de-noising. Assuming that the noise is Gaussian noise, the noise may be removed by conventional filtering methods. The noise can also be removed by dictionary learning. Video blur might be resulted from the following factors: 1) when a video is shot by holding a cell phone in hand, jittering of the hand will lead to blur; 2) the de-noising process may lead to blur in some regions; and 3) out-of-focusing may lead to defocusing blur. Generally, the blur kernel (see (b) of FIG. 3) of the blurred image (see (a) of FIG. 3) is estimated, and the blurred image is de-convoluted by the obtained blur kernel to obtain a clear image (see (c) of FIG. 3.

Under the same shooting environment, when compared with image information, noise in video pictures in video frames is relatively obvious. Video segments of low quality are de-noised by key frame image information of high quality with similar contents, so as to improve the video quality. The specific implementation has the following steps.

Step 1: The de-noising enhancement mode in the image-enhanced video mode is enabled.

An enabling mode similar to that of Embodiment 1 is adopted in step 1, and the difference lies in that there is difference in some instruction descriptions and settings of thresholds. The specific differences are described below.

Different instruction descriptions are used when the user enables the video de-noising mode. For example, the instruction for voice enabling is "enable video de-noising." The instruction for key enabling is pressing the Home key for a predetermined time. The Home key is a button for video de-noising among the virtual keys. The handheld enabling instruction is a shaking of the terminal apparatus.

When the terminal apparatus self-adaptively enables a mode according to the relevant state of an apparatus and the mode enabling historical data, different threshold settings are used, e.g., power threshold, threshold number of times, etc.

When the terminal apparatus self-adaptively enables the video de-noising mode in a way of self-adaptive mode matching, the following three methods can be used. One method includes the terminal apparatus detecting the shot environment, and if the shot environment is detected as a low light environment, when shooting at night, the de-noising enhancement mode is enabled. The second method includes the terminal apparatus detecting the shooting parameters of cameras, and if the photosensitivity is greater than a certain threshold, the de-noising enhancement mode is enabled. The third method can be a combination of the methods one and two when both conditions are met and the de-noising enhancement mode is enabled. That is, when the light intensity in the shot environment is less than a certain threshold and the photosensitivity is greater than a certain threshold, the de-noising enhancement mode is enabled.

When the terminal apparatus self-adaptively enables the de-noising mode, according to the content collected in real time, the SNR of the shot frame is calculated, and if the SNR is lower than a certain threshold, the video de-noising mode is enabled.

Step 2: One camera of the binocular camera is used for shooting images, and the other camera is used for shooting videos.

This step includes setting a main camera and an auxiliary camera, setting a camera parameter and an enhancement policy parameter, setting parameters for collecting images and videos, and setting the selection of the key frame information.

Step 2.1: A main camera and an auxiliary camera are set.

Setting the main camera and the auxiliary camera can be similar to setting the main camera and the auxiliary camera in the step 2.1 of Embodiment 1.

Step 2.2: A collection parameter of the camera and an enhancement policy parameter are set.

Setting the collection parameter of the camera and the enhancement policy parameter can be similar to setting the collection parameter and the enhancement policy parameter in the step 2.2 of Embodiment 1.

Apart from the foregoing ways of setting a parameter, a new method for setting a parameter is provided with regard to the de-noising mode. More particularly, one camera of the binocular camera is used to collect image information, and the other camera is used to collect video information, so as to de-noise the video information. The resolution of image collection, exposure duration and photosensitivity are mainly set. In consideration of energy conservation and algorithm design, the resolution of image information collected by the auxiliary camera should be consistent with that of the video information. If the minimum resolution of the image information is greater than that of the current video information, the minimum resolution of the image information is used for collection.

Permitted by the power state of the terminal apparatus, the exposure duration can be adjusted according to the movement state of the terminal apparatus. If the terminal apparatus is detected to be in a stable shooting state by the internal sensor of the terminal apparatus, the exposure duration is prolonged. For example, the maximum value in a range of exposure duration can be selected to increase the brightness of the image information and the video information, so as to mitigate noise jamming. If the terminal apparatus is detected to be in a jittering state or in other movement trends by the sensor, the exposure duration is appropriately shortened to prevent blur in the image information. Such blur will affect the de-noising effects of the video information.

Step 2.3: Key frame image information is selected.

Selecting the key frame can be similar to selecting a key frame in the step 2.3 of Embodiment 1.

With regard to the de-noising mode, if the light intensity is low, the key frame collection frequency is increased. If the light intensity is high, the key frame collection frequency is decreased. The movement state of the terminal apparatus is detected by the respective sensor of the terminal apparatus. If the movement amplitude is higher than a certain threshold, the collection frequency is increased to ensure that adequate key frame images of high quality are obtained. If the movement of the terminal apparatus occurs during the collection of a key frame, another piece of key frame image information is collected at the end of the movement, as an alternative to the former key frame image information. When blur occurs in the former key frame image information, the alternative key frame image information can be used to de-noise the video segments, so as to ensure the de-noising effect.

Step 3: The video is de-noised by using a key frame sequence.

When the indicators to be enhanced include noise, enhancement includes enhancement based on dictionary reconstruction, and/or enhancement based on depth learning.

When a blurred frame to be processed is detected in the original video information, the blurred frame to be processed is determined to be de-blurring enhanced. The blurred frame to be processed is detected by at least one of information including an apparatus movement state when a video frame is collected; a focusing information when a video frame is collected; and classification result of classifying the collected video information by a classifier.

Specifically, each key frame of high quality corresponds to one video subsequence. Assuming that there is a video key frame 1, and 60 frames are included in a video subsequence corresponding to the video key frame 1, the video is de-noised by one or more adjacent frames of key frame images. For example, the 60 frames of images are de-noised by the key frame 1, and the de-noising method may include de-noising based on dictionary reconstruction, e.g., NLM (nonlocal means) algorithm or de-noising based on depth learning, e.g., CNN (convolutional network).

When compared with a traditional de-noising method, a reference image, i.e., a key frame image, is used to de-noise the video, thereby providing an improvement to existing methods. The above-mentioned two methods will be described in detail below.

1): De-Noising Based on Dictionary Reconstruction, i.e., Improved NLM.

If the input key frame image and video frame image are inconsistent in resolution, the dimension of the key frame image and the dimension of the video are unified. The video is scaled or the key frame image is scaled, or the image and the key frame image are both scaled, to make the key frame image and the video consistent in dimension. The parallax between the key frame image and each frame in a video segment is calculated by stereo matching to align pixels in the video frame with pixels in the key frame image, i.e., to obtain the position relation of consistent pixels between images. If the input key frame image and video frame image are consistent in resolution, the parallax is calculated directly by stereo matching to align images. After the position relation between pixels in the key frame image and the video frame image is obtained, similar blocks are searched in the images.

As for each video frame, a pixel block p having a size of a*a is selected by taking a pixel point in the frame of images as the center, which can be set in advance and can also be self-adaptively adjusted according to the size of the image or other factors. On the basis of the obtained position relation between the consistent pixels in the video frame and the key frame image, the position of this pixel in the video frame is found in the key frame image. By taking this position as the center and selecting a neighboring block having a size of b*b, wherein can be set in advance and can also be self-adaptively adjusted according to the size of the image and other factors.

A pixel block q having a size of a*a is selected by taking each pixel in this neighboring block as the center, and b*b pixel blocks can be obtained. The distance between the pixel block p and b*b pixel blocks is calculated. The distance can be the sum of squared Euclidean distances, i.e., the sum of squared difference in values of pixels at the same position among blocks. For example, if a is set as 8, the distance between pixel blocks is the sum of squared difference in values of 64 pixels in the low quality pixel blocks and of 64 pixels in the key frame pixel block. If the distance is less than a certain threshold, the two pixel blocks are considered similar. All found similar blocks having a distance less than the threshold are labeled as a set $\Omega$; the weight of the similar blocks is required to be calculated. The weight w of each block is calculated according to the distance between these similar blocks. The greater the distance is, the smaller the weight is. The weight can be calculated by a Gaussian function. Pixel blocks with high noise are reconstructed by these similar pixel blocks. That is, the similar blocks are weighted averaged. A certain weight can also be allocated to the original pixel blocks. The original pixel blocks account for a certain proportion during the reconstruction to ensure the consistency between the reconstructed pixel blocks and the original pixel blocks. By this method, each pixel in the video frame is re-estimated based on block reconstruction to de-noise each video frame. The whole video segment is de-noised by de-noising each frame in the whole video segment.

Since there is a parallax between the key frame image and the video frame, for some pixels in the video frame, no corresponding pixels can be found in the key frame. As for these pixels, it is often difficult to find similar pixel blocks in images of high quality to reconstruct them. As for these pixel points, by the initial NLM method, similar pixel blocks can be searched in the video frame containing these pixels for reconstruction, in order to de-noise those pixel points. In order to save in the processing time, the relation between video frames can be considered. If there is no dramatic change in inter-frame content in the video segments, pixels in a plurality of video frames can be reconstructed simultaneously. That is, same pixel points in different frames can be reconstructed by using unified similar pixel blocks in order to simultaneously de-noise a plurality of pixel points.

2): De-Noising Based on Depth Learning

If the input key frame image and video frame image are inconsistent in resolution, the dimension of the key frame image and the dimension of the video are unified by the same steps as those in the first de-noising method. The parallax between the key frame image and each frame in a video segment is calculated by stereo matching to align pixels in the video frame with pixels in the key frame image. According to the aligned results, the key frame image and video frame are cropped to obtain a pair of images having same size and same content, one being a noise-free image obtained by cropping the key frame image, the other being a noisy image obtained by cropping the video frame image. Pixel points at a same position of the two images are consistent in content; however, one pixel point is from the key frame image of high quality and called noise-free pixel point, and the other pixel point is from the video frame image of low quality and called a noisy pixel point. By selecting corresponding pixel blocks from a plurality of pairs of images, a plurality of pairs of pixel blocks can be obtained. On the basis of these pixel blocks, by the existing de-noising method based on depth learning, a convolution net having a de-noising function is obtained by training in order to de-noise pixel blocks in the video frame. By this model, a large quantity of samples can be collected offline to obtain, by training, an initial model which is preinstalled in the terminal apparatus. By the obtained image pairs, this model is corrected to de-noise the video frame. A model can also be trained online to de-noise the video frame.

Step 4: The video is stored.

The terminal apparatus generates four types of data: the collected original video information, the key frame image information, the de-noising enhancement model, and the enhanced video information. With regard to the different types of data, the storage mode includes, but is not limited to, the four storage modes introduced in the step 4 of Embodiment 2.

Setting the storage mode is similar to that in the step 4 of Embodiment 2.

Step 5: The video is played.

After the data collected by the binocular camera is compressed, stored, and transferred, video information of high quality is decompressed and browsed in the play stage. With regard to different storage modes, the play mode includes, but is not limited to, one of the five modes introduced in step 5 of Embodiment 2.

Embodiment 5

A De-Blurring Enhancement Mode in the Image-Enhanced Video Mode

When a video is shot, picture blur can result from a plurality of factors including: 1) jittering of hands when holding a terminal apparatus for shooting; 2) picture blur resulting from a moving object; and 3) blur in a target region resulting from focusing failure. With regard to Embodiment 5, one camera of the binocular camera collects images, and the other camera collects videos. Videos are de-blurred by using the images to obtain a video of high quality.

Step 1: The terminal apparatus determines to use a binocular camera to achieve image-assisted video de-blurring, and the de-blurring enhancement mode in the image-enhanced video mode is enabled.

An enabling mode similar to that of Embodiment 1 is adopted in step 1, and the difference lies in that there is difference in some instruction descriptions and settings of thresholds. The specific differences are described below.

Different instruction descriptions are used when the user enables the video de-blurring mode. For example, the instruction for voice enabling is "enable video de-blurring." The instruction for key enabling includes pressing the Home key for a predetermined time. The Home key is a button for video de-blurring among the virtual keys. The handheld enabling instruction includes shaking of the terminal.

When the terminal apparatus self-adaptively enables a mode according to the relevant state of an apparatus and the mode enabling historical data, different threshold settings are used, e.g., power threshold, threshold number of times, etc.

When the terminal apparatus self-adaptively enables the video de-blurring mode according to the collection environment (i.e., shooting environment) and a parameter, the following three methods can be used. One method includes the terminal apparatus detecting the shooting terminal by the existing methods. If the shooting terminal is in a moving state, e.g. jittering of the shooting terminal resulting from jittering of hands holding the terminal, the video de-blurring enhancement mode is enabled. The second method includes the terminal apparatus detecting the shooting parameter. If the video collection exposure duration is higher than a certain threshold (greater than 300 ms), the video de-blurring enhancement mode is enabled. The third method can be a combination of the first two methods, and if both conditions are met, the video de-blurring enhancement mode is enabled. That is, if the shooting terminal is in a moving state and the exposure duration is greater than a certain threshold, the video de-blurring enhancement mode is enabled.

When the terminal apparatus self-adaptively enables the video de-noising mode, according to the relevant content collected in real time, the blur level indicator of the shot frame is calculated. If the blur level indicator is less than a certain threshold, the video de-blurring mode is enabled.

Step 2: One camera of the binocular camera is used for shooting images, and the other camera is used for shooting videos.

This step includes setting a main camera and an auxiliary camera, setting a camera parameter and an enhancement policy parameter, setting parameters for collecting images and videos, and setting the selection of the key frame information.

Step 2.1: A main camera and an auxiliary camera are set.

Setting the main camera and the auxiliary camera can be similar to setting the main camera and the auxiliary camera in the step 2.1 of Embodiment 1.

Step 2.2: A collection parameter of the camera and an enhancement policy parameter are set.

Setting the collection parameter of the camera and the enhancement policy parameter can be similar to setting the collection parameter and the enhancement policy parameter in the step 2.2 of Embodiment 1.

Apart from the foregoing way of setting a parameter, in this embodiment, a new method for setting a parameter is provided with regard to the de-blurring mode. More particularly, one camera of the binocular camera is used to collect images and the other camera is used to collect videos, in order to de-blur the videos. The resolution of image collection, exposure duration and photosensitivity are set. In consideration of energy conservation and algorithm design, the resolution of the images collected by the auxiliary camera should be consistent with that of the video information. If the minimum resolution of the image information is greater than that of the current video information, the minimum resolution of the image is used for collection. If the brightness of the shot environment is greater than or equal to a certain threshold, the video and image exposure duration is shortened, and the photosensitivity is appropriately increased to reduce the possibility of occurrence of picture blur. If the terminal apparatus is detected to be in a jittering state or other movement trends by the sensor of the terminal apparatus, the exposure duration is appropriately shortened to prevent blur in an image. Such blur will affect the video de-blurring effects.

Step 2.3: Key frame image information is selected.

Selecting the key frame image information can be similar to selecting the key frame image information in the step 2.3 of Embodiment 1.

With regard to the de-blurring mode, a new way of selecting a key frame is provided in this embodiment. If the exposure duration becomes longer, the possibility of occurrence of blur in a video becomes higher, and thus, the key frame collection frequency is increased. If the exposure duration becomes shorter, the key frame collection frequency is decreased. The movement state of the terminal apparatus is detected by the respective sensor of the terminal apparatus. If movement occurs in the terminal apparatus during the key frame collection, another key frame is collected at the end of the movement, as an alternative to the former key frame. When blur occurs in the former key frame, the alternative key frame can be used to de-blur the video segments, so as to ensure the de-blurring effect.

Step 3: The video is de-blurred by using a key frame sequence.

When the indicators to be enhanced include blur, enhancement includes enhancement based on blur kernel estimation, and/or enhancement based on depth learning.

When a blurred frame to be processed is detected in the collected video information, the blur indicator corresponding to the blurred frame to be processed is determined to be enhanced. The blurred frame to be processed is detected by at least one of information including: apparatus movement state when a video frame is collected; focusing information when a video frame is collected; and classification result of classifying the collected video information by a classifier.

Specifically, video frame pictures, in which blur will or can occur, are determined. The determination can be, but not limited to, made by one of three schemes.

First, the respective movement state of the terminal apparatus is detected according to a sensor built in the terminal apparatus, and if a movement amplitude is greater than a certain threshold, the video frames shot in this period of time is determined as blurred frames to be processed. Second, a frame that failed in focusing is detected, and if the user specifies a focused region and the focus moves during the shooting process (that is, the focus is out of the target region), the target region is considered as a blurred region to be processed. Third, by machine learning, a classifier is obtained by training a large quantity of blurred images and clear images. The video frames are classified by the obtained classifier, and video frames classified as blurred images are blurred frames to be processed.

If blurred frames are detected, these blurred frames are de-blurred. More particularly, clear key frame images similar to the blurred video frames in terms of content are found. The de-blurring may include de-blurring based on blur kernel estimation or de-blurring based on depth learning.

When compared with traditional de-blurring methods, a reference image, i.e., key frame image information, is used to de-blur the blurred video information, thereby improving on the existing method. The above-mentioned two de-blurring ways are described in detail below.

1): De-Blurring Based on Blur Kernel Estimation

If the input key frame image and the video frame image are inconsistent in resolution, the dimension of the key frame image and the dimension of the video are unified by the same steps as in the de-noising method. The parallax between the key frame image and each frame in a video segment is calculated by stereo matching to align pixels in the video frame with pixels in the key frame image. According to the aligned results, the key frame image and the blurred video frame are cropped to obtain a pair of images having the same size and the same content, one being a clean image obtained by cropping the key frame image, the other being a blurred image obtained by cropping the video frame image. An image pair having a large size can be cropped, and a plurality of image pairs having a small size can be cropped. Blur kernel estimation is performed on each pair of images by the least square optimization method or other optimization methods. If there are a plurality of pairs of images, a plurality of blur kernels can be obtained by estimation. If one blur kernel is obtained, the frame of images is de-blurred by the blur kernel. If a plurality of blur kernels are obtained, an average blur kernel can be obtained by weight averaging the plurality of blur kernels, and the frame of images are de-blurred by the average blur kernel.

In consideration of the consecutiveness of video frames, if several consecutive frames of images are to be de-blurred, two processing ways are provided. In a first method, each image is respectively de-blurred as mentioned above. In a second method, several inconsecutive frames of images are selected for blur kernel estimation, that is, every two frames of images are separated by several blurred images. If, with regard to the selected two nearest frames, the blur kernels obtained by estimation are similar, the blur of images between the two frames can be considered as a result of the similar blur kernels. Thus, the same blur kernel can be used for de-blurring. If the blur kernels of the two frames are not similar, one or several frames in the frames between the two frames are selected and the blur kernels thereof are recalculated for de-blurring. To save on the calculation time and save on the number of times of having to calculate the kernel, a dichotomous method can be used. In this instance, a key frame can be selected for calculation of the blur kernel, and if the blur kernels at two ends of a dichotomy interval are similar, video frames in the interval can be de-blurred by a unified blur kernel. If the blur kernels at two ends of the dichotomy interval are not similar, the interval is dichotomized again. This process is repeated until all the video frames are de-blurred.

2): De-Blurring Based on Depth Learning

During the preprocessing, the same steps as the first de-blurring way are used, and the dimension of the key frame image and the dimension of the video are unified. Pixels in a video frame and pixels in a key frame image are aligned by stereo matching. According to the aligned results, the key frame image and the video frame are cropped to obtain a pair of images having same size and same content, one being a clean image obtained by cropping the key frame image, the other being a noisy image obtained by cropping the video frame image. On the basis of a plurality of pairs of images, or by extracting corresponding pixel blocks from a plurality of pairs of images, a plurality of pairs of pixel blocks can be obtained. On the basis of these pixel blocks or image pairs, by the existing methods based on depth learning, a convolution net having a de-blurring function is obtained by training in order to de-blur the video frames. By this model, a large quantity of samples can be collected offline to obtain, by training, an initial model which is preinstalled in the terminal apparatus; and then, by the obtained image pairs, this model is corrected to de-blur the video frame. A model can also be trained online to de-blur the video frame.

Step 4: The video is stored.

The terminal apparatus generates four types of data: the collected original video information, the key frame image information, the de-blurring enhancement model, and the enhanced video information. With regard to different types of data, the storage mode includes, but is not limited to, the four storage modes introduced in the step 4 of the Embodiment 2.

Setting the storage mode is similar to that in the step 4 of Embodiment 2.

Step 5: The video is played.

After the data collected by the binocular camera is compressed, stored, and transferred, video information of high quality is decompressed and browsed in the play stage. With regard to different storage modes, the play modes thereof include, but are not limited to, one of the five modes introduced in the step 5 of Embodiment 2.

Embodiment 6

Multi-Mode Combined Image-Enhanced Video Mode (Combined Enhancement Mode)

This method further includes determining the combined enhancement mode of at least two enhancement modes among the resolution enhancement mode, the color enhancement mode, the brightness enhancement mode, the de-noising enhancement mode and the de-blurring enhancement mode, and determining a mode enhancement order corresponding to at least two enhancement modes.

The combined enhancement mode and the corresponding mode enhancement order are determined by at least one of system default setting; a way of self-adaptive mode setting; and mode setting trigger operation.

Self-adaptive mode setting is determined by one or more pieces of information of relevant state of an apparatus, mode setting historical data, relevant content collected by the multimedia collection apparatus in real time, and influence relation between enhancement modes.

The relevant content of the multimedia information collected by the multimedia collection apparatus in real time includes at least one of scene brightness and semantic content.

The mode setting trigger operation can be achieved by voice, keys and gestures under user interaction, or by an external controller.

The image-enhanced video mode includes resolution enhancement, color enhancement, brightness enhancement, de-noising enhancement, and de-blurring enhancement. The video is enhanced by the image by one of these five modes. The multi-mode combined video enhancement is enabled. A main camera and an auxiliary camera are set to respectively collect image information and video information, and a collection parameter of the camera and an enhancement policy parameter are set, and key frame image information and a mode to be enhanced are selected. The video is enhanced according to the enhancement policy parameter, the key frame image information, and the enhancement mode. The collected results are compressed, transferred, and subsequently played.

Step 1: The multi-mode combined video enhancement is enabled.

An enabling mode similar to that of Embodiment 1 is adopted in step 1, and the difference lies in the instruction description of the enabling function. For example, the instruction for voice enabling is "enable video multi-mode combined enhancement." The instruction for key enabling includes pressing the F1 key. The virtual key is a multi-mode combined enhancement button. The handheld enabling instruction is circling on the screen.

Step 2: One camera of the binocular camera is used for shooting image information, and the other camera is used for shooting video information.

This step includes setting a main camera and an auxiliary camera; setting a collection parameter of the camera and an enhancement policy parameter; selecting the key frame image information; and selecting modes to be enhanced and a mode enhancement order.

Step 2.1: A main camera and an auxiliary camera are set.

Setting the main camera and the auxiliary camera can be similar to setting the main camera and the auxiliary camera in the step 2.1 of Embodiment 1.

Step 2.2: A collection parameter of the camera and an enhancement policy parameter are set.

Setting the collection parameter of the camera and the enhancement policy parameter can be similar to setting the collection parameter and the enhancement policy parameter in the step 2.2 of Embodiment 1.

Step 2.3: Key frame image information is selected.

Selecting the key frame image information can be similar to selecting a key frame in the step 2.3 of Embodiment 1.

Step 2.4: Modes for combined enhancement and a mode enhancement order are selected.

As for system default setting, the terminal apparatus sets, by default, some modes to be enhanced and the enhancement order of these modes. For example, when the terminal apparatus is activated, only color enhancement and brightness enhancement are enabled, and the color enhancement is followed by the brightness enhancement.

As for setting by voice under user interaction, the user presets a voice instruction "multi-mode combined enhancement, and enable the video color enhancement." The terminal apparatus receives the instruction, performs voice recognition on the voice-activated instruction and determines to enable the color enhancement function. The user sends a voice instruction "multi-mode combined enhancement, disable the video color enhancement," and the terminal apparatus receives the instruction, and determines to disable the video color enhancement. The mode enhancement order is consistent with the order in which the voice instructions are sent.

As for setting using a key under user interaction, the key can be a hardware key. For example, F1 indicates enabling/disabling color enhancement, F2 indicates enabling/disabling brightness enhancement, F3 indicates enabling/disabling resolution enhancement, F4 indicates enabling/disabling de-blurring, and F5 indicates enabling/disabling de-noising. The key can also be a virtual key, e.g., a button and a menu on a screen, a virtual keyboard on an interface. Upon detecting an event of clicking the virtual key by the user, the system determines to enable/disable a certain enhancement mode. Various feature information, e.g., pressure, speed, time, frequency, etc., at which the user presses the key, can also be combined to indicate different meanings. For example, pressing lightly indicates disabling a certain enhancement mode, and pressing heavily indicates enabling a certain enhancement mode. The mode enhancement order is consistent with the order in which the keys are pressed by the user.

As for setting using a gesture under user interaction, the system sets in advance a certain gesture to enable/disable a certain enhancement mode. The gesture includes a screen gesture, e.g., sliding the screen from left to right indicates enabling/disabling the color enhancement, and sliding the screen from right to left indicates enabling/disabling the brightness enhancement. The gesture also includes an air gesture, including shaking/rolling/tilting the terminal. Different direction, angle, speed, and/or force can indicate different meanings, e.g., shaking up and down, shaking left and right, circling in air, etc. of the terminal apparatus. The above-mentioned gesture can be a single gesture, e.g., sliding in the transverse direction by the left hand indicates enabling/disabling the color enhancement. The gesture can also be an arbitrary combination of any gestures, e.g., sliding in the transverse direction by the left hand and circling in air indicates enabling/disabling the resolution enhancement. The video mode enhancement order is consistent with the order in which the user's gestures are controlled.

As for setting by an external controller, the external controller may include a stylus, a remote control, a smart watch, smart glasses, a smart helmet, smart clothes, a remote apparatus, etc. These controllers can communicate with the terminal apparatus by WiFi and/or infrared and/or BT and/or a data network. For example, some keys on the remote control indicate enabling different enhancement modes. Upon detecting that the user has clicked a key, the terminal apparatus enables/disables the enhancement mode. The video mode enhancement order is consistent with the order in which the instructions are sent by the external controller.

As for self-adaptive mode combined enhancement, according to content collected in real time, the content collected in real time includes scene brightness, moving objects, semantic content, etc. Some enhancement modes can be enabled/disabled according to scene brightness. For example, when the scene light is detected as being dim, the brightness enhancement, color enhancement, resolution enhancement, and de-noising enhancement are enabled. When the light becomes bright, the brightness enhancement, color enhancement, resolution enhancement, and de-noising enhancement are disabled. Some enhancement modes can be enabled/disabled according to moving objects. For example, when a moving object in a scene is detected as being blurred, the de-blurring mode is automatically enabled/disabled. When the dimension of the moving object in the scene is detected to be lower than a certain threshold, e.g., the length of the moving object is less than 1/10 of the image length, the resolution enhancement mode is automatically enabled. Some enhancement modes can be enabled/disabled according to semantic content. For example, if a video scene is detected as having been switched from indoors to outdoors, the color enhancement is enabled to adapt to change in white balance. For example, if there are cars (or no cars), human bodies, and characters detected in a video scene, the resolution enhancement mode is enabled/disabled.

With respect to the self-adaptive mode enhancement order setting, according to relevant content collected in real time, if the terminal apparatus self-adaptively selects a plurality of modes for enhancement, the enhancement modes are prioritized. The principle for prioritizing can include, in the shot environment, which mode is more urgent to be enhanced. That is, which mode, following the enhancement, improves the video quality the most. For example, when a video is shot at night with insufficient light and no consideration is given to a movement factor, the brightness enhancement mode has the highest priority, followed by the de-noising mode, the color enhancement mode, the de-blurring mode, and the resolution enhancement mode. In a moving shot environment, for example, with normal light intensity, the de-blurring mode has the highest priority, and the other enhancement modes can be prioritized according to other various conditions. In a more complicated shot environment, i.e., in the presence of insufficient light and movement of the terminal apparatus, the user can prioritize the enhancement modes, and can also prioritize the modes of interest according to a user's historical data. A mode that attracts the most attention from the user, the priority of this mode can be set as the highest.

As for self-adaptive setting according to relevant state of an apparatus, the apparatus state includes power, memory, etc. Mode setting and enhancement order prioritizing can be performed according to power consumption of the five enhancement modes described above. Assuming that the result of prioritizing is the resolution enhancement, the de-blurring enhancement, the de-noising enhancement, the color enhancement, and the brightness enhancement, if the power is less than a first threshold (e.g., 50%), the resolution enhancement is not performed. If the power is less than a second threshold (e.g., 40%), the de-blurring enhancement is not performed. If the power is less than a third threshold (e.g., 30%), the de-noising enhancement is not performed. If the power is less than a fourth threshold (e.g., 20%), the color enhancement is not performed. If the power is less than a fifth threshold (e.g., 10%), the color enhancement is not performed. Mode setting and enhancement order prioritizing can be performed according to the self-adaptive setting of the memory, e.g., according to a cache space of the five enhancement modes. Assuming that the result of prioritizing includes the resolution enhancement, the de-blurring enhancement, the de-noising enhancement, the color enhancement, and the brightness enhancement, if the memory capacity is less than a first threshold (e.g., 500M), the resolution enhancement is not performed. If the memory capacity is less than a second threshold (e.g., 400M), the de-blurring enhancement is not performed. If the memory capacity is less than a third threshold (e.g., 300M), the de-noising enhancement is not performed. If the memory capacity is less than a fourth threshold (e.g., 200M), the color enhancement is not performed. If the memory capacity is less than a fifth threshold (e.g., 100M), the brightness enhancement is not performed.

As for self-adaptive setting, according to mode setting historical information, the number of times that all the enhancement modes have been selected by the user is recorded, and the enhancement modes are prioritized based on this number of times. For example, assuming that the result of prioritizing includes the resolution enhancement, the de-blurring enhancement, the de-nosing enhancement, the color enhancement, and the brightness enhancement, when the terminal apparatus is activated at a subsequent or next time, the resolution enhancement is performed first, followed by the de-noising enhancement, the de-blurring enhancement, the color enhancement and the brightness enhancement mode. Alternatively, the modes to be enhanced in this shooting may be determined according to the enhancement mode in the previous shooting.

In addition, an influence relation exists between the five enhancement modes, as shown in Table 1. In Table 1, "X" represents that there is no influence relation between modes, and "O" represents that the enhancement of mode A will influence the effect of mode B. In consideration of correlation between modes, if a certain mode is enhanced, a relevant mode can be selectively enhanced (or not). For example, if the resolution is enhanced, and the video frame is relatively clear, de-blurring can be thus omitted. If the brightness is enhanced in a night scene, noise becomes an obvious issue, and thus de-noising is required.

TABLE 1

Influence relation between enhancement modes

|  | Resolution | Color | Brightness | De-noising | De-blurring |
|---|---|---|---|---|---|
| Resolution | — |  | X | X | ○ |
| Color | X |  | X | X | X |
| Brightness | X |  | — | ○ | X |
| De-noising | ○ |  | X | — | ○ |
| De-blurring | ○ |  | X | X | — |

Step 3: Multi-mode combined enhancement is performed on the video information.

After modes to be enhanced are determined in step 2.4, the modes to be enhanced are enhanced one by one in this step. Consideration is given to the mode enhancement order, that is, the enhancement order of the modes selected in the step 2.4 is determined. Then, the selected modes can be processed, in the enhancement order, one by one according to the enhancement methods in Embodiments 1 to 5.

Step 4: The video is stored.

In this embodiment, if the enhancement mode includes resolution enhancement, the video storage mode can be the same as storing the videos in the step 4 of Embodiment 1. Setting the storage mode is also the same as in the step 5 of Embodiment 1. Storing videos can be the same as storing videos in the step 4 of Embodiment 2. Setting the storage mode is also the same as that in the step 5 of Embodiment 2.

Step 5: The video is played.

In this embodiment, the play mode corresponds to the storage mode. If the enhancement mode includes resolution enhancement, playing a video is the same as playing a video in the step 5 of Embodiment 1. If the enhancement mode does not include resolution enhancement, playing a video is the same as playing a video in the step 5 of Embodiment 2.

Figure 4B:
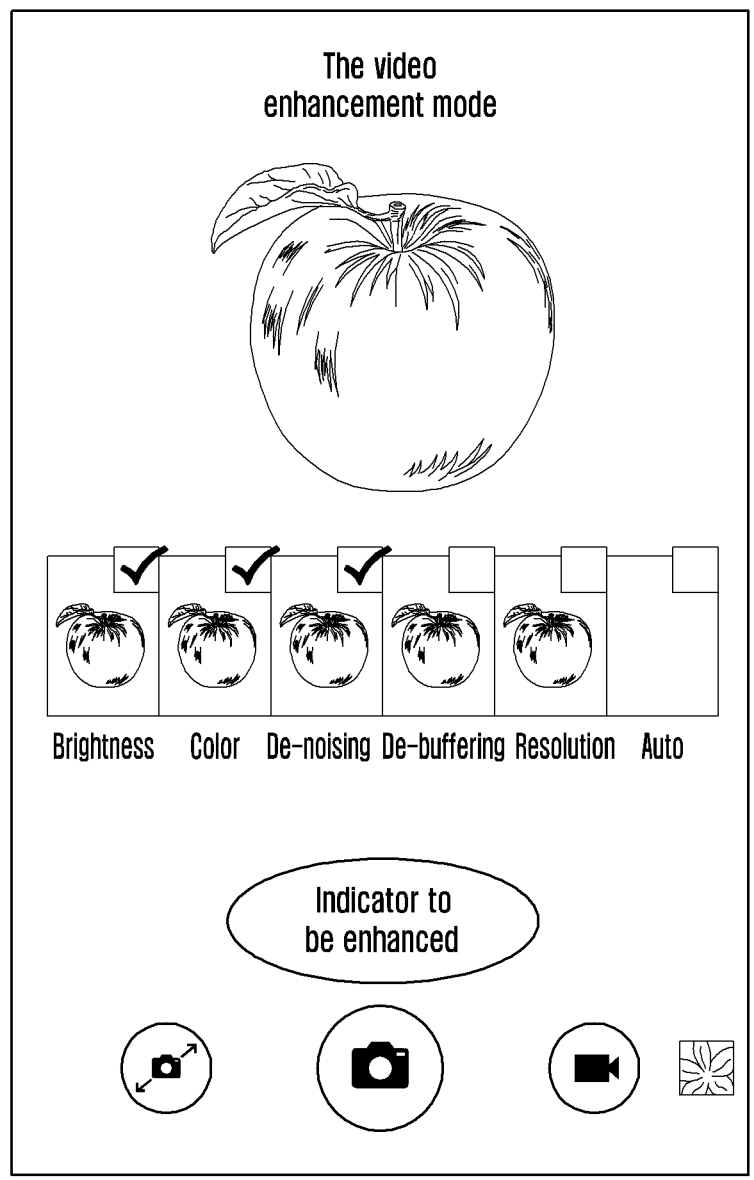
FIG. 4B is a diagram of a video mode enhancement, according to an embodiment of the present disclosure.

The video combined enhancement mode will be described in detail below. This mode includes an enabling step, a mode enhancement step, a parameter setting step, a storage step and a play step. The fourteen sub-steps discussed with respect to FIGS. 4A and 4B cover these five steps.

Step 1): A camera of the terminal apparatus is activated to enter a shooting interface. The user gives a voice instruction "enable the video enhancement." The terminal apparatus receives the instruction "enable the video enhancement", and enters the video enhancement mode.

Step 2): After the video enhancement mode is enabled, "Video Enhancement Mode" in red occurs in the shooting interface, and a button "Video Enhancement" appears below, and the user clicks the button to enter the enhancement mode selection interface.

Step 3): The mode selection interface is entered, and the words "Video Enhancement" become yellow; and six options appear, respectively, "Brightness", "Color", "De-noising", "Resolution" and "Auto" (see FIG. 4B). The former five options respectively correspond to different enhancement modes. The user can check one or an arbitrary number of modes for mode enhancement, and can also select the last option "Auto" to allow the terminal apparatus to self-adaptively select modes to be enhanced according to other factors, such as, shot environment. After the checking process is completed, the button "Enhancement Mode" is clicked again to enter the camera setting interface.

Step 4): Collection of pictures of the two cameras are displayed in the shooting interface. The user can check the shooting scene by switching over the cameras, and the user can freely set one camera as the main camera to shoot original videos, and the other camera as the auxiliary camera to take key frame pictures.

Step 5): After the selection of cameras is completed, the setting button is clicked. A collection parameter is set in the camera, and the setting of the collection parameter of the two cameras can be completed by switching over the cameras. The collection parameter includes, but is not limited to, exposure duration and photosensitivity. After the setting of the collection parameter is completed, a button "Shoot a Video" is clicked to enter the next step.

Step 6): The video shooting interface is entered to shoot a video, with the main camera shooting the video, and the auxiliary camera taking key frame pictures. In the video shooting interface, after the shooting process is completed, the user clicks a button "Stop" to stop the shooting process. Different storage and play modes can be performed for different interaction ways. The button "Stop" is clicked to skip to step 7, and the enhanced video is directly stored; the button "Stop" is pressed for a predetermined time to skip to step 10, and the original video information and key frame image information are stored.

Step 7): The video is enhanced, and the original video information is displayed in the image frame at the bottom right corner of the interface. A buffering icon is displayed to remind the user of the video enhancement progress. When the enhancement is completed, the buffering icon disappears, and the enhanced video information is displayed in the image frame. A normal shooting interface is entered after the storage process is completed.

Step 8): The shot video is enhanced and stored in the terminal apparatus. Before the next shooting, videos shot recently are displayed in the image frame at the bottom right corner, and the image frame can be clicked to view the enhanced video information.

Step 9): The video play interface is entered, and the "Play" button is clicked to play the video immediately.

Step 10): The original video information and the key frame image information are directly stored, and the original video information is displayed in the image frame at the bottom right corner. The video enhancement can be selectively processed in the background according to the use of the processor. If the processor is idle, the video is enhanced. The image frame at the bottom right corner is clicked to view the video. Upon receiving a clicking instruction, the terminal apparatus first decides whether the video enhancement is completed. If the enhancement step is completed in the background, the process skips to step 11, and if the enhancement step is not completed, the process skips to step 12.

Step 11): When the video enhancement is completed, the enhanced video play interface is displayed, and the "Play" button is clicked to play the video immediately.

Step 12): When the video enhancement is not completed, the video is continuously enhanced by the terminal apparatus, and the original video information can be displayed in the background image, and a buffering icon appears to remind the user of the enhancement process. After the enhancement is completed, the buffering icon disappears automatically, and the process skips to step 13.

Step 13): The enhanced video play interface is displayed, and the "Play" button is clicked to enter step 14.

Step 14: The video is played.

Embodiment 7

Multi-Mode Combined Image-Enhanced Video Mode in a Handheld Terminal

The execution flow of the video combined enhancement mode in a handheld smart terminal will be described in detail below.

Figure 5:
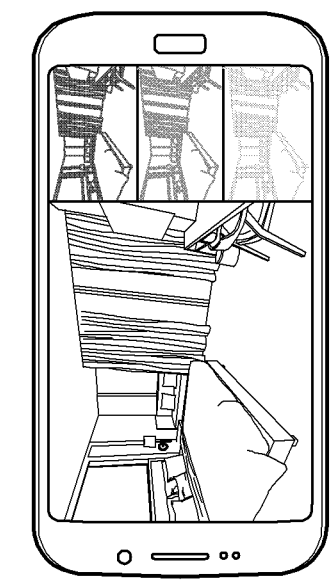
FIG. 5 is a diagram of video collection in a handheld smart terminal, according to an embodiment of the present disclosure.
Figure 5:
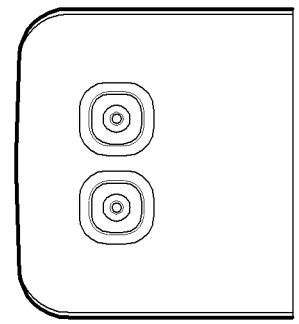
Figure 5:

Step 1): The user holds a handheld smart terminal, and sends a voice instruction "enable video enhancement" (see (a) of FIG. 5), the handheld smart terminal turns on two cameras, with the camera A on one side collecting images and the camera B on the other side collecting videos by default, see (b) and (c) of FIG. 5.

Step 2): As shown in (a) of FIG. 6, by previewing the current shot scene, the handheld smart terminal detects the scene as daytime, and sets the white balance as sunlight. When the scene brightness is detected to be high and the image exposure is self-adaptively set to be low, the handheld smart terminal sets the video collection frequency as 30 fps by default, the size as 640*480, the image size as 1920*1080, and the key frame collection frequency as 1 time per minute.

Step 3): According to a user's operation on the main image enhancement screen, the handheld smart terminal responds to the following events, including the setting function is activated, and the white balance setting is selected on a touch screen, as shown in (b) of FIG. 6. The slider can be scrolled to adjust the white balance, and the amount of exposure is adjusted. The video collection frequency is changed to 25 fps and the key frame collection frequency is changed to 2 times per minute.

Step 4): According to a user's operation of clicking the icon "Capture" on an interactive panel, as shown in (c) of FIG. 6, the smart terminal enables the video collection and sets the mode combination at the beginning as brightness enhancement and color enhancement by default.

Step 5): When there is an object (e.g., a child) which is moving fast in the scene, a video frame can become blurred, and the terminal apparatus self-adaptively enables the de-blurring mode, and increases the key frame collection frequency to 4 times per minute (or other suitable frequency).

Step 6): As the object moves out of the picture and the blur disappears from the video frame, the smart terminal self-adaptively disables the de-blurring mode, and returns the key frame collection frequency back to 2 times per minute (or other suitable frequency).

Step 7): As the sunlight outdoors becomes brighter, the handheld smart terminal detects the increased brightness and self-adaptively reduces the amount of exposure.

Step 8): When the user enters a room and the light thus becomes dim, the handheld smart terminal detects the decreased brightness and self-adaptively increases the amount of exposure.

Step 9): The user sends a voice instruction "enable a high dynamic range image", and the handheld smart terminal switches the normal brightness collection to high dynamic range collection.

Step 10): If the light becomes dim again and a large amount of noise occurs in the video, the handheld terminal apparatus detects the noise enhancement and self-adaptively enables the de-noising mode.

Step 11): When the power is less than 30%, the handheld smart terminal self-adaptively disables the high dynamic range shooting. When the power is less than 10%, the handheld smart terminal disables the color enhancement mode, and when the power is less than 5%, the system disables all the enhancement modes.

Step 12): When the user sends a voice instruction "disable the video enhancement", the handheld smart terminal recognizes the voice-activated instruction, disables the video enhancement, and compresses and stores the enhanced video.

Step 13): Every time the user opens the enhanced video, the handheld smart terminal recognizes the operation and plays the video so that the user can view the video.

Embodiment 8

Multi-Mode Combined Image-Enhanced Video Mode in a Monitoring Terminal

In an outdoor environment, conventional monitoring apparatuses generally have disadvantages, such as, low collection frequency, low collection brightness, sensitive to light, and loud noise at cloudy and rainy days. With regard to this embodiment, a scheme in which a monocular monitoring camera is replaced as a binocular monitoring camera is provided. Video quality enhancement is performed in the background to improve the resolution, color and brightness, and to de-noise and de-blur the video.

Figure 6:
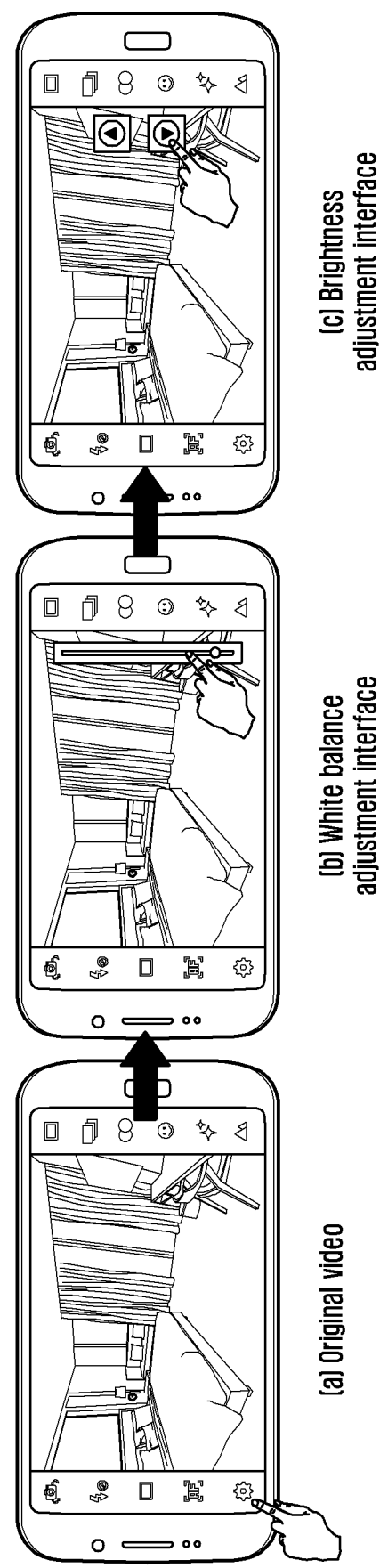
FIG. 6 is a diagram of a video combined enhancement mode in a handheld smart terminal, according to an embodiment of the present disclosure.
Figure 7A:
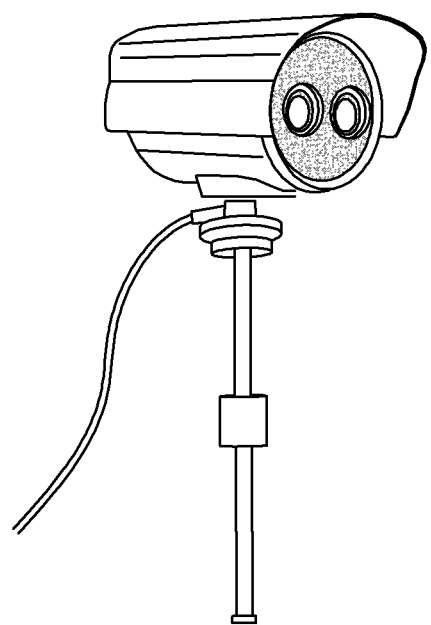
FIG. 7A is a diagram of a video combined enhancement mode in a monitoring terminal, according to an embodiment of the present disclosure.

A smart monitoring terminal apparatus with double cameras can be used on a highway, (such an embodiment of the smart terminal apparatus is shown in FIG. 7A), to shoot and monitor the passing cars, wherein one camera collects videos having a fixed size of 480*320, and the other collects images having a fixed size of 1920*1080. The two paths of data are transferred to the monitoring background over a data network. The monitoring background has a processor, a display screen, and a set of control panels, as shown in FIG. 6, wherein the two paths of data are processed in real time by a background processor. The current monitoring video, key frames collected, and a virtual control panel are displayed on the display screen. The hardware control panels include devices such as a mouse and a keyboard. The parameters, the combination of enhancement modes, and the selection of key frames are set.

An operator enables "Video Enhancement" by a key F1. According to the scene situation, the following steps are executed.

Step 1): The key frame collection mode is set as system self-adaptive adjustment by default. If the operator does not perform any setting, the process skips to step 2), or the operator sets the key frame collection mode as n frames per second by the virtual control panel.

Figure 7B:
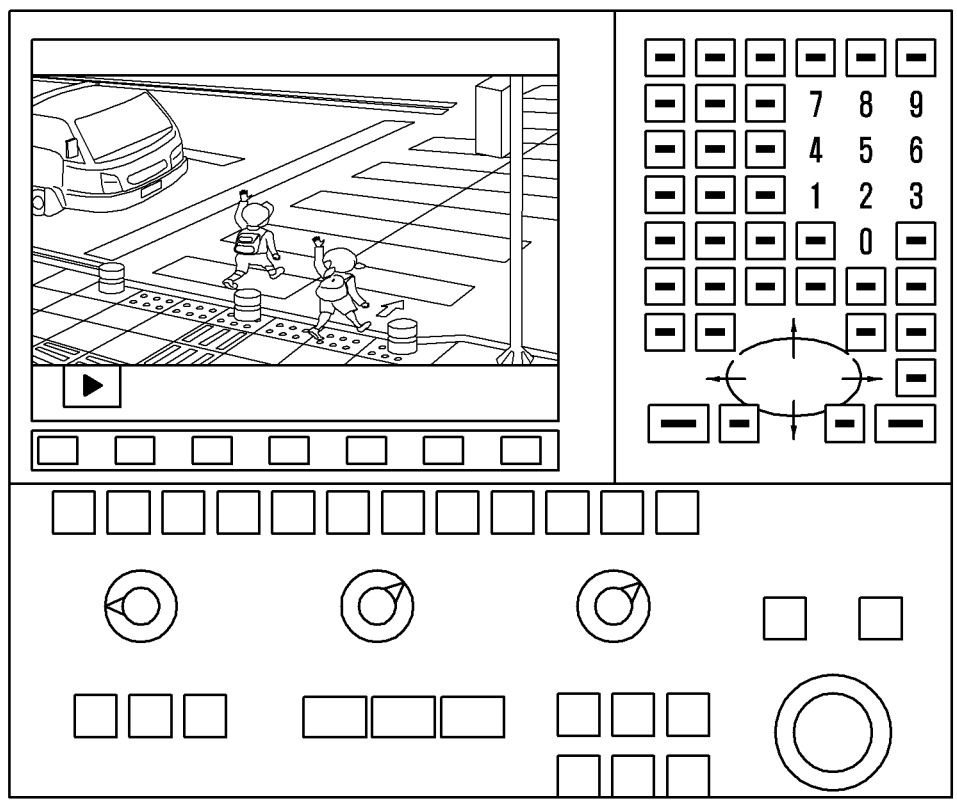
FIG. 7B is a diagram of a background monitoring control panel, according to an embodiment of the present disclosure.

Step 2): The default mode combination is the combination of the resolution enhancement and the de-blurring enhancement. If the operator does not perform any setting, the process skips to step 3), or, the operator selects and combines the five enhancement modes by the virtual control panel (FIG. 7B).

Figure 7C:
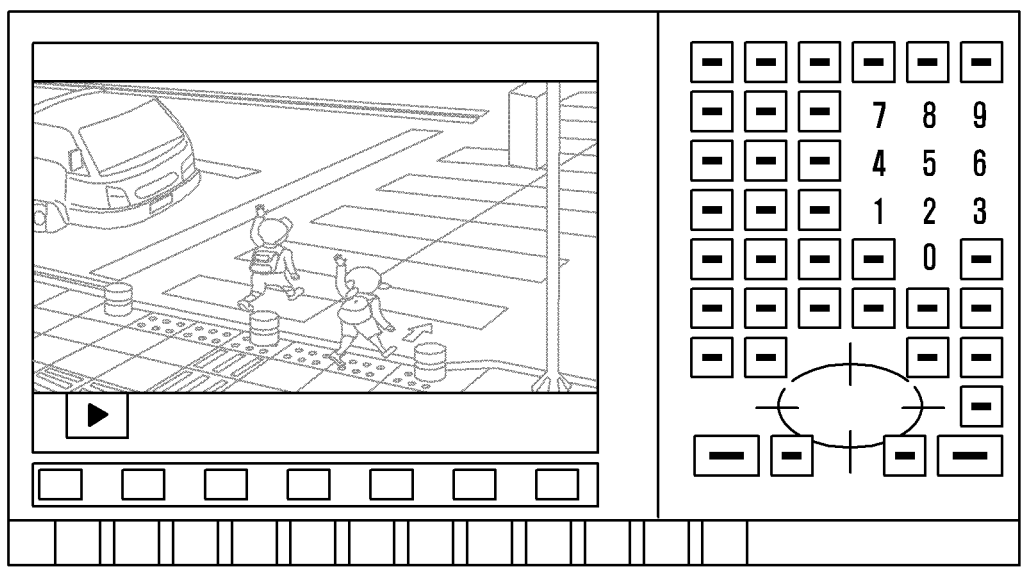
FIG. 7C is a diagram of an original video, according to an embodiment of the present disclosure.
Figure 7D:
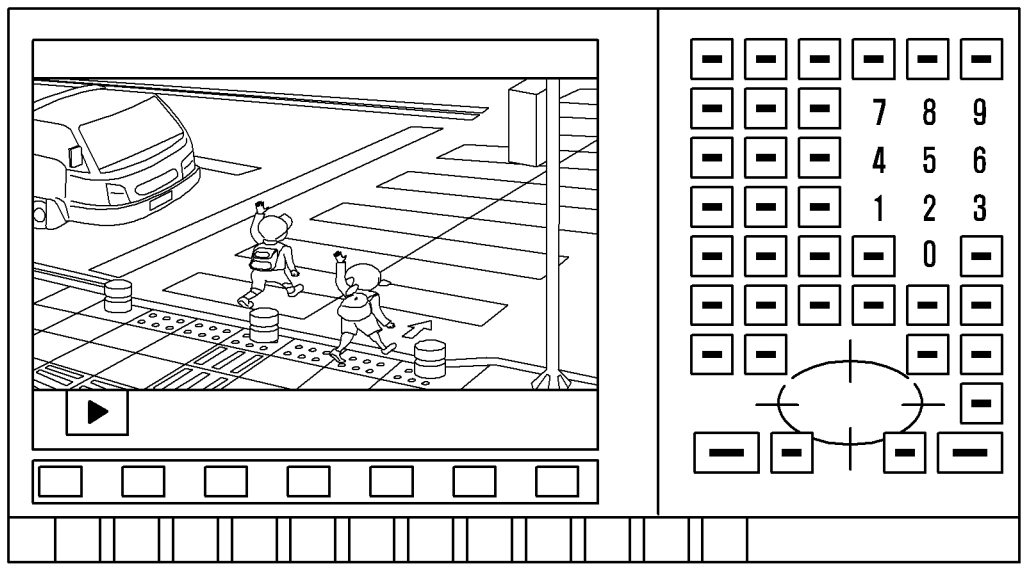
FIG. 7D is a diagram of a color enhancement and de-noising effect, according to an embodiment of the present disclosure.
Figure 7E:
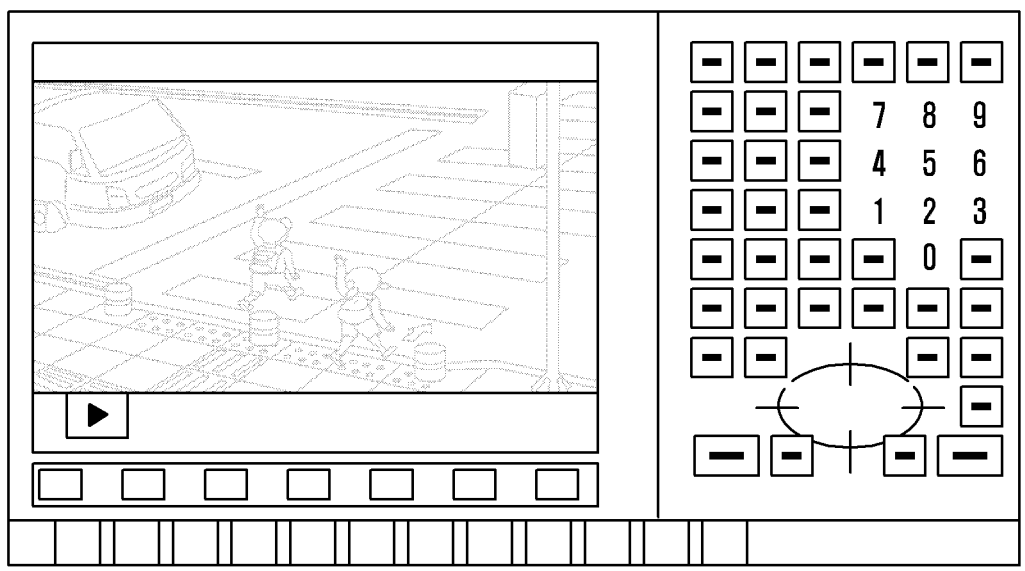
FIG. 7E is a diagram of a brightness enhancement effect, according to an embodiment of the present disclosure.

Step 3): The original collected video, the enhanced video, and a group of key frames recently collected are displayed on the screen in real time. There are three display effects: the original video as shown in FIG. 7C; the color enhancement and the de-blurring enhancement as shown in FIG. 7D; and the brightness enhancement as shown in FIG. 7E. Any one of the display modes can be selected by the operator by a menu.

Step 4): When a speeding car is found/detected by the monitoring terminal, the key frame collection frequency can be self-adaptively increased to obtain more or better images of high definition, and the scene brightness can be increased or decreased by adjusting the amount of image exposure. The car license plate can be set as a focusing region, and white balance can be selected to adjust the chromatic aberration.

Step 5): When the shot scene is taken during a cloudy or rainy night, the monitoring terminal self-adaptively enables the de-noising enhancement mode and the brightness enhancement mode according to time and brightness.

Step 6): The monitoring terminal compresses and stores videos, key frames, mode enhancement combination ways, and set parameters collected in the previous six hours (or other predetermined time frame) into a database every six hours.

Step 7): To invoke and view data previously stored, the user inquires or requests a certain segment of data stored in a database of the smart terminal, and the smart terminal displays the videos and key frames, before and after being enhanced, on the display screen.

Embodiment 9

A De-Blurring Enhancement Mode in the Video-Enhanced Image Mode

When the first type of multimedia information is video information and the second type of multimedia information is image information, image information collected by one multimedia collection apparatus, and video segments corresponding to the image information collected by the other multimedia collection apparatus in a set video collection frequency, are acquired.

Processing of the collected second type of multimedia information according to the collected first type of multimedia information includes enhancement processing on indicators to be enhanced corresponding to the collected image information according to the collected video segments.

The method also includes when the multimedia collection apparatus collecting image information is detected to have been in a preview state, or when the multimedia collection apparatus collecting the image information is detected to have started collecting image information, the other multimedia collection apparatus collects video segments corresponding to the image information in a set video frame collection frequency. When the number of video frames in the collected video segment is detected to have reached a corresponding upper limit, the other multimedia collection apparatus stops collecting video information.

Enhancement processing on indicators to be enhanced corresponding to the collected image information according to the collected video segments specifically includes determining a video key frame in the collected video segment and performing enhancement processing, on the basis of blur kernel estimation, of the image information according to the video key frame.

The video key frame is determined using the self-adaptive key frame determination. Self-adaptive key frame determination is determined by one or more pieces of information of picture blur level, content similarity, and video frame quality.

The method also includes analyzing definition of the collected image information and if the image information is a blurred image, performing enhancement processing on the indicators to be enhanced corresponding to the collected image information according the collected video segments; the indicators to be enhanced include blur.

When the first type of multimedia information is video information and the second type of multimedia information is image information, the collected image information is stored according to the collected video information. The stored content includes at least one of the image information obtained after the collected image information is enhanced according to the collected video information, the collected video information and the collected image information, the collected image information, and the video key frame, which is used for performing enhancement processing on the image information, in the collected video information, the collected image information and the enhancement model by which the image information is enhanced, and the image information obtained after the collected image information is enhanced according to the collected video information, and the collected video information.

Optionally, in response to a received display trigger operation, the image information is displayed based on a display mode matched with the stored content. The display mode includes at least one of when the enhanced video information is stored, the enhanced image information is directly displayed, when the collected video information and the collected image information are stored, the collected image information is displayed after being enhanced according to the collected video information, when the collected image information and the video key frame for enhancement are stored, an enhancement model is determined according to the video key frame, and the collected image information is displayed after being enhanced according to the enhancement mode, when the collected image information and the enhancement model are stored, the collected image information is displayed after being enhanced by the enhancement model, and when the enhanced image information and the collected video information are stored, the enhanced image information and the collected video information are associatively displayed.

With regard to this embodiment, by using one camera of the binocular camera to collect images and the other camera to collect videos, images of high quality are obtained. To take a clear image of high brightness, the user generally takes a picture by long exposure. Without being fixed by a tripod, a handheld smart terminal is likely to jitter, leading to blur in the shot pictures. The other camera is enabled to shoot a short segment of video when taking a picture. The exposure duration of each video frame is short, and the edge and texture information is maintained relatively well. Furthermore, compared with an image, a video is dynamic, and such a property of the video can be used to enhance a static image. A movement blur kernel can be estimated by the video frames and images to de-blur an image. Thus, a clear image of high definition is obtained. The method has the following main steps:

Step 1: The de-noising enhancement mode in the video-enhanced image mode is enabled.

In this embodiment, an enabling mode similar to that of Embodiment 1 is adopted in step 1, and the difference lies in that there is difference in some instruction descriptions and threshold settings. The specific differences will be described below.

Different instruction descriptions are used when the user enables the image de-blurring mode. For example, the instruction for voice enabling is "enable image de-blurring." The instruction for key enabling is pressing the Home key for a predetermined time. The Home key is a button for video de-blurring among the virtual keys. The handheld enabling instruction is a shaking of the terminal apparatus.

When the terminal apparatus self-adaptively enables a mode, according to the relevant state of an apparatus and the mode enabling historical data, different threshold settings are used, e.g., a power threshold, a threshold number of times, etc.

When the terminal apparatus self-adaptively enables the image de-noising mode according to the shot environment and the allocation parameter, the following three methods are provided. One method includes the smart terminal, by using the existing methods, detecting the terminal apparatus movement trend. If the shooting terminal apparatus is in a moving state, e.g., jittering of the handheld terminal apparatus resulting from the jittering of the hands holding the terminal apparatus, the image de-blurring enhancement mode is enabled. The second method includes the terminal apparatus detecting the shooting parameter. If the exposure duration of image collection is high or greater than a certain threshold, e.g., higher than 300 ms, the image de-blurring enhancement mode is enabled. The third method can be a combination of the first two methods. When both conditions of the first two methods are met, the image de-blurring enhancement mode is enabled. That is, when the shooting terminal is in a moving state and the exposure duration is greater than a certain threshold, the image de-blurring enhancement mode is enabled.

When the terminal apparatus self-adaptively enables the image de-noising mode, according to the relevant content collected in real time, the blur level indicator of the shot image is calculated. If the blur level indicator is less than a certain threshold, the image de-blurring mode is enabled for shooting the subsequent images.

Step 2: One camera of the binocular camera is used for shooting images, and the other camera is used for shooting videos.

This step includes setting a camera parameter and an enhancement policy parameter, setting a main camera and an auxiliary camera, setting parameters for collecting images and videos, and setting the selection of the video key frame.

Step 2.1: A main camera and an auxiliary camera are set.

In this embodiment, setting the main camera and the auxiliary camera can be similar to setting the main camera and the auxiliary camera in the step 2.1 of Embodiment 1. The main camera is responsible for shooting images, and the auxiliary camera is responsible for shooting videos.

Step 2.2: A collection parameter of the camera and an enhancement policy parameter are set.

In this embodiment, the parameter is a parameter required by the binocular camera to collect images and video segments. In addition to the collection parameter of the camera mentioned in the Embodiment 1, a key frame collection frequency (i.e., the number of video frames collected per second) and a parameter in the image de-blurring algorithm are added.

A setting way similar to that of Embodiment 1 can be adopted to set the collection parameter of the camera and the enhancement policy parameter. The difference lies in that a video collection frequency setting and a self-adaptive parameter adjustment performed with regard to image de-blurring are added. The newly-added setting ways will be described below.

As for system default setting of the terminal apparatus, the video frame collection frequency is set as a certain default value. Before receiving an instruction to change the video frame collection frequency, the video frame collection frequency is set as a default value.

As for setting under user interaction, with regard to the video frame collection frequency, the user can set the number of frames of video segments by voice, a slide, a key, text input, etc. The collection parameter is restricted by the respective value range of the terminal apparatus. Parameters must be selected within a certain range even when manually set by the user, or warnings from the terminal apparatus will be output to and received by a user.

As for self-adaptive setting, according to environment, e.g., when the terminal apparatus detects that the shooting terminal is in a moving state, the video frame collection frequency for the auxiliary camera is increased.

As for self-adaptive setting, according to power, e.g., the video frame collection frequency is controlled by power. When the power is less than a certain threshold, e.g., less than 50%, the number of frames of video frames collected per second is decreased. When the power is less than 5%, the number of frames is fixed as the minimum value.

As for self-adaptive setting, according to storage space, the video frame collection frequency can be adjusted according to the storage space. If the remaining storage space is greater than a certain threshold, e.g., greater than 50% of the total storage space of the terminal apparatus or greater than 500M, the video frame collection frequency is automatically adjusted as a high video frame collection frequency, e.g., 30 frames per second. The video frame collection frequency is automatically adjusted as a low video frame collection frequency, e.g., 25 frames per second. According to the storage space, the video frame collection frequency can be adjusted. If the remaining storage space is greater than a certain threshold, e.g., greater than 30% of the total storage space of the terminal apparatus or greater than 300M, the video frame collection frequency for the auxiliary camera is increased. The video frame collection frequency for the auxiliary camera is decreased.

As for self-adaptive setting, according to historical data, e.g., the video frame collection frequency is set according to user's preference. The video frame collection frequency can be set by, but not limited to, the following method the video frame collection frequency set during N recent times of image de-blurring is counted and the terminal apparatus recommends setting the average value of the previously set collection frequencies as the video frame collection frequency.

As for self-adaptively setting a collection parameter, according to the collected relevant content, one camera of the binocular camera is used to collect images and the other camera is used to collect videos, in order to de-blur the images. The resolution of video and image collection, exposure duration and photosensitivity are set. In consideration of energy conservation and algorithm design, the resolution of a video collected by the auxiliary camera should be consistent with that of an image. If the maximum resolution of the video is less than that of the current image, the maximum resolution of the video is used for collection. If the brightness of the shot environment is greater than or equal to a certain threshold, the video and image exposure duration is shortened. The photosensitivity is appropriately increased to reduce the possibility of occurrence of picture blur. If the terminal apparatus is detected to be in a jittering state or other movement trends by the sensor of the terminal apparatus, the exposure duration is appropriately shortened to prevent blur in images or videos. Such blur will affect the eventual image effect.

Step 2.3: The video segments are collected.

In this step, when the auxiliary camera starts to shoot, a video is introduced. One of the following two ways can be adopted. One way is to shoot a video before shooting an image, i.e., shoot a video at a browsing interface, and the other way is to enable video shooting when starting to shoot an image.

When a video is shot at the browsing interface, to save the video storage space and ensure a high association between video pictures and image content, only a part of frames are reserved for the video shot at the browsing interface. The user can set the number of frames of the partial video by voice, a slider, text input or more. The number of frames of the partial video can be self-adaptively set, according to the total number of frames of the video, e.g., set as 10% of the total number of frames. If there are a large number of video frames in total, a large number of video frames in this part can be saved. A small number of video frames in this part can be saved.

A buffering sequence is set to store those video frames. The maximum number of frames stored by the sequence is set as the number of frames of video segments set by the terminal apparatus. When the sequence is full and new video frames arrive, video frames shot earliest are removed from the sequence. If the video frames in the video sequence are stored according to the shooting time, the first frame is removed to leave space for storing the new video frames. The video sequence is updated in this method, and only the latest video segments are reserved.

When the picture shooting process is started, a video is continuously shot. The video shooting process can be stopped according to the following two conditions. One condition is that the video shooting process is stopped when the sum of the number of the shot frames and the previous number of frames reaches an upper limit of total number of video frames. The second condition is that the video shooting process is also stopped when the image shooting process is completed, despite the fact that the number of video frames does not reach the upper limit of the number of video frames, and the total number of video frames obtained is stored.

When the photographing process is started, the video shooting process is started at the same time. The video shooting process is stopped when the number of video frames reaches the number set by the terminal apparatus. For example, the video shooting process is also stopped when the photographing process is completed, despite the fact that the number of video frames does not reach the number set by the terminal apparatus, and the video segments obtained are stored.

Step 3: The blur in an image is removed by a video.

Upon obtaining images and video segments, the terminal apparatus analyzes the definition of an image picture. The images can be classified by parameters obtained by the sensor of the terminal during the photographing process, by the existence or absence of moving objects in the video segments, or by the existing classifier in literatures. If the picture is a clear image, the picture is not de-blurred, or the picture is continuously de-blurred as follows.

To save the processing time, several frames in a video segment can be selected to de-blur an image, i.e., determining a video key frame. The number of video key frames can be self-adaptively adjusted according to the picture blur level, and can also be set as a fixed value or a fixed proportion, e.g., set as one fifth of the total number of frames. With regard to the selection of video key frames, several frames sharing the highest similarity can be selected by content similarity. Several top frames in terms of quality are selected by video frame quality. The video frames can be selected by combined indicators, e.g., the video quality is ranked, and the number of key frames is set according to the blur level.

After obtaining a video key frame, first, the dimension of the video key frame and the dimension of an image are unified. The video key frame is scaled, or the image is scaled, or the video key frame and the image are both scaled so that the image and the video frame have a same size. The parallax between a key frame and an image is calculated by stereo matching. The video frame and the image are aligned to find a correspondence relation region between the video frame and the image. A correspondence relation from a blurred image to a clear image is built in correspondence regions between each frame of video (i.e., non-blurred image) and a blurred image. On the basis of each pair of correspondence regions, a plurality of blur kernels can be solved by the existing blur kernel estimation methods commonly known. A final blur kernel is obtained by weight averaging all the solved blur kernels. The weight of each kernel can be allocated in average, and can also be allocated according to content similarity. The kernels with high similarity have a high weight, and the kernels with low similarity have a low weight. The weight can also be allocated according to quality of video frames. The higher the quality is, the higher the weight. The shot images are de-blurred by the blur kernels. Depth learning method can be used, where one de-blurring model is learned by using these pairs of images in order to de-blur images.

In addition to calculation of a blur kernel by content relation between an image and a video frame, the movement track of a moving object or the terminal apparatus itself can also be estimated by an existing algorithm on the basis of consecutive video frames, in order to correct the blur kernel. In this way, the accuracy of a blur kernel is improved and a better de-blurring effect can be achieved.

Step 4: The image is stored.

In this embodiment, the terminal apparatus generates four types of data, the original image information, the video segments, a de-blurring model and the de-blurred images of high quality. The storage mode includes, but is not limited to, one of the following five modes.

The first mode includes directly storing the enhanced image without storing video segments, i.e., enhancement is completed before the storing process. When the enhanced image is stored, the original image is displayed in the photograph frame. A buffering icon is displayed above the photograph frame. The buffering icon indicates that enhancement is ongoing. When the buffering process is completed, the storage process ends.

The second mode includes storing the original image and the learned de-blurring model.

The third mode includes storing the original image, and the selected video key frame, i.e., the video frame for learning the de-blurring model. With regard to mode, the processing time of images before the storage process is reduced, and only a video key frame is found. The calculation of the de-blurring model can be performed after the storage process is completed. The terminal apparatus automatically arranges the processing time according to the free/busy state of the terminal processor. After the de-blurring model is calculated or the images are directly de-blurred, the stored video key frame can be deleted.

The fourth mode includes directly storing the original images and the stored video segments. Thus, all the enhancement steps are performed after the terminal apparatus performs the storage process.

The fifth mode includes storing the video key frame while the enhanced image is stored. An enhanced image can be obtained in any one of the four former storage modes, and when the stored key frame sequence is played, a dynamic picture can be viewed.

The terminal apparatus can select a storage mode according to one of the following three methods. The first method is to use the terminal apparatus default setting. The second method includes the terminal apparatus receiving the setting or alteration of the storage mode by the user by voice, a key, an external controller, or combinations thereof. The third method includes the terminal apparatus self-adaptively setting the storage mode according to the storage space, power and historical data.

As for system default setting, the terminal apparatus sets one of the five storage modes as a default mode. Videos and images are stored by the default storage mode until the terminal apparatus receives an instruction for altering the storage mode.

As for setting by voice under user interaction, e.g., the terminal apparatus sets in advance a voice instruction "store the enhanced image", if the terminal apparatus receives the instruction, the terminal apparatus performs voice recognition on the voice-activated instruction, and determines to set the storage mode as the first storage mode, i.e., storing the enhanced image. Other user interaction configurations can include the setting configurations in the step 4 of Embodiment 1.

As for self-adaptive setting, according to storage space, different storage modes can be selected according to the storage space. If the remaining storage space is less than a certain threshold, e.g., less than 10% of the storage space of the terminal apparatus, the storage mode is set as the first storage mode. If the remaining storage space is less than a certain threshold, e.g., less than 40% of the storage space of the terminal apparatus, the storage mode can be set as one of the three former modes and the fifth mode. If the remaining storage space is greater than a certain threshold, e.g., greater than 50% of the storage space of the terminal apparatus, the storage mode is independent of the storage space.

As for self-adaptive setting, according to power, the storage mode can be controlled according to power. When the power is less than a first predetermined power, e.g., less than 50%, the storage mode with low power consumption, i.e., the second or third storage mode, is selected. That is, the original image and the video key frame or the learning model are directly stored without enhancing the images. When the power is less than a second predetermined power (the second predetermined power is less than the first predetermined power), e.g., lower than 15%, the fourth storage mode with the lowest power consumption is selected, that is, the original image and video segments are stored. If the power is greater than a certain threshold, e.g., greater than 50%, the storage mode is independent of power.

As for self-adaptive setting, according to storage mode historical data, e.g., a user's preference is analyzed according to the previous storage modes set by the user, and such mode is set as the storage mode that the user prefers.

Step 5: The video is stored.

The terminal apparatus operates according to the detected display operation from the user to display the stored images.

When the stored images are displayed, there are different display modes for different storage modes. The terminal apparatus can select one of the following five display modes.

The first display mode corresponds to the first storage mode. When the terminal apparatus detects a user's operation of opening, the terminal apparatus directly displays the de-blurred image. When a user's operation of clicking to view is detected, e.g., when a user's operation of clicking the View button is detected, the image can be displayed immediately. In this way, the user can directly check the de-blurred effect.

The second display mode corresponds to the second storage mode. When the terminal apparatus detects a user's operation of opening, the terminal apparatus opens the combination of the original image and the de-blurring model. When the terminal apparatus detects a user's operation of clicking to view, e.g., when the terminal apparatus detects a user's operation of clicking the View button, the terminal apparatus starts to de-blur the image on the basis of the de-blurring model. The operation is completed within the permissible buffering time, and then, the enhanced image is displayed.

The third display mode corresponds to the third storage mode and the fourth storage mode. When the terminal apparatus detects a user's operation of opening, e.g., when the terminal apparatus detects a user's operation of click the View button, if the terminal apparatus has performed the de-blurring process, the terminal apparatus can directly display the image so that the user can view the enhanced effect. If the terminal apparatus completes a part but not all the de-blurring step in the background, a period of time is required for buffering in order to de-blur the image, when a user's operation of clicking to view is received. At an end of the de-blurring, the displaying of the image is started, so that the user can view the de-blurred image.

The fourth display mode corresponds to the fifth storage mode. When the terminal apparatus detects a user's operation of opening, the terminal apparatus opens the combination of the de-blurred image and the video key frame. The display mode of the de-blurred image is the same as the first display mode. The difference lies in that displaying of a dynamic image is added. The effect of a dynamic image can be presented by playing the key frame sequence. The dynamic image associated to an image can be viewed by, but not limit to, pressing the image for a long time. The dynamic image can be displayed by setting by voice, gestures or more.

The image de-blurring enhancement mode will be described in detail below.

Figure 8:
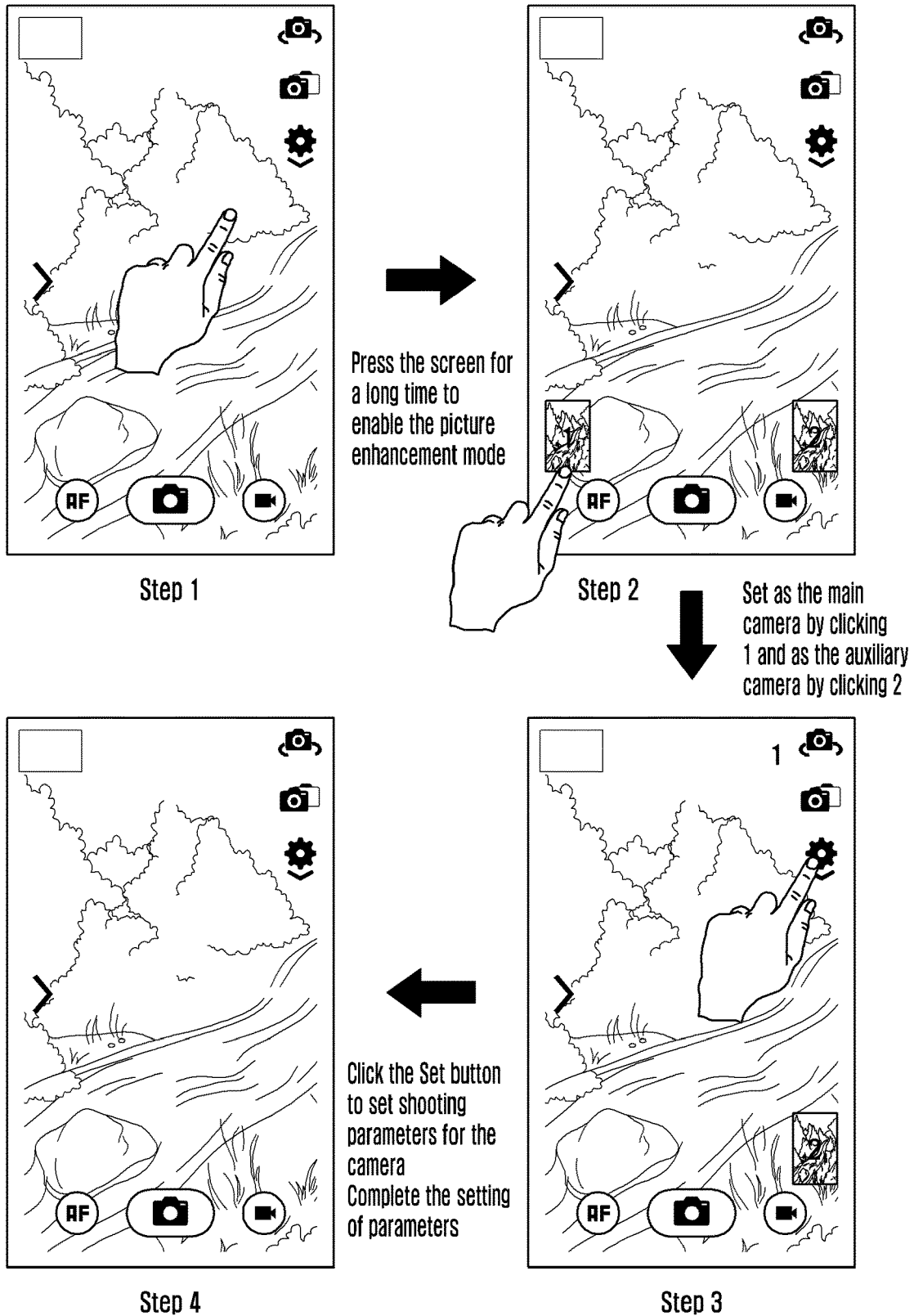
FIG. 8 is a diagram of an image de-blurring enhancement mode, according to an embodiment of the present disclosure.

The interaction step is enabled, as shown in FIG. 8.

Step 1): The cameras of the terminal apparatus are activated to enter a shooting interface, and the video-enhanced image mode is enabled by pressing the screen for a long time.

Step 2): After the video-enhanced image mode is enabled, collection pictures of the two cameras are displayed on the shooting interface. By switching the cameras to view the shooting scenes, the user can freely set one camera as the main camera to shoot images, and the other one as the auxiliary camera to shoot videos.

Step 3): After the selection of cameras is completed, collection parameters of the two cameras are respectively set. To shoot an image of high brightness, the exposure duration can be increased and the photosensitivity can be decreased to improve the picture quality. After the setting of the collection parameter is completed, the next step is performed.

Step 4): The interaction parameter setting process is ended to enter the shooting interface. The picture is displayed within the vision field of the main camera.

Figure 9:
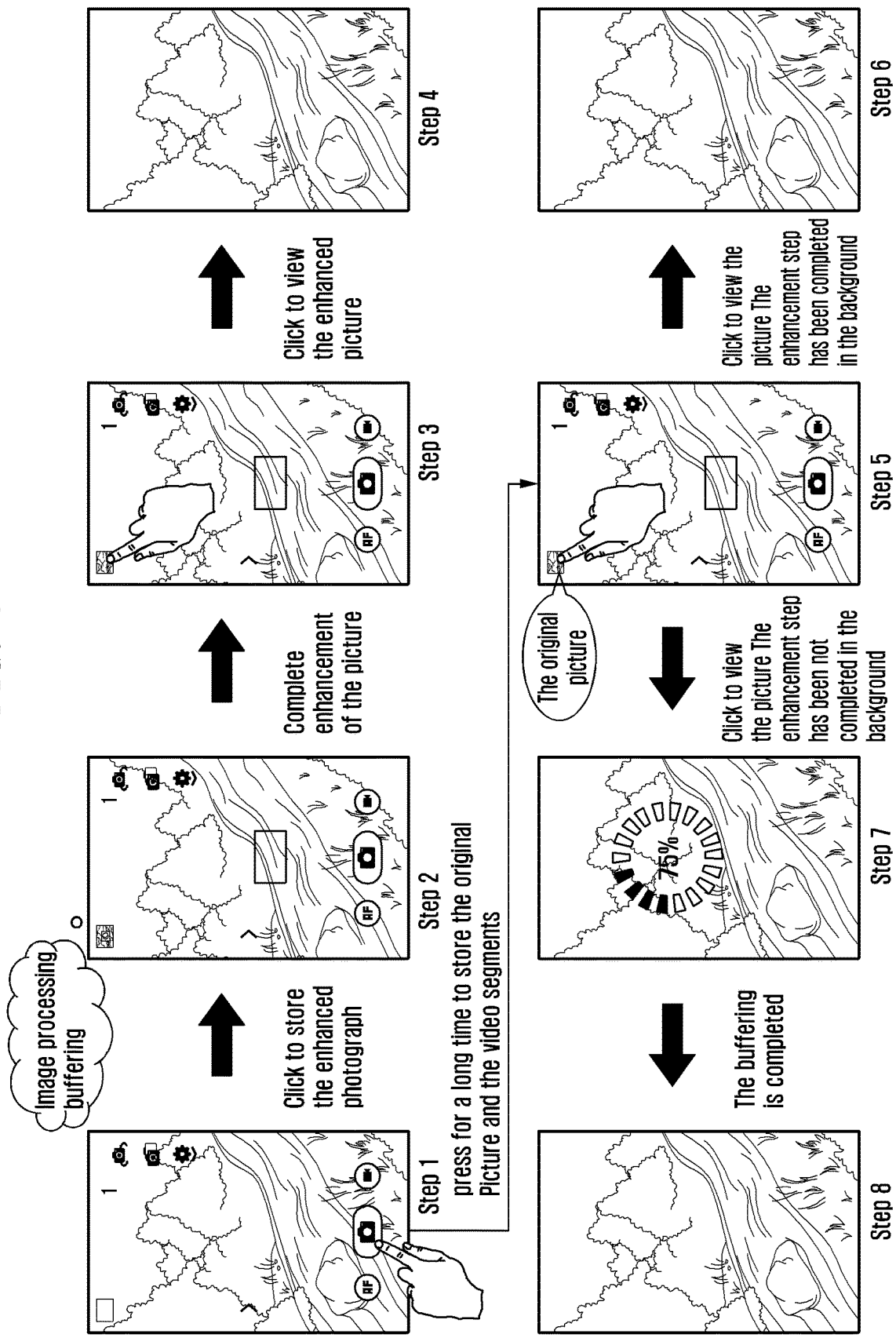
FIG. 9 is a diagram of an image de-blurring enhancement mode, according to an embodiment of the present disclosure.

2) The mode enhancement step, the storage step, and the play step are as follows:

Step 1): When capturing a picture of interest in the photographing interface, the user presses down on the Photograph button for photographing. Different storage and play modes can be performed by different operation ways. The Photograph button is clicked to skip to step 2 in FIG. 9, where an enhanced photograph is directly stored. The Photograph button is pressed for a predetermined time to skip to step 5), where original images and video segments are stored.

Step 2): An image is enhanced. The original image is displayed in the image frame at the top left corner, and a buffering icon is displayed to remind the user of the image enhancement progress. When the enhancement is completed, the buffering icon disappears, and the enhanced image is displayed in the image frame.

Step 3): The shot video is enhanced and stored in the terminal apparatus. Before shooting a next image or subsequent images, photographs shot recently are displayed in the image frame at the top left corner. The image frame can be clicked to view the enhanced image.

Step 4): After the image frame is clicked, the enhanced images are displayed.

Step 5): The original images and video segments are directly stored, and the original images are displayed in the image frame at the top left corner. The image enhancement will be selectively processed in the background according to the use of the processor. If the processor is capable of processing images, the images are enhanced. The image frame at the top left corner is clicked to view the images. Upon receiving a clicking instruction, the terminal apparatus decides whether image enhancement is completed or not first. If the enhancement step is completed in the background, the process skips to step 6, and if the enhancement step is not completed in the background, the process skips to step 7.

Step 6): When the image enhancement has been completed, the enhanced images are displayed.

Step 7): When the video enhancement has not been completed, the images are continuously enhanced by the terminal apparatus. The original image can be displayed in the background image, and a buffering icon appears to remind the user of the enhancement progress. After the enhancement is completed, the buffering icon disappears automatically, and the process skips to step 8.

Step 8): The enhanced images are displayed.

Embodiment 10

Multi-Focused Region Joint Play Mode

Embodiment 10 helps users to shoot videos with multiple focuses. A video of multiple focuses can be a global region and a certain local region of the interest, and can also be two local regions of interest. For example, when the user is shooting a video in which his/her family members and friends are dancing, the user may hope to shoot the global scene and to shoot his/her family members or friends specifically, or may hope to simultaneously shoot a plurality of friends specifically. With regard to the conventional way of shooting a video, the user is required to manually perform the enlargement and scaling operation frequently. In this way, the shot videos are likely to be blurred or jittered.

Furthermore, only a global region or a certain enlarged local region can be seen at the same time, so that a global image or a clear local image cannot be shot simultaneously, or a plurality of local images cannot be shot simultaneously.

In accordance with the present disclosure, different focusing regions are respectively set by the two cameras, wherein one camera focuses on the global region and the other camera focuses on a local region of interest, or one camera focuses on a local region of interest, and the other camera focuses on another local region of interest. The shooting process is performed by the two cameras simultaneously to obtain a multi-focus video having both of a global region and a local region of interest, or two clear local region videos.

In the detailed description of the embodiments below, processing the second type of multimedia information according to the first type of multimedia information is specifically embodied in a multi-focused region joint play mode in which the collected video information focusing on another focused region is jointly played according to the collected video information focusing on one focused region.

In this embodiment, the first type of multimedia information and the second type of multimedia information are video information focusing on different focused regions, wherein the focused region includes a global region and/or a local region.

According to the collected video information focusing on one focused region, the collected video information focusing on another focused region is jointly played.

The focused region is determined by at least one of the following ways. When a user selects a local region, the selected local region is determined as a focused region and another focused region as a global region. When a user selects two local regions, the two selected local regions are determined as focused regions.

The local region selected by the user may be detected by the focus object selected by the user.

The global region and/or local region can be jointly played in a split-screen layout way.

(1): Enabling of the Multi-Focused Region Joint Play Mode

There are two ways for enabling the multi-focused region joint play mode. One way, the user enables a multi-focus video initiatively, and the other way, the terminal apparatus, according to the shot video content, reminds the user of whether to enable the multi-focus video shooting or not. Similar to what has already been described, the user can enable the multi-focus video shooting mode by voice, keys, gestures, biological characteristics, external controllers or more, and by arbitrary combination of these interaction ways.

As for enabling by voice, e.g., the user can set in advance a voice enabling instruction "enable the multi-focus video shooting process". If the terminal apparatus receives the voice-activated instruction "enable the multi-focus video shooting process" from the user, the terminal apparatus performs content recognition on the voice-activated instruction to determine that the multi-focus video shooting process is to be enabled now.

As for enabling by a key, the key can be a hardware key, e.g., a volume key or a Home key. The user can enable the multi-focus shooting mode by pressing the volume key or Home key for a predetermined time. Upon receiving the event of the user's operation of pressing the key for a predetermined time, the terminal apparatus determines that the multi-focus video shooting mode is to be switched. The key can also be a virtual key, e.g., a virtual control button on a screen, a menu, etc. The terminal apparatus can display a multi-focus shooting virtual key on a video shooting preview interface. Upon receiving an event of the user's operation of clicking the virtual key, the terminal apparatus determines that the multi-focus video-shooting interface is to be switched. When this mode is enabled by a key, a plurality of feature information, e.g., pressure, speed, time, frequency, etc., can also be combined to indicate different meanings. For example, pressing lightly indicates changing a focus target person, pressing heavily indicates modify the enlargement factor of the focus person, and pressing the key for a predetermined time indicates enabling the multi-focus target person shooting mode or more.

As for enabling by a gesture, the gesture includes a screen gesture, e.g., double-clicking the screen/or pressing the screen for a long time. When this mode is enabled by a screen gesture, differences of pressure, speed, time, frequency of the user's gesture can be combined to indicate different meanings. For example, pressing lightly indicates changing the focus point target person, pressing heavily indicates modifying the target person enlargement factors, and pressing for a predetermined time indicates enabling the multi-focus target person shooting mode or more. The gesture also includes an air gesture, e.g., shaking/rolling/tilting of the terminal apparatus. Different direction, angle, speed and force of the shaking/rolling/tilting can indicate different meanings. For example, shaking up and/or down indicates changing the focus point target person, and shaking left and/or right indicates changing the parameter during the shooting process. Tilting to the left indicates switching the display mode, and tilting to the right indicates switching the storage mode. The gesture can be a single gesture, and can also be an arbitrary combination of any gestures. For example, the combination of pressing the screen for a predetermined time and shaking the terminal indicates enabling the multi-focus video shooting and changing the focus point target person for shooting in real time.

As for enabling by biological characteristics, biological characteristics may include handwriting characteristics, fingerprint characteristics, and/or voiceprint characteristics. For example, when the terminal is in a video shooting preview interface, if the fingerprint detected by the fingerprint detector or voiceprint detected by the voiceprint detector is consistent with the preregistered fingerprint or voiceprint of the user, the terminal apparatus determines that the multi-focus video shooting mode is to be enabled.

As for enabling by an external controller, the external controller can be any suitable apparatus, such as a stylus and/or a microphone, which are associated with the terminal apparatus. Upon detecting that the stylus is taken out and inserted into the terminal apparatus quickly, that the preset key of the stylus is pressed down, or that the user gives a preset air gesture by the stylus, the terminal apparatus determines that the multi-point video shooting mode is to be switched.

The external controller can be a smart watch, smart glasses, etc. Other apparatus can be a cell phone, or other accessories or attachments, or independent apparatuses. The above-mentioned wearable apparatus can access to the terminal apparatus by WiFi and/or NFC and/or BT and/or a data network. The wearable apparatus or other apparatuses can determine that the user wants to switch to the multi-focus video shooting mode by at least one interaction way of keys, gestures, biological characteristics, and inform the terminal apparatus.

(2): Determination of a Multi-Focused Region

After the terminal apparatus enables the multi-focus video shooting mode, in the shooting preview interface, the user can manually specify a plurality of regions. If the user specifies only one region, the multi-focused region is the whole or entire image captured in the shooting preview interface and the specified region.

If the user specifies more than two regions, during the multi-focused region video shooting, a certain specified region will be focused alternately to obtain a video formed of a plurality of specified regions of interest.

Apart from the way of manually specifying by the user, the terminal apparatus can automatically determine the multi-focused region according to the object (e.g., a person) in the current shooting scene. For example, the number of persons in the scene is detected, and the region with the greatest number of persons is used as a region of interest, and the whole scene as a global region.

The focus object can also be selected by the user. The region of the focus object selected by the user is determined as a focused region. When the user enables the multi-focus video shooting mode, there can be many ways of selecting a focus person. For example, when the preview mode of the multi-focus video shooting is entered, face detection in the global region is automatically performed. The user, by clicking or dragging the detected face region, determines the focused region to be shot. When the shooting mode is entered, by the technology of face tracking and identification, the focus person of the interest can be tracked in real time. One of the binocular cameras is used to shoot a global region video, and the other camera is used to shoot a video of the tracked focus person of interest. When the user needs to change the target person of interest, by double-clicking the screen, face detection in the global region video can be enabled now. The user can select a certain person in the detected faces, or can manually specify the region of interest. A surrounding frame of a region of interest can also be corrected dynamically. For example, the face region can be enlarged to a face and shoulder region, or the upper body region of the person, or the whole body region of the person.

(3): User Interaction Ways

Figure 10:
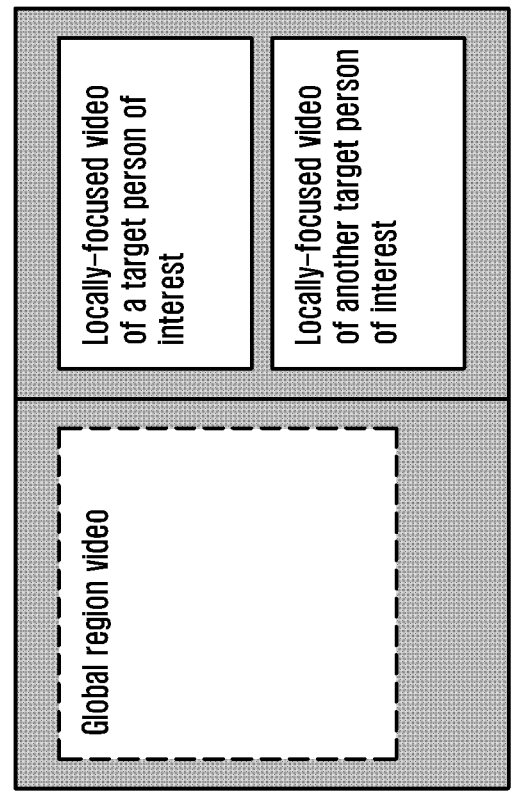
FIG. 10 is a diagram of a left-right split-screen video layout for a multi-focused region joint play mode, according to an embodiment of the present disclosure.
Figure 10:
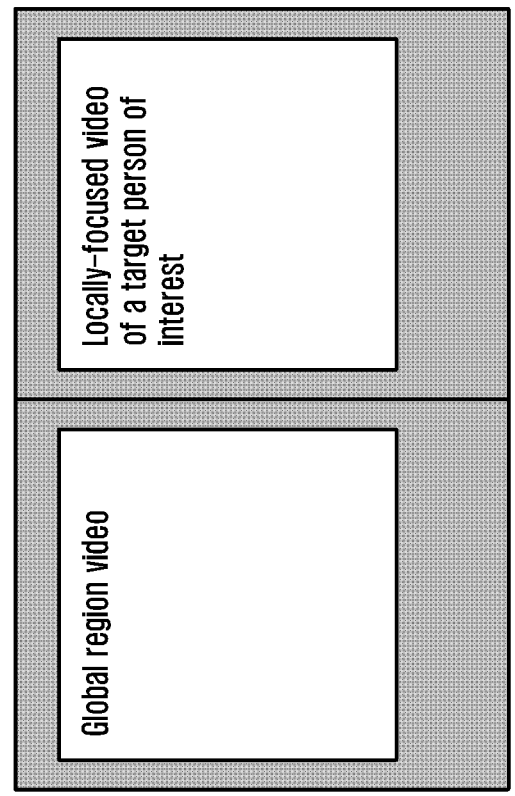

Different interaction ways are provided according to the landscape or portrait state of a handheld terminal apparatus when the user is shooting a multi-focus video. If the terminal apparatus is detected, by a gravity sensor, to be used for shooting a video in the landscape state, the video layout way of displaying in left and right screens as shown in FIG. 10 is used. The left side is "a global region video", and the right side is "a local video of a target focus person of interest", or, the left side is "a local video of a target focus person of interest", and the right side is "a global region video". According to a difference in a number of focus persons, a plurality of target persons can be displayed in the "a locally-focused video of a target person of interest" region on the left side or the right side.

Figure 11:
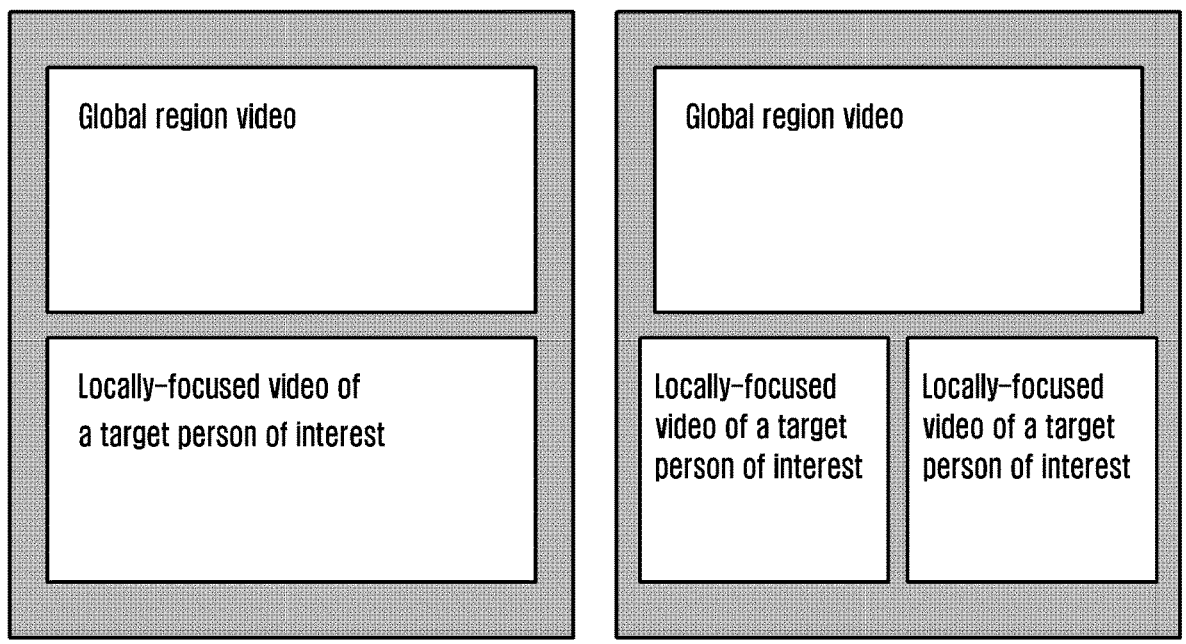
FIG. 11 is a diagram of an up-down split-screen video layout for a multi-focused region joint play mode, according to an embodiment of the present disclosure.
Figure 12:
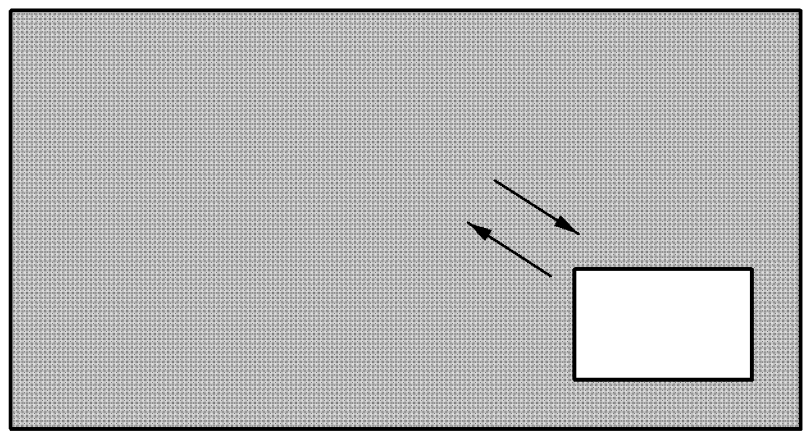
FIG. 12 is a diagram of a big-small screen video layout for a multi-focused region joint play mode, according to an embodiment of the present disclosure.

When the terminal apparatus is detected to be used for shooting a video in the portrait state, a video layout of displaying in up and down screens as shown in FIG. 11 is used. The upper side is "a global region video", and the lower side is "a locally-focused video of a target person of interest," or, the upper side is "a locally-focused video of a target person of interest", and the lower side is "a global region video". According to a difference in a number of focus persons, a plurality of target persons can be displayed in the "a locally-focused video of a target person of interest" region on the upper side or the lower side. When the user needs to pay more attention to the global region, and needs to store the target person of interest for playing later, a big-small screen play mode as shown in FIG. 12 can be selected. A global video occupies a majority of the screen, and the video of a locally-focused target person of interest is located in a small portion of the screen. The portion can be the bottom right corner, the bottom left corner, the top right corner or the top left corner. Or, the portion can also be a portion specified by the user.

(4): Storage of a Multi-Focus Video

Processing the second type of multimedia information according to the first type of multimedia information includes according to the collected video information focusing on one focused region, the collected video information focusing on another focused region is stored. The stored content includes at least one of the collected two pieces of video information focusing on different focused regions, synthesized video information obtained by synthesizing the collected video information focusing on another focused region according to the collected video information focusing on one focused region, the determined video content of interest in the two pieces of video information focusing on different focused regions, and the collected video information focusing on the global region and the location information of the local region in the video information of the global region.

Based on multi-focus shooting, this embodiment provides the following four storage modes:

Mode 1: Multi-focus videos shot by the two cameras are respectively stored to obtain two video files. If one of the two cameras is globally focused and the other one is locally focused, one of the obtained two videos is stored to correspond to a globally-focused video, and the other is stored to correspond to a locally-focused video. If the two cameras are locally focused, the two video correspond to locally-focused videos obtained by the two cameras, respectively.

Mode 2: With regard to this storage mode, a visible-can-be-available video synthesis and storage method is provided. The stored content is the same as the picture displayed in the terminal apparatus display screen, and the pictures shot by the two cameras are simultaneously presented for each frame of pictures in the video. For example, with regard to the three screen display modes shown in FIGS. 10 to 12, as for the big-small screen layout shown in FIG. 12, each frame in the obtained video, which is a big-small screen picture, is stored. The picture content corresponds to the content displayed in the screen at the corresponding moment of time, and the big screen and small screen in the picture correspond respectively to content shot by the two cameras.

Mode 3: With regard to this storage mode, a video synthesis and storage mode driven by the user's interest is provided. This mode corresponds to a display mode in which the screen is divided into a main screen and an auxiliary screen. With regard to the big-small screen layout in FIG. 3, the big screen is a main screen, and the content displayed in the main screen represents the current vision field of interest. The stored final video is content displayed in the main screen, and each frame in the video presents a region of interest at this moment of time.

Figure 13:
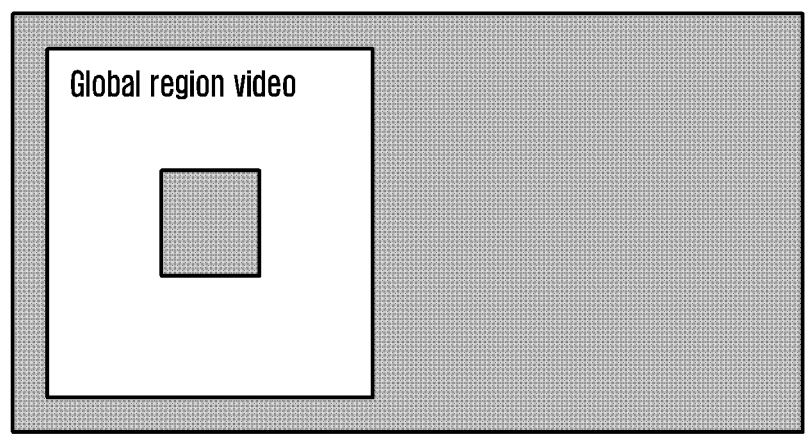
FIG. 13 is a diagram of a global region video layout for a multi-focused region joint play mode, according to an embodiment of the present disclosure.

Mode 4: this storage mode corresponds to globally-focused shooting and locally-focused shooting. During the storage, the globally-shot video can be stored, together with the local region object of interest determined by the location information of the bounding box of the local region, which are obtained by tracking in real time, in the surrounding frame of the global region. As shown in FIG. 13, in a global region video, the local region video is stored, and the position of the rectangular frame, e.g., the four angular points of the shaded region in FIG. 13, tracked in the global region in real time, is saved. And, by taking the size of the rectangular frame as a standard, the content of the locally-focused region shot by the other camera is saved.

The terminal apparatus can select a storage mode according to one of the following three ways. The first way is via terminal apparatus default setting. The second way includes the terminal apparatus receiving the alteration of the storage mode by the user by voice, a key, an external controller or more, or combinations thereof. The third way includes the terminal apparatus self-adaptively setting the storage mode according to the relevant information of an apparatus such as storage space or historical data.

As for system default setting, the terminal apparatus sets one of the four storage modes as a default value. Videos and images are stored by the default storage mode until the terminal apparatus receives an instruction for altering the storage mode.

As for setting via user interaction, the setting steps are similar to those in the step 4 of Embodiment 1. For example, the instruction for voice setting is "respectively store the video", and if the terminal apparatus receives the instruction, the terminal apparatus performs voice recognition on the voice-activated instruction and determines to set the first storage mode as the storage mode.

As for self-adaptive setting, according to the storage space, different storage modes can be selected according to the storage space. If the remaining storage space is less than a certain threshold, e.g., less than 50% of the storage space of the terminal apparatus, one of the latter three storage modes is set as the storage mode. If the remaining storage space is greater than a certain threshold, e.g., greater than 50% of the storage space of the terminal apparatus, the storage mode is independent of the storage space.

As for self-adaptive setting, according to historical data, user's preference is analyzed according to the storage mode set previously by the user, and a storage mode preferred by the user is set.

(5): Multi-Focus Video Play Mode

In response to a received play trigger operation, the video information is played on the basis of a play mode matched with the stored content, and the play mode includes at least one of the following:

1): when the collected two pieces of video information focusing on different focused regions are stored, the two pieces of video information are separately or jointly played;

2): when the synthesized video information is stored, the synthesized video is played;

3): when the determined video content of interest in the two pieces of video information focusing on different focused regions is stored, the video content of interest is played; and 4): when the video information of the global region and the location information of the local region in the video information of the global region are stored, the video information of the local region is determined by the location information, and the video information of the global region and the video information of the local region are separately or jointly played.

The terminal apparatus can select, but is not limited to, one of the following four play modes.

The first play mode: The terminal apparatus detects a user's operation of opening, and this play mode corresponds to the two dependent videos stored respectively. When the terminal apparatus detects a user's operation of clicking to play, e.g., when the terminal apparatus detects a user's operation of clicking the Play button, the terminal apparatus plays the video shot by the two cameras. The two saved videos are stored in the memory of the terminal apparatus by a certain association in time. When the user selects to play the shot videos, the two independent videos can be respectively played in a full screen, and can also be simultaneously played by self-adaptively associating the two video pictures by the terminal apparatus. The two video pictures can be played in three ways, i.e., "up-down screen", "left-right screen" and "big-small screen", which have been described above with respect to the "interaction ways".

The second play mode: The terminal apparatus detects a user's operation of opening, and this play mode corresponds to the stored synthesized video. When the terminal apparatus detects a user's operation of clicking to play, e.g., when the terminal apparatus detects a user's operation of clicking the Play button, the terminal apparatus plays the synthesized video. The user can see a multi-focus video shot by the two cameras.

The third play mode: The terminal apparatus detects a user's operation of opening, and this play mode corresponds to the stored synthesized video. When the terminal apparatus detects a user's operation of clicking to play, e.g., when the terminal apparatus detects a user's operation of clicking the Play button, the terminal apparatus plays a video obtained by combining the video segments shot by the two cameras. The user can see a multi-focus video of the picture of interest displayed in the main screen during a video recording process.

Figure 14:
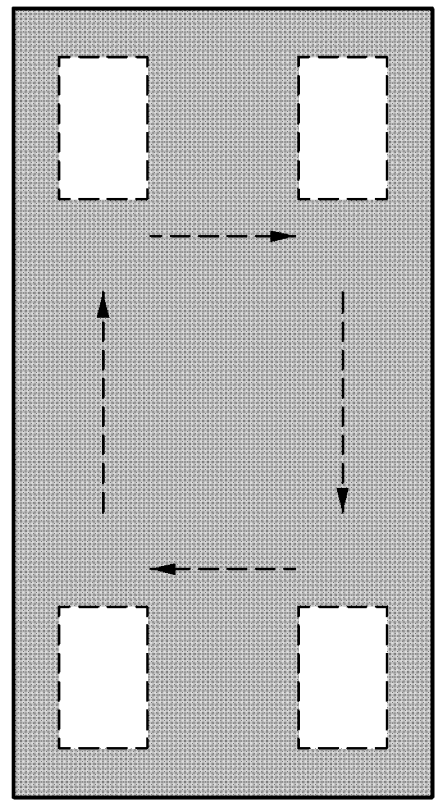
FIG. 14 is a diagram of switchover between a big screen and a small screen in a big-small screen video layout for a multi-focused region joint play mode, according to an embodiment of the present disclosure.
Figure 14:
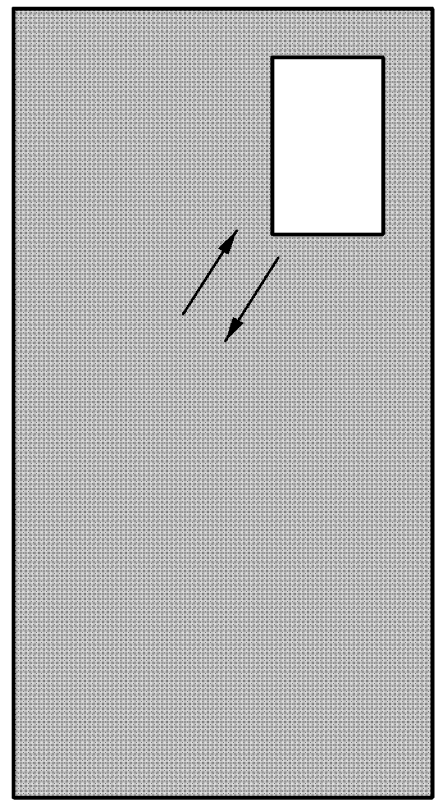

The fourth play mode: The terminal apparatus detects a user's operation of opening, and this play mode corresponds to the combination of the stored global region video and rectangular coordinates of the region of interest. When the terminal apparatus detects a user's operation of clicking to play, e.g., when the terminal apparatus detects a user's operation of clicking the Play button, the user can separately play the global region video and the local region video of a size corresponding to the four coordinate points, or can associatively play the two videos. The associative play mode can be divided into two ways, one way is that the two video pictures are simultaneously played in an "up-down screen", a "left-right screen" or a "big-small screen". When displayed in a "big-small screen", what is displayed in the big screen is a global region video or a locally-focused region, and what is displayed in the small screen is a locally-focused region of interest or a global region video. The user can switch the contents displayed in the two screens by clicking the big picture or the small picture. Furthermore, the position of the small screen on the big screen can be specified by the user, as shown in FIG. 14.

When the user does not specify the position to place the small screen, the terminal apparatus can automatically put the small screen in any one of the four corners in the screen. When the user needs to change the position of the small screen, the terminal apparatus determines how to put the small screen by detecting the user's gestures and operations.

The specific implementation of the multi-focused region joint play mode will now be described.

Step 1: The interaction step is enabled.

1): The cameras of the terminal apparatus are enabled to enter the video shooting preview interface, and the multi-focus video mode is enabled by double-clicking the screen.

Figure 15:
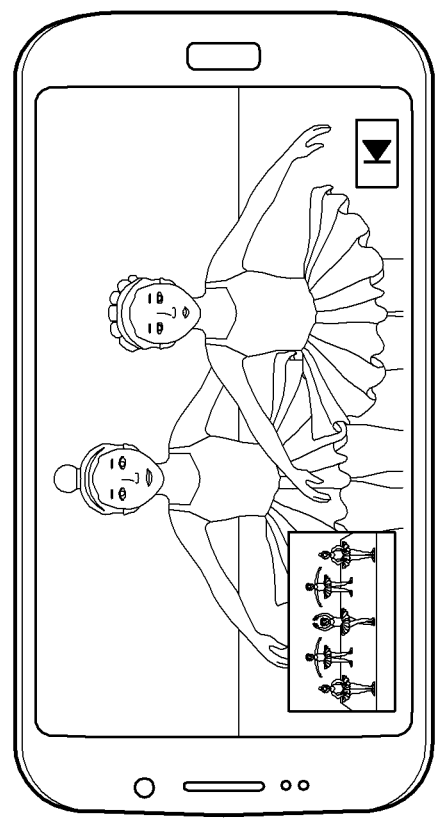
FIG. 15 is a diagram of recording and playing by a big-small screen in a big-small screen video layout for a multi-focused region joint play mode, according to an embodiment of the present disclosure.
Figure 15:
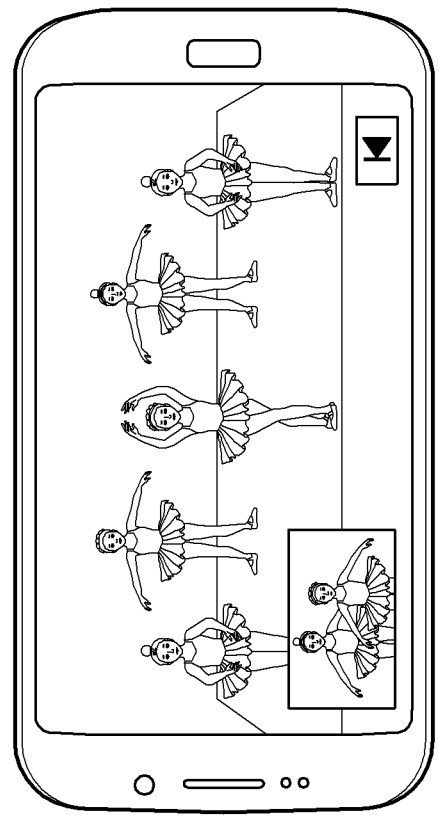

2): After the multi-focus video mode is enabled, as shown in FIG. 15, pictures collected by the two cameras are displayed in the preview interface. The picture occupying the full screen is the global region picture, and all the face regions in the scene are displayed in the global region picture. The user clicks the face region of interest, and drags the detection frame interactively to surround the whole region of interest. In the screen, part of the screen is the global region picture, and the other part is the picture of the local region of interest. The layout of the two portions of the picture, as described above, can be a left-right screen layout, an up-down screen layout or a big-small screen layout. The big-small screen is described herein for illustrative purposes.

3): After the local region of interest is selected and the two cameras focus respectively on the global region and the specified local region, a multi-focus video can be shot immediately.

Step 2: The multi-focus video can be shot, stored, and played in the following steps.

Step 2.1: A multi-focus video is shot.

In a multi-focus video shooting interface, when the user sees a global region picture and a local region picture of interest, the user presses down on the Shoot button to shoot a video. Different storage and play modes can be performed according to different operation ways. The process skips to step 2 by clicking the Shoot button in the interface, where the current pictures shot by the terminal apparatus screen are directly recorded. The process skips to step 5 by pressing the surrounding frame of interest in the global region for a long time, where the global region video and the position of the bounding box in the surrounding frame obtained by tracking in real time are stored, and a video of the local region of interest in the bounding box shot by the other camera focused on is stored. If the global region video and the local region video are both touched, the process skips to step 7, where the global region video and the local region of interest are stored respectively.

2): The current picture shot on the present terminal apparatus screen is directly recorded, and the global region picture occupies the whole screen of the terminal apparatus, and the local region picture is located in a small window. The position of the small window can be moved and changed by the user in real time.

Step 2.2: The multi-focus video is stored.

3): A multi-focus video formed of a global region and a local region are displayed on the screen, and the multi-focus video is stored in the terminal apparatus. Before shooting a next segment of multi-focus video, a multi-focus video shot newly is displayed in an image frame at the top left corner, and the multi-focus video shot newly can be viewed by clicking this image frame.

Step 2.3: The multi-focus video is played.

4): After clicking the image frame at the top left corner, the multi-focus video shot newly is displayed in the terminal apparatus, and the content played now is the same as the content seen during the shooting process.

5): The global region video and the position of the bounding box in the surrounding frames obtained by tracking in real time are stored, and a video of the local region of interest in the bounding box shot by the other camera focused on is stored. The user can separately play the global region video and the local region video of a size corresponding to the four coordinate points, or the user can associatively play the two videos. The two video pictures are simultaneously played in a "big-small screen." A global region video or a local focused region is displayed on the big screen, and a video of a locally-focused region of interest or a global region video is displayed on the small screen. The user can switch the contents displayed in the two screens by clicking the big picture or the small picture. Furthermore, the position of the small screen on the big screen can be specified by the user, as shown in FIG. 14. When the user does not specify the position to place the small screen, the terminal apparatus can automatically put the small screen in any one of the four corners in the screen. When the video storage process is completed, a multi-focus video shot newly is displayed in the image frame at the top left corner of the screen, and if the video is played, the process skips to step 6.

6): By pressing the content in the image frame at the top left corner in the screen for a long time, the newly shot multi-focus video is played.

7): As the global region video and the video of the local region of interest are respectively stored, the terminal apparatus can respectively play the two videos during the playing process. The two video pictures can also be simultaneously played by self-adaptively associating the two video pictures by the terminal apparatus. The two video pictures can be played in three ways, i.e., "up-down screen", "left-right screen" and "big-small screen", as described above with respect to the "interaction ways".

Embodiment 11

The Enhancement Mode is a Target Object Highlighting Play Mode

The target object includes a person of interest and an object of interest. For illustrative purposes, description of the embodiment will be given by with respect to shooting a person of interest.

During video shooting in the daily life and work, generally, since there are many persons to be shot, a person of interest is not salient. Not only the position of a speaker of interest is hard to be confirmed in image, voices of these persons are often confused. In conventional video shooting ways, a person of interest is not highlighted. However, due to the use of a binocular camera and multiple microphones, the depth of persons and the direction of voices can be confirmed in the scene, thus providing necessary conditions to highlight a person of interest during the shooting process. In accordance with the present disclosure, by combining a binocular camera and two or more microphones, persons in an image and the respective voices are associated during the video shooting, so that the purpose of playing the action and voice of a person of interest only in the video is achieved. As a result, a target person of interest is highlighted. In this way, in an obtained multi-person scene video, the action and voice of a certain person are highlighted.

Processing the second type of information according to the first type of information is specifically embodied in a target object highlighting play mode in which the audio and video of the collected video information are highlighted according to the collected audio information.

When the second type of multimedia information is video information and the first type of multimedia information is audio information corresponding to the video information, the audio and video of the collected video information are highlighted according to the collected audio information.

A target object may be determined from the collected video information, and the video information and/or audio information corresponding to the target object may be highlighted.

The target object is determined from the collected video information by at least one of determining the target object according to a detected target object specify operation and determining the target object according to the number and the location information of a plurality of objects in the collected video information.

Highlighting the audio information corresponding to the target object specifically includes detecting the collected video information to determine the number of objects, and the location information and the orientation information of each object in the video information, determining audio information corresponding to each object according to the location information and the orientation information of each object, and determining the audio information corresponding to the target object and highlighting the audio information.

A video segment in which the target object is located is determined from the collected video information, and an audio segments corresponding to the target object is determined from the collected audio information according to the correspondence relation. In a shot multi-person scene video, the actions and voices of one or more persons of interest are highlighted. By combining a binocular camera and two or more microphones, persons in a video image and the respective voices are associated, so that the purpose of playing or highlighting playing the actions and voices of one or more persons of interest only in the video is achieved. In this way, a person of interest is highlighted.

With regard to a shot video, the terminal detects a face region in a video image frame. The total number of target persons in the current scene can be obtained according to the number of the detected faces. The orientation information between a person and the shooting camera can be obtained according to a certain detected face region. By utilizing the binocular camera, the depth information of this person from the camera can be obtained by stereo matching, and the location and orientation information of each person in the scene with respect to the coordinate system of the camera can be obtained. Further, by using two or more microphones in a cell phone, the location and orientation information of each speaker in the scene with respect to coordinate system of the microphone can be obtained. By standardizing the transformation relation between the coordinate system of the camera and the coordinate system of the microphone, the correspondence relation between each person in an image and audio can be obtained.

After the correspondence relation of each person in an image and audio is obtained, when the user clicks to play a certain one or more persons of interest in the image, other regions in the video image are blurred or the region of interest is enlarged to highlight the region of the person of interest.

The specific implementation and presentation mode of this embodiment is constituted by four parts, i.e., enabling of a person of interest highlighted video shooting mode, determining a person of interest, storing images and voices of the person of interest, and playing images and voices of the person of interest.

(1): Enabling of a Person of Interest Highlighted Video Shooting Mode

There are two ways for enabling the person of interest highlighted video shooting mode. One way is that the user enables the person of interest highlighted video shooting mode initiatively, and the other way is that the terminal apparatus, according to the shot video content, reminds the user of whether to enable the person of interest highlighted video shooting mode or not.

1): The way of initiatively enabling the person of interest highlighted video shooting mode by the user is realized by interaction by voice, gestures or more. For example, when the user says "record a person of interest", the terminal apparatus immediately enables the person of interest highlighted video shooting mode, and the face detection function is enabled. All the persons in the current shooting scene are displayed in the video shooting preview interface, and the user can click to select a certain person of interest for shooting and can change the recorded person of interest.

Alternatively, all the persons detected in the current video are recorded in real time so that a specific person of interest can be selected to be played in the following playing process, or the switchover is performed among the following modes: a mode in which only one person is recorded; a mode in which several persons are recorded; and a mode in which all the persons are recorded.

2): The terminal apparatus automatically detects video content mainly on the basis of video understanding technology, e.g., if it is determined that, by analyzing content in a video, the main shooting scene of the current video is a scene in which a multi-user conference or a speech is going on, the terminal apparatus automatically reminds the user of whether to enable the person of interest highlighted video shooting mode or not.

After the person of interest highlighted video shooting mode is enabled, it can be determined whether to record a single person of interest or to record all the persons in a scene or perform switchover between the two modes.

(2): The Way of Determining a Person of Interest

When the user shoots a person of interest highlighted video, the way of specifying a person of interest includes two ways. The user initiatively specifies a person of interest by voice interaction, gesture interaction or interaction by an external apparatus, or the terminal apparatus automatically determines a person of interest.

The way in which the user initiatively determines a person of interest includes voice interaction, gesture interaction or interaction by an external apparatus, etc.

Voice interaction: the user, by voice interaction, enables the recording process. During the recording process, it can be determined whether to record a single person or to record a plurality of persons or to perform switchover between the two modes. For example, when the user says "record a single person", the terminal apparatus only records images and voices of a certain person of interest specified by the user, and when the user says "record all the persons", the terminal apparatus records images and voices of all the persons detected in the scene.

Gesture interaction: the user can click a certain detected person to specify a target person of interest for recording. The user can change the target person of interest by double-clicking another person. The user can specify to record all the persons of interest in the whole scene by clicking the screen, and the user can specify to record a plurality of persons of interest by successively clicking a plurality of target persons.

Interaction by an external apparatus: those operations by gesture interaction can all be achieved by an external apparatus. For example, by apparatuses, such as a stylus and a headset, associated with the terminal apparatus, a certain person of interest can be specified, or a plurality of target persons can be specified, or all the persons in the whole scene can be specified as the target persons.

2): The terminal apparatus automatically determines a person of interest according to the current shooting scene. When the terminal apparatus enables the person of interest shooting mode, persons in an image are detected in the image preview interface, and a person of interest is determined according to the number of persons in the image and the position of these persons. For example, every person in a scene is considered as a person of interest, and all the persons in the scene and voices corresponding to the persons are stored, or, a person standing near the center of the picture is considered as the person of interest, and obviously marked to remind the user that the current center person is the person of interest. If the user wants to change the current person of interest determined by the terminal apparatus, the user can make the change by double-clicking a person of his/her interest. The images and voices of the person of interest are corresponded to each other, by a binocular camera and a plurality of microphones of the terminal apparatus.

(3): The Way of Storing Images and Videos of a Person of Interest

The collected video information is stored according to the collected audio information. The stored content includes at least one of the collected video information and the collected audio information and the video information and the audio information corresponding to the target object.

A first storage mode: The contents collected by the camera and the microphone in real time are stored, and persons of interest specified by the user at different time are recorded to adapt to a plurality of ways during the playing process.

A second storage mode: Only images and voices of the person of interest recorded during the shooting process are stored. That is, only images and voices of a certain person, a plurality of persons or all the persons in the scene specified by the user during the shooting process are recorded.

The two storage modes are for a case in which the recording scene is within the collection region of the camera of the current terminal apparatus. If the recording scene is on the other side of the current terminal apparatus, the camera shoots voices from the back of the shooting region, and the voices are stored in another file. In this case, the user can select whether to remove the voices from the back of the camera shooting region during the playing process. Using the microphone in the terminal apparatus, it can be determined whether the voice is from the front of the camera shooting region or the back of the camera shooting region. If the current voice is from the back of the camera shooting region, the shooting person may not want to record the voice, e.g., the voice may be "start to record" or can be conversation when answering a phone call. Thus, this part of voice content can be separately stored.

The terminal apparatus can select a storage mode according to one of the following three methods. The first method uses the terminal apparatus default setting. The second method includes the terminal apparatus receiving the setting or alteration of the storage mode by the user by voice, a key, an external controller or more, or combinations thereof. The third method includes the terminal apparatus self-adaptively setting the storage mode according to the storage space, power and historical data.

As for system default settings, the terminal apparatus sets one of the two storage modes as a default value. Videos and images are stored by the default storage mode as long until the terminal apparatus receives an instruction for altering the storage mode.

As for setting under user interaction, setting is similar to step 4 of Embodiment 1 For example, the instruction for voice setting is "store the video of interest", and if the terminal apparatus receives the instruction, the terminal apparatus performs voice recognition on the voice-activated instruction and determines to set the first storage mode as the storage mode.

As for self-adaptive setting according to the storage space, different storage modes can be selected according to the storage space. If the remaining storage space is less than a certain threshold, e.g., less than 50% of the storage space of the terminal apparatus, the second storage mode is set as the storage mode. If the remaining storage space is greater than a certain threshold, e.g., greater than 50% of the storage space of the terminal apparatus, the storage mode is independent of the storage space.

As for self-adaptive setting according to historical data, user's preference is analyzed according to the storage mode set previously by the user; and a storage mode preferred by the user is set.

(4): The Way of Playing Images and Voices of the Person of Interest

In response to a received play trigger operation, the video information and the audio information are played on the basis of a play mode matched with the stored content. The play mode includes at least one of when the collected video information and the collected audio information are stored, the collected video information and the collected audio information are associatively played, when the collected video information and the collected audio information are stored, the target object in the collected video information and the corresponding audio information are associatively played, when the collected video information and audio information are stored, each object in the collected video information and corresponding audio information are associatively played, and when the video information and the audio information corresponding to the target object are stored, the video information and the audio information corresponding to the target object are associatively played.

For example, the terminal apparatus can select one of the following two display modes.

The first display mode: The terminal apparatus detects a user's operation of opening, and this play mode corresponds to the completed video in the first storage mode. When the terminal apparatus detects a user's operation of clicking to play, e.g., when the terminal apparatus detects a user's operation of clicking the Play button, the terminal apparatus plays the video.

With regard to the first storage mode, the images and voices of all the persons in the scene are recorded, and the persons of interest specified by the user in various periods of time are also recorded. In this case, during the playing process: 1) playing is performed according to the video content specified by the user during the recording process, e.g., in the first 30 seconds, the user is interested in person 1, and thus only the images and voices of the target person 1 are played with other persons and background images being blurred and/or kept still, or, the image region of the target person is enlarged with another region being blurred and/or kept still, and if in the next 60 seconds, the user is interested in person 2, s only images and voices of the target person 2 are played, and the selection of a person of interest is determined during the recording process, and the terminal apparatus records which person/persons the user is interested in during which period of time; 2) all the images and voice contents recorded are played without being processed; 3) since the images and voices of all the persons in the scene are recorded, during the playing process, the user can change the order of playing the persons of interest, e.g., in the first 30 seconds, the user is interested in the person 2, and thus only the voices and images of the target person 2 are played with the other persons and background images being blurred and/or kept still, and in the next 60 seconds, the user is interested in person 1, and only images and voices of the target person 1 are played.

The second display mode: The terminal apparatus detects a user's operation of opening, and this play mode corresponds to the person of interest in the second storage mode. When the terminal apparatus detects a user's operation of clicking to play, e.g., when the terminal apparatus detects a user's operation of clicking the Play button, the terminal apparatus plays the video in an order of persons of interest selected during the recording process, that is, plays the video in a same way of specifying the region of interest during the shooting process.

The two play modes are for the images and voice content in the front region shot by the camera. In view of the voice content from the back region shot by the camera as described in the "storage modes", the user can, by some voice instructions or gesture instructions, tell the terminal apparatus whether to play such voice content. For example, by clicking the background region in the screen, the playing of voice content from the back region shot by the camera is started, and the time for playing can be associated with other played videos by the time sequence recorded in files. The playing of voice content from the back region shot by the camera can also be stopped by double-clicking the background region in the screen.

An example of the embodiment of the person of interest highlighted video will be described in detail below.

Step 1: The interaction step is enabled.

1): The cameras of the terminal apparatus are activated to enter the video shooting preview interface, and the person of interest highlighted video shooting mode is enabled by pressing the screen for a long time.

2): After the person of interest highlighted video shooting mode is enabled, a picture collected by the left camera is displayed in the preview interface, and the picture occupies the whole screen. The face detection function is enabled, and all the persons in the current shooting scene are displayed in the video shooting preview interface. All the persons detected in the current video are recorded in real time so that a specific person of interest can be selected to be played in the following playing process.

3): After the persons in the scene are detected, the camera on one side is activated and coordinated with the camera on the other side to calculate the depth and orientation information of the persons detected in the scene, and a person of interest highlighted video can be shot immediately.

Step 2: A person of interest highlighted video is shot, stored and played in following ways.

Step 2.1: A person of interest highlighted video is shot.

1): In a person of interest highlighted video shooting interface, when the user sees that the face region detected in the picture is green, it is indicated that the angle and location information of the person in the scene have been estimated. The user presses down on the Shoot button to shoot a video, and different storage and play modes can be performed by different operation ways. The Shoot button in the interface is clicked to skip to step 2, where the pictures shot by the current terminal apparatus are directly recorded. A certain target person in the picture is pressed for a predetermined time to skip to step 5, where the person of interest highlighted video and corresponding persons of interest at each point of time are stored. Meanwhile, the voices from the back of the shooting region of the current terminal apparatus camera are detected in real time. If a voice from the back is detected, the process skips to step 7, where the video within the camera shooting region and the audio collected in the back of the camera are separately stored.

2): Pictures shot in the current screen are directly recorded, with the picture shot by the camera on one side occupying the whole screen of the terminal apparatus. The person region in the current scene is displayed in real time. If no person of interest is specified in the shooting process, a person of interest can be selected in the play stage. The process skips to 5), where pictures and audios of a specified person of interest are played.

Step 2.2: A person of interest highlighted video is stored.

3): A person of interest highlighted video is displayed in the current screen, and the video is stored in the terminal apparatus. Before shooting a next segment of person of interest highlighted video, a person of interest highlighted video shot newly is displayed in the image frame at the top left corner, and the person of interest highlighted video shot newly can be viewed by clicking the image frame.

Step 2.3: A person of interest highlighted video is played.

4): After clicking the image frame at the top left corner, the person of interest highlighted video shot newly is displayed in the terminal apparatus, and the content played now is same as the content seen during the shooting process. If a certain person in the video which is being played now is clicked, the process skips to the playing of step 5.

5): If a certain one or several persons of interest are not specified during the shooting stage, the user can click a person region of interest during the shooting process, and only images and audios corresponding to the person are played with other regions being kept still and/or blurred. If a person of interest within a certain period of time is specified during the shooting process, the time duration and the order of persons of interest specified by the user are recorded, and the video is played according to the order of the persons of interest and the time duration specified during the shooting process.

6): When the content in the image frame at the top left corner in the screen is pressed for a predetermined time, the newly person of interest highlighted video shot is played.

Figure 16:
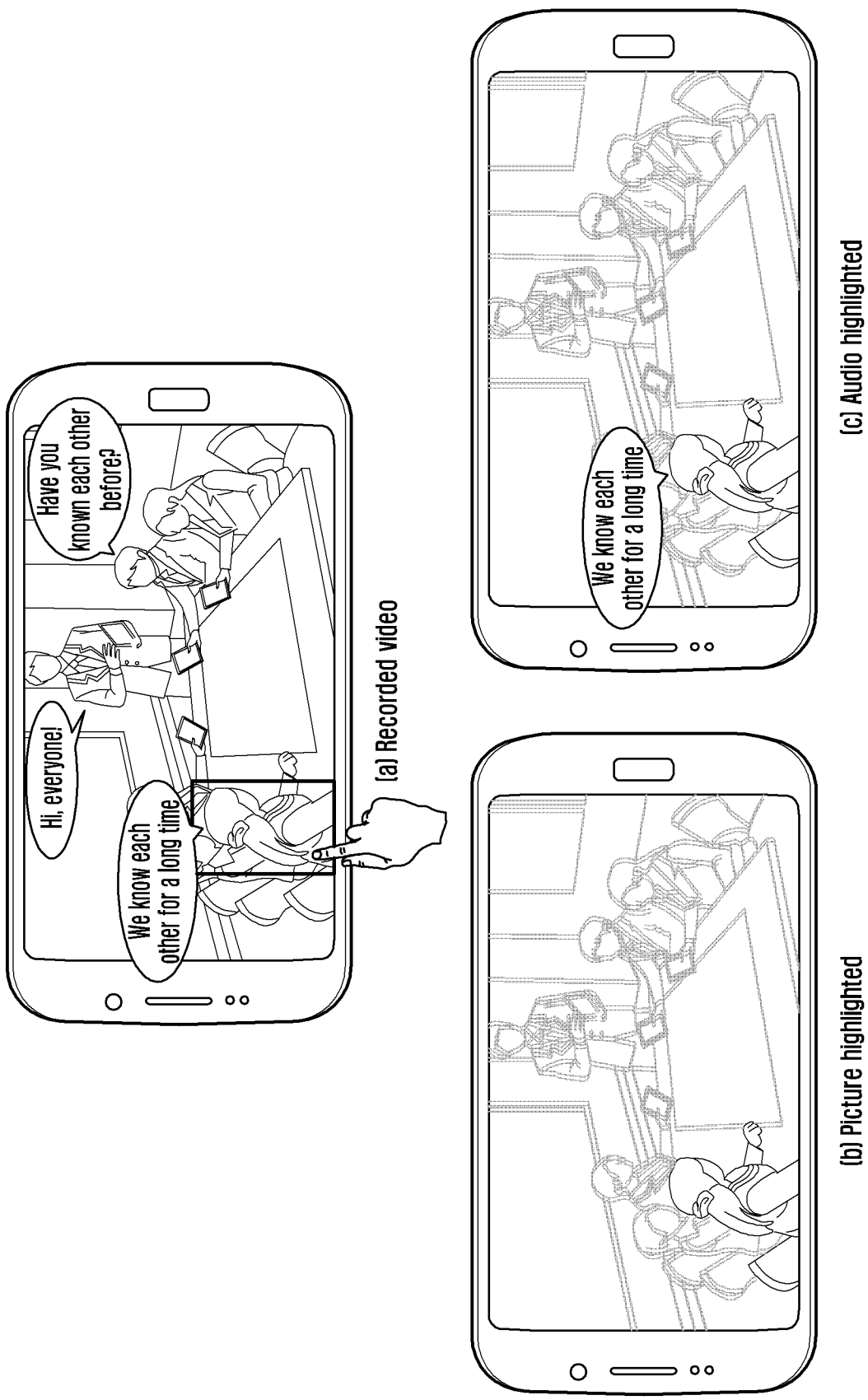
FIG. 16 is a diagram of highlighting audio and video in a target object highlighting play mode, according to an embodiment of the present disclosure.

7): Since the person of interest highlighted video and the audio from the back region of the camera are separately stored, the terminal apparatus can respectively play the two kinds of content during the playing process. As shown in (a-c) of FIG. 16, if the user is not interested in the audio from the back region of the camera, the user can directly delete the audio content, and if the user wants to maintain the audio from the back region of the camera, the user can jointly play the corresponding audios and videos according to a time sequence during the playing process.

Figure 17:
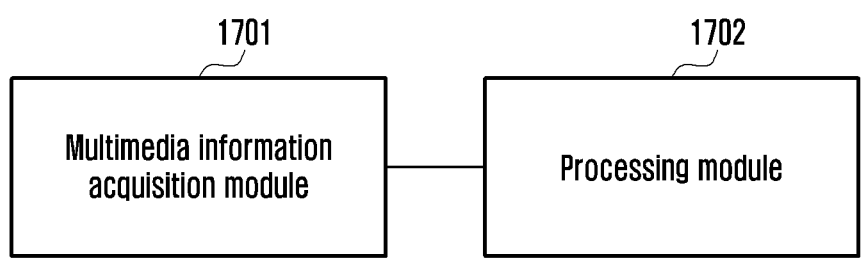
FIG. 17 is a diagram of a device for processing multimedia information, according to an embodiment of the present disclosure.

The present disclosure also provides a device for performing enhancement processing on multimedia information, as shown in FIG. 17, including a multimedia information acquisition module 1701 and a processing module 1702.

The multimedia information acquisition module 1701 acquires a first type of multimedia information and a second type of multimedia information respectively collected by two multimedia collection apparatuses. The processing module 1702 performs processing on the second type of multimedia information according to the first type of multimedia information.

The specific functions of each module in the device for processing multimedia information can be achieved with reference to specific steps of the method for processing multimedia information as shown in FIG. 1. At least part of the terminal apparatus (e.g., modules or the functions) or the methods (e.g., operations) described herein may be implemented with, for example, instructions stored in a non-transitory computer-readable storage media which has a program module. When the instructions are executed by a processor (e.g., multimedia information acquisition module 1701 and a processing module 1702), one or more processors may perform functions corresponding to the instructions. The non-transitory computer-readable storage media may be a memory.

The non-transitory computer-readable storage media may include a hard disc, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a ROM, a random access memory (RAM), or a flash memory, and the like), and the like. Also, the program instructions may include not only mechanical codes compiled by a compiler but also high-level language codes which may be executed by a computer using an interpreter and the like. The above-mentioned hardware device may be configured to operate as one or more software modules to perform operations according to various embodiments of the present disclosure, and vice versa.

Modules or program modules may include at least one or more of the above-mentioned components, some of the above-mentioned components may be omitted, or other additional components may be further included. Operations executed by modules, program modules, or other components may be executed by a successive method, a parallel method, a repeated method, or a heuristic method. Also, some operations may be executed in a different order or may be omitted, and other operations may be added. Embodiments of the present disclosure described and shown in the drawings are provided as examples to describe technical content and help understanding but do not limit the scope of the present disclosure.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. A method for processing multimedia information by a device including a first camera and a second camera, the method comprising:
   obtaining, by the first camera, video information;
   determining a key frame collection frequency of the second camera based on a least one of a frequency presetting or a self-adaptive frequency setting,
   acquiring, by the second camera, a plurality of key frame images in the key frame collection frequency;
   obtaining image information including the plurality of key frame images, the image information corresponding to the video information and having higher resolution than the video information;
   dividing the video information into a plurality of video segments based on the plurality of key frame images;
   identifying a matching relation between video pixels of the plurality of video segments and image pixels of the plurality of key frame images; and
   converting the video pixels of the plurality of video segments based on the matching relation and the image pixels of the plurality of key frame images.

2. The method according to claim 1, further comprising:
   setting a collection parameter and an enhancement policy parameter,
   wherein the video information and the image information are collected based on the collection parameter, and
   wherein replacing the video pixels is performed based on the enhancement policy parameter.

3. The method according to claim 1, further comprising:
   storing enhanced video information,
   wherein the stored enhanced video information includes one of:
   video information obtained by replacing the video pixels;

the video information and the image information;
the video information and an enhancement model for replacing the video pixels; and
video information obtained by replacing the video pixels, and the image information.

4. The method according to claim 3, further comprising:
in response to a received play trigger operation, playing the enhanced video information based on a play mode corresponding to the stored enhanced video information,
wherein the play mode includes one of:
a first play mode in which the video information obtained by replacing the video pixels is directly played;
a second play mode in which the video information is played after enhancement processing the image information;
a third play mode in which the video information is played after enhancement processing the enhancement model; and
a fourth play mode in which the video information obtained by replacing the video pixels and the image information are played.

5. The method according to claim 1, wherein replacing the video pixels includes at least one of performing the resolution enhancement based on a multi-view reconstruction or performing the resolution enhancement by constructing an enhancement model based on machine learning.

6. The method according to claim 1, wherein determining the key frame collection frequency of the second camera based on the self-adaptive frequency setting includes setting the key frame collection frequency based on at least one of information on a relevant state of the device, information on a frequency historical data, information on a collection environment, information on a collection parameter, or information on a relevant content obtained in real time.

7. A device for processing multimedia information, comprising:
a first camera configured to obtain video information;
a second camera configured to acquire a plurality of key frame images; and
at least one processor coupled with the first and second cameras and configured to:
determine a key frame collection frequency of the second camera based on at least one of a frequency presetting or a self-adaptive frequency setting, wherein the plurality of key frame images are acquired by the second camera in the key frame collection frequency,
obtain image information including the plurality of key frame images, the image information corresponding to the video information and having higher resolution than the video information;
divide the video information into a plurality of video segments based on the plurality of key frame images,
identify a matching relation between video pixels of the plurality of video segments and image pixels of the plurality of key frame images, and
converting the video pixels of the plurality of video segments based on the matching relation and the image pixels of the plurality of key frame images.

* * * * *